(12) United States Patent
Asakura et al.

(10) Patent No.: US 7,848,021 B2
(45) Date of Patent: Dec. 7, 2010

(54) OPTICAL FILM, ANTIREFLECTION FILM, POLARIZING PLATE AND IMAGE DISPLAY DEVICE

(75) Inventors: Tetsuya Asakura, Minami-Ashigara (JP); Katsumi Inoue, Minami-Ashigara (JP); Shoji Yasuda, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 934 days.

(21) Appl. No.: 11/707,154

(22) Filed: Feb. 16, 2007

(65) Prior Publication Data

US 2007/0195431 A1   Aug. 23, 2007

(30) Foreign Application Priority Data

Feb. 17, 2006  (JP) .......................... P2006-041471

(51) Int. Cl.
G02B 5/02 (2006.01)
(52) U.S. Cl. ........................ 359/599; 359/601
(58) Field of Classification Search .................. 349/64, 349/112, FOR. 117; 359/443, 599, 601, 359/707, 708; 362/246, 355, 558; 428/1.3, 428/1.31, 323, 327, 332, 339.3

See application file for complete search history.

(56) References Cited

U.S. PATENT DOCUMENTS

| 6,771,335 | B2 * | 8/2004 | Kimura et al. | 349/112 |
| 7,031,061 | B2 * | 4/2006 | Ito | 359/599 |
| 7,072,115 | B2 * | 7/2006 | Uekita et al. | 359/599 |
| 7,156,547 | B2 * | 1/2007 | Toshima et al. | 362/618 |
| 7,161,743 | B2 * | 1/2007 | Nishida et al. | 359/443 |
| 7,190,525 | B2 * | 3/2007 | Ito et al. | 359/599 |
| 7,283,304 | B2 * | 10/2007 | Murata et al. | 359/599 |
| 7,354,163 | B2 * | 4/2008 | Suzuki et al. | 359/601 |

FOREIGN PATENT DOCUMENTS

| JP | 59-50401 A | 3/1984 |
| JP | 11-305010 A | 11/1999 |
| JP | 2002-139602 A | 5/2002 |

* cited by examiner

*Primary Examiner*—Frank G Font
(74) *Attorney, Agent, or Firm*—Buchanan Ingersoll & Rooney PC

(57) ABSTRACT

An optical film is provided and includes: a transparent support; and a light diffusion layer containing light-transmitting particles and a binder. The light diffusion layer has an average thickness of from 7.5 to 30 μm, and the average thickness of the light diffusion layer is from 1.4 to 3.5 times as large as an average particle diameter of the light-transmitting particles.

12 Claims, 9 Drawing Sheets

OPTICAL FILM, ANTIREFLECTION FILM, POLARIZING PLATE AND IMAGE DISPLAY DEVICE

BACKGROUND OF THE INVENTION

1. Field of the Invention

This invention relates to an optical film and an antireflective film, and a polarizing plate and an image display device using the same.

2. Description of Related Art

With the recent progress toward large screen liquid crystal displays (LCDs), LCDs provided with optical films such as antireflective films or light diffusion sheets have been on the increase. In various image display units such as a liquid crystal display (LCD), a plasma display panel (PDP), an electro luminescence display (ELD), and a cathode-ray tube (CTR), for example, an antireflective film provided as the outermost face of the display in general to prevent lowering in contrast and extraneous images caused by the reflection of outside light. On the other hand, a light diffusion sheet is employed in the back light of a liquid crystal display.

An antireflective film, which is one of optical films, is usually constructed by laminating a light diffusion layer or a high refractive index layer and a low refractive index layer on a transparent support. To form these layers, it has been a common practice to form a thin metal oxide film by the chemical vapor deposition (CVD) method or the physical vapor deposition (PVD) method, in particular, the vacuum deposition method or the sputtering method, each falling within the category of the physical vapor deposition method, or by the coating method at a high productivity which comprises applying a coating solution for forming such a layer (JP-A-59-50401). Moreover, there have been proposed an antiglare film having a light diffusion layer containing light-transmitting particles (JP-A-11-305010, etc.) and a method of coating the surface with a hard layer (JP-A-2002-139602, etc.).

Because of being used as the outermost face of an image display device such as a display, an antireflective film should be free from surface errors, for example, irregularities and streaks. By using the technique reported by JP-A-11-305010, however, it is feared that the antiglare properties vary depending on the change in the partial film thickness arising in the course of forming the light diffusion layer, which brings about surface errors such as irregularities and streaks.

In the case of bonding an antireflective film to the surface of a display, it is further required that the antireflective film has a scratch resistance against small scuffs due to abrasion and such a high hardness as withstanding a strong writing pressure with a hard pen or pencil.

According to the technique of JP-A-2002-139602, however, the coating film hardness cannot be elevated to a sufficient level.

With the expansion of the display market, the tendency toward large screens and the progress into data broadcasting with digitalization in recent years, it is required to improve various properties other than the antiglare properties and scratch resistance of antireflective films. Among all, problems to be immediately solved as follows: 1) improving the contrast; 2) lessening blur characters; 3) establishing definitiveness in black color in black display; and 4) relieving dazzling in the case of being bonded to a large-scaled monitor having a moderate to low resolution of about 100 ppi. Thus, it is urgently required to develop an antireflective film that has satisfactory antiglare properties and fulfills the above requirements 1) to 4) at the same time.

SUMMARY OF THE INVENTION

An aspect of an illustrative, non-limiting embodiment of the invention is to provide an optical film and an antireflective film being free from surface errors and having a high film strength. Another aspect of an illustrative, non-limiting embodiment of the invention is to provide an optical film and an antireflective film being free from surface errors and having a high film strength and excellent optical characteristics (high contrast, no blur character, definitiveness in black color, excellent dazzling and so on). Still another aspect of an illustrative, non-limiting embodiment of the invention is to provide a polarizing plate and an image display device using the optical film and the antireflective film as described above.

The inventors have conducted intensive studies to establish the above aspects and, as a result, found that the aspects can be established by the following constitution, thereby completing an exemplary embodiment of the present invention.

(1) An optical film comprising: a transparent support; and a light diffusion layer containing light-transmitting particles and a binder, wherein the light diffusion layer has an average thickness of from 7.5 to 30 μm, and the average thickness of the light diffusion layer is from 1.4 to 3.5 times as large as an average particle diameter of the light-transmitting particles.

(2) The optical film as described in the above (1), wherein the average particle diameter of the light-transmitting particles is from 3 to 12 μm.

(3) The optical film as described in the above (1) or (2), wherein the light-transmitting particles has a CV value of not more than 15%.

(4) The optical film as described in any one of the above (1) to (3), wherein a difference between a refractive index of the light-transmitting particles and a refractive index of the light diffusion layer excluding the light-transmitting particles is from 0.001 to 0.03.

(5) The optical film as described in any one of the above (1) to (4), wherein the light diffusion layer contains the light-transmitting particles in an amount of from 5 to 40% by weight based on the total solid contents of the light diffusion layer.

(6) The optical film as described in any one of the above (1) to (5), wherein the binder comprises a trifunctional or higher (meth)acrylate monomer as a main component, and the light-transmitting particles polymer particles comprising crosslinked poly((meth)acrylate) having an acryl content of from 50 to 100% by weight.

(7) The optical film as described in any one of the above (1) to (6), wherein the light diffusion layer has a pencil hardness of from 4 H to 9H.

(8) The optical film as described in any one of the above (1) to (7), wherein the light diffusion layer has an internal haze of from 0 to 60% and a surface haze of from 0.3 to 20%.

(9) The optical film as described in any one of the above (1) to (8), wherein the light diffusion layer has an arithmetic average roughness Ra of from 0.03 to 0.30 μm and an average peak-valley interval Sm of from 40 to 200 μm.

(10) The optical film as described in any one of the above (1) to (9), wherein the light-transmitting particles has a compression strength of from 4 to 10 kgf/mm$^2$.

(11) The optical film as described in any one of the above (1) to (10), further comprising a hard coat layer stacked on the light diffusion layer in a manner that changes an arithmetic average roughness Ra of a surface of the optical film.

(12) An antireflective film comprising: an optical film as described in any one of the above (1) to (11); and a low refractive index layer as an uppermost layer of the antireflective film, the low refractive index layer having a lower refractive index than the transparent support.

(13) A polarizing plate comprising: a polarizer; and two protective films, wherein at least one of the two protective films is an optical film as described in any one of the above (1) to (11) or an antireflective film as described in the above (12).

(14) An image display device comprising an optical film as described in any one of the above (1) to (11), an antireflective film as described in the above (12) or a polarizing plate as described in the above (13), wherein the light diffusion layer is provided on a viewing side of the image display device.

BRIEF DESCRIPTION OF THE DRAWINGS

The features of the invention will appear more fully upon consideration of the exemplary embodiments of the invention, which are schematically set forth in the drawings, in which:

FIG. 7A shows the cross section of the slot die 13, while

Figure 1:
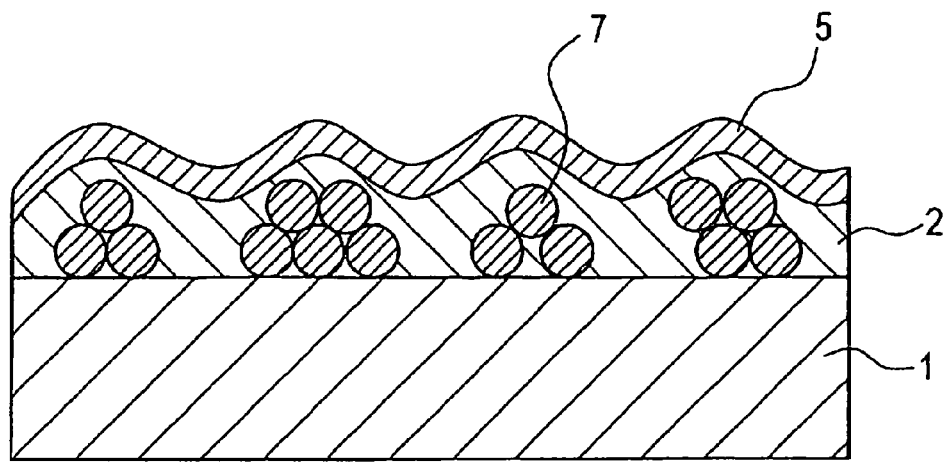
FIG. 1 is a schematic view showing a cross section of a film which is an exemplary embodiment of the invention.

In the drawings, description of the Reference Numerals and Signs are set forth below:
1 support
2 light diffusion layer
3 medium refractive index layer
4 high refractive index layer
5 low refractive index layer
6 hard coat layer
10 coater
11 backup roll
W web
13 slot die
14 coating solution
14a bead
14b coating film
15 pocket
16 slot
16a opening in slot
17 front lip
18 land
18a upstream lip land
18b downstream lip land
$I_{UP}$ land length of upstream lip land
$I_{LO}$ land length of downstream lip land
LO overbite length (difference in distance between downstream lipland 18b and web W and distance between upstream lip land 18b and web)
$G_L$ gap between front lip 17 and web W (gap between downstream lipland 18b and web)
30 existing slot die
31a upstream lip land
31b downstream lip land
32 pocket
33 slot
40 vacuum chamber
40a back plate
40b side plate
40c screw
$G_B$ gap between back plate 40a and web W
$G_S$ gap between side plate 40b and web W

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment of the invention, an optical film of the invention can be free from surface errors and can show excellent optical characteristics while sustaining a high film strength (i.e., no blur character, definitiveness in black color and excellent dazzling). A display device provided with an antireflective film of the invention or a display device provided with a polarizing plate with the use of an optical film of the invention suffer from little extraneous images or the reflection of outside light, and establish an extremely high visibility, little unevenness and excellent display qualities.

Next, the invention will be described in greater detail. In the case where a numerical value means a physical value, a characteristic value or the like, the expression "from (a numerical value 1) to (a numerical value 2)" as used herein means "(a numerical value) or more but not more than (a numerical value 2)". The expression "(meth)acrylate" as sued herein means "at least one of acrylate and methacrylate". The same applies to the expression "(meth)acrylic acid". The expression "on a support" as used herein involves both "directly on the surface of a support" and "on the surface of some layer (film) formed on a support".

An optical film of the invention has a transparent support and a light diffusion layer containing light-transmitting particles and a binder. An antireflective film of the invention has a low refractive index layer on the light diffusion layer of the optical film as described above. A layer which has a physical or optical function and is formed on or above the transparent support is called "a functional layer" herein. An optical film and antireflective film of the invention may further have other functional layer(s), if needed, in addition to these functional layers such as the light diffusion layer and the low refractive index layer.

1. Constituents of the Invention

First, various compounds usable in a film (optical film or antireflective film) of the invention will be illustrated.

First of all, components to be used for forming a binder, for example, an ionizing radiation curable compound, an organosilane compound employed if necessary, an initiator and so on will be illustrated.

1-(1) Polyfunctional Monomer and Polyfunctional Oligomer

A functional layer in a film of the invention can be formed by a crosslinking reaction or polymerization of an ionizing radiation curable compound. Namely, a coating composition, which contains an ionizing radiation curable polyfunctional monomer or polyfunctional oligomer as a component for forming a binder, is coated on a transparent support or underlayer of the functional layer and then the polyfunctional monomer or the polyfunctional oligomer is crosslinked or polymerized. Thus, the functional layer can be formed.

As the functional group in the polyfunctional monomer or the polyfunctional oligomer, use is preferably made of a functional group capable of undergoing polymerization when exposed to light, an electron beam or radiation. In particular, a photopolymerizable functional group is preferable therefor.

Examples of the photopolymerizable functional group include unsaturated polymerizable functional groups such as a (meth)acryloyl group, a vinyl group, a styryl group and an allyl group. Among all, a (meth)acryloyl group is preferred.

Specific examples of the photopolymerizable polyfunctional monomers having a photopolymerizable functional group include:

alkylene glycol(meth)acrylic diesters such as neopentyl glycol acrylate, 1,6-hexanediol(meth)acrylate and propylene glycol di(meth)acrylate;

polyoxyalkylene glycol(meth)acrylic diesters such as triethylene glycol di(meth)acrylate, dipropylene glycol di(meth)acrylate, polyethylene glycol di(meth)acrylate and polypropylene glycol di(meth)acrylate;

polyhydric alcohol(meth)acrylic diesters such as pentaerythritol di(meth)acrylate; and ethylene oxide or propylene oxide adduct (meth)acrylic diesters such as 2,2-bis{4-(acryloxy diethoxy) phenyl}propane and 2-2-bis{4-(acryloxy polypropoxy) phenyl}propane.

As the photopolymerizable polyfunctional monomer, furthermore, use can be preferably made of an epoxy(meth)acrylate, an urethane (meth)acrylate or a polyester (meth)acrylate.

Among all, an ester of a polyhydric alcohol with (meth) acrylic acid is preferred. A polyfunctional monomer having three or more (meth)acryloyl groups per molecule is more preferable. Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth) acrylate, (di)pentaerythritol hexa(meth)acrylate, tripentaerythritol triacrylate and tripentaerythritol hexatriacrylate.

As the monomer binder, use can be made of monomers having different refractive indexes to control the refractive index of each layer. Examples of a monomer having a high refractive index include bis(4-methacryloylthiophenyl)sulfide, vinyl naphthalene, vinyl phenyl sulfide and 4-methacryloyloxyphenyl-4'-methoxyphenyl thioether.

Furthermore, it is possible to use a dendrimer as described in, for example, JP-A-2005-76005 and JP-A-2005-36105 and a norbornene ring-containing monomer as described in, for example, JP-A-2005-60425.

It is also possible to use two or more of these polyfunctional monomers together.

Such monomers having an ethylenically unsaturated bond can be polymerized by irradiating with ionizing radiation or heating in the presence of a photo radical polymerization initiator or a heat polymerization initiator.

That is, a photopolymerization initiator is preferably employed in polymerizing a photopolymerizable polyfunctional monomer. As the photopolymerization initiator, a photo radical polymerization initiator and a photo cationic polymerization initiator are preferable and a photo radical polymerization initiator is still preferable.

1-(2) Polymer Binder

In the film of the invention, an uncrosslinked polymer or a crosslinked polymer is usable as the binder component. It is preferable that a crosslinked polymer has an anionic group. Such a crosslinked polymer having an anionic group has a structure wherein the main chain of the polymer having an anionic group is crosslinked.

Examples of the polymer main chain include a polyolefin (a saturated hydrocarbon), a polyether, a polyurea, a polyurethane, a polyester, a polyamine, a polyamide and a melamine resin. A polyolefin main chain, a polyether main chain and a polyurea main chain are preferred, a polyolefin main chain and a polyether main chain are more preferred and a polyolefin main chain is most preferred.

A polyolefin main chain comprises a saturated hydrocarbon. The polyolefin main chain can be obtained by, for example, the addition polymerization of an unsaturated polymerizable group. A polyether main chain has repeating units bonded together via ether bonds (—O—). The polyether main chain can be obtained by, for example, the ring-opening polymerization of an epoxy group. A polyurea main chain has repeating units bonded together via urea bonds (—NH—CO—NH—). The polyurea main chain can be obtained by, for example, the condensation polymerization of an isocyanate group with an amino group. A polyurethane main chain has repeating units bonded together via urethane bonds (—NH—CO—O—). The polyurethane main chain can be obtained by, for example, the condensation polymerization of an isocyanate group and a hydroxyl group (including an N-methylol group). A polyester main chain has repeating units bonded together via ester bonds (—CO—O—). The polyester main chain can be obtained by, for example, the condensation polymerization of a carboxyl group (including an acid halide group) and a hydroxyl group (including an N-methylol group). A polyamine main chain has repeating units bonded together via imino bonds (—NH—). The polyamine main chain can be obtained by, for example, the ring-opening polymerization of an ethyleneimine group. A polyamide main chain has repeating units bonded together via amide bonds (—NH—CO—). The polyamide main chain can be obtained by, for example, reacting an isocyanate group with a carboxyl group (including an acid halide group). A melamine resin main chain can be obtained by, for example, condensation reaction of a triazine group (for example, melamine) with an aldehyde (for example, formaldehyde). In the melamine resin, the main chain per se has a crosslinked structure.

The anionic group is attached to the main chain either directly or via a linking group. It is preferable that the anionic group is attached, as a side chain, to the main chain via a linking group.

Examples of the anionic group include a carboxylate group (carboxyl), a sulfonate group (sulfo) and a phosphate group (phosphono) and a sulfonate group and a phosphate group are preferred.

The anionic group may be in the form of a salt. As the cation forming such a salt together with the anionic acid, an alkali metal ion is preferable. The proton in the anionic group may be dissociated.

It is preferable that the linking group linking the anionic chain to the polymer main chain is a divalent group selected from among —CO—, —O—, an alkylene group, an arylene group and a combination thereof.

A crosslinked structure has two or more main chains bonded (preferably covalently bonded) to each other and it is preferable to have three or more main chains covalently bonded together. It is also preferable that the crosslinked structure comprises a divalent or higher group selected from among —CO—, —O—, —S—, a nitrogen atom, a phosphorus atom, an aliphatic residue, an aromatic residue and a combination thereof.

It is preferable that the crosslinked polymer having an anionic group is a copolymer which has a repeating unit having an anionic group and a repeating unit having a crosslinked structure. In the copolymer, the content of the repeating unit having an anionic group ranges preferably from 2 to 96% by weight, more preferably from 4 to 94% by weight and most preferably from 6 to 92% by weight. The repeating unit may have two or more anionic groups. In the copolymer, the content of the repeating unit having a crosslinked structure ranges preferably from 4 to 98% by weight, more preferably from 6 to 96% by weight and most preferably from 8 to 94% by weight.

The repeating unit of the crosslinked polymer having an anionic group may have both of an anionic group and a crosslinked structure. Also, the polymer may contain another repeating unit (i.e., a repeating unit having neither anionic group nor crosslinked structure).

As another repeating unit, a repeating unit having an amino group or a quaternary ammonium group and a repeating unit having a benzene ring are preferable. Similar to an anionic group, an amino group or a quaternary ammonium group has a function of maintaining the dispersion state of inorganic particles. Similar effects can be obtained in the case where an amino group, a quaternary ammonium group or a benzene ring are contained in the repeating unit having an anionic group or the repeating unit having a crosslinked structure.

In the repeating unit having an amino group or a quaternary ammonium group, the amino group or the quaternary ammonium group may be attached to the main chain of the polymer either directly or via a linking group. It is preferable that the amino group or the quaternary ammonium group is attached, as a side chain, to the main chain via a linking group. It is preferable that the amino group or the quaternary ammonium group is a secondary amino group, a tertiary amino group or a quaternary ammonium group and a tertiary amino group or a quaternary ammonium group is more preferable. The group attached to the nitrogen atom in a secondary amino group, a tertiary amino group or a quaternary ammonium group is preferably an alkyl group, more preferably an alkyl group having from 1 to 12 carbon atoms and more preferably an alkyl group having from 1 to 6 carbon atoms. The counter ion of the quaternary ammonium group is preferably a halide ion. It is preferable that the linking group linking the amino group or the quaternary ammonium group to the polymer main chain is a divalent group selected from among —CO—, —NH—, —O—, an alkylene group, an arylene group and a combination thereof. In the case where the crosslinked polymer having an anionic group contains a repeating unit having an amino group or a quaternary ammonium group, the content thereof preferably ranges from 0.06 to 32% by weight, more preferably from 0.08 to 30% by weight and most preferably from 0.1 to 28% by weight.

1-(3) Fluoropolymer Binder

In a film of the invention (in particular, a low refractive layer in an antireflective film of the invention), use can be preferably made of a fluoropolymer as a binder component.

Examples of a fluorovinyl monomer for forming a fluoropolymer include a fuluoroolefin (for example, fluoroethylene, vinylidene fluoride, tetrafluoroethylene, and hexafluoropropylene), a partly or completely fluorinated alkyl ester of (meth)acrylic acid (for example, VISCOAT 6FM™ (manufactured by OSAKA ORGANIC CHEMICAL), and R-2020™ (manufactured by DAIKIN INDUSTRIES)) and a completely or partly fluorinated vinyl ether. Among all, a perfluoroolefin is preferable and hexafluoropropylene is particularly preferable from the viewpoints of transparency and availability. Although the refractive index can be lowered with an increase in the composition ratio of such a fluorovinyl monomer, the film strength is lowered thereby. It is preferable in the invention to employ the fluorovinyl monomer in such an amount as to give a fluorine content in the fluoropolymer of from 20 to 60% by weight, more preferably from 25 to 55% by weight and particularly preferably from 30 to 50% by weight.

As main examples of the constituting units for imparting crosslinking reactivity to the fluoropolymer, the following units (A), (B) and (C) may be cited.

(A) A constituting unit obtained by polymerizing a monomer preliminarily having a self-crosslinkable functional group in its molecule such as glycidyl (meth)acrylate and glycidyl vinyl ether.

(B) A constituting unit obtained by polymerizing a monomer having a carboxyl group, a hydroxy group, an amino group, a sulfo group or the like (for example, (meth)acrylic acid, methylol (meth)acrylate, hydroxyalkyl(meth)acrylate, allyl acrylate, hydroxyethyl vinyl ether, hydroxybutyl vinyl ether, maleic acid and crotonic acid).

(C) A constituting unit obtained by reacting a compound having a group capable of reacting with the functional group in (A) or (B) and another crosslinkable functional group in its molecule with a constituting unit (A) or (B) as described above (for example, a constituting unit synthesized by treating acrylic acid chloride with a hydroxy group).

In the constituting unit (C) as described above, it is preferable that the crosslinkable functional group other than the group capable of reacting with the functional group in (A) or (B) is a photopolymerizable group. Examples of the photopolymerizable group include a (meth)acryloyl group, an alkenyl group, a cinnamoyl group, a cinnamylideneacetyl group, a benzalacetophenone group, a styrylpyridine group, an α-phenylmaleimide group, a phenylazide group, a sulfoazide group, a carbonxylazide group, a diazo group, an o-quinonediazide group, a furylacryloyl group, a coumarine group, a pyrrone group, an anthracene group, a benzophenone group, a stilbene group, a xanthate group, a 1,2,3-thiadiazole group, a cyclopropene group and an azadioxabicyclo group. Either one of these groups or a combination of two or more thereof may be used. Among them, a (meth)acryloyl group and a cinnamoyl group are preferable and a (meth)acryloyl group is particularly preferred.

Specific examples of a method of preparing a photopolymerizable group-containing copolymer are as follows, though the invention is not restricted thereto.

a. A method which comprises reacting a crosslinkable functional group-containing copolymer having hydroxyl group with (meth)acrylic acid chloride to give an ester.

b. A method which comprises reacting a crosslinkable functional group-containing copolymer having hydroxyl group with a (meth)acrylic acid ester having isocyanate group to give an urethane.

c. A method which comprises reacting a crosslinkable functional group-containing copolymer having epoxy group with (meth)acrylic acid to give an ester.

d. A method which comprises reacting a crosslinkable functional group-containing copolymer having carboxyl group with (meth)acrylic acid ester having epoxy group to give an ester.

The photopolymerizable group may be introduced in an arbitrarily controlled amount. From the viewpoints of improving the coating film face stability, lessening surface errors in the coexistence with inorganic particles and elevating film strength, it is also preferable to remain a definite amount of carboxyl group or hydroxyl group.

In the fluoropolymer useful in the invention, the constituting units (i.e., the repeating unit derived from the fluorovinyl monomer and the repeating unit having (meth)acryloyl group in its side chain for imparting the crosslinking reactivity) may be appropriately copolymerized with other vinyl monomer(s), if desired, from the viewpoints of the adhesiveness to a substrate, Tg (contributing to the coating film strength) of the polymer, solubility in a solvent, transparency, slipperiness, resistance to dusts and debris and so on. A plural number of vinyl monomers may be combined depending on the purpose. It is preferable that these monomer(s) are introduced in an amount of from 0 to 65% by mol based on the fluoropolymer, more preferably from 0 to 40% by mol and particularly preferably from 0 to 30% by mol.

Such a monomer usable together is not particularly restricted. Namely, examples thereof include olefins (for example, ethylene, propylene, isoprene, vinyl chloride and vinylidene chloride), acrylic acid esters (for example, methyl acrylate, ethyl acrylate, 2-ethylhexyl acrylate and 2-hydroxyethyl acrylate), methacrylic acid esters (for example, methyl methacrylate, ethyl methacrylate, butyl methacrylate and 2-hydroxyethyl methacrylate), styrene derivatives (for example, styrene, p-hydroxymethylstyrene and p-methoxystyrene), vinyl ethers (for example, methyl vinyl ether, ethyl vinyl ether, cyclohexyl vinyl ether, hydroxyethyl vinyl ether and hydroxybutyl vinyl ether), vinyl esters (for example, vinyl acetate, vinyl propionate and vinyl cinnamate), unsaturated carboxylic acids (for example, acrylic acid, methacrylic acid, crotonic acid, maleic acid and itaconic acid), acrylamides (for example, N,N-dimethylacrylamide, N-tert-butylacrylamide and N-cyclohexylacrylamide), methacrylamides (for example, N,N-dimethylmethacrylamide) and acrylonitrile.

A particularly useful fluoropolymer in the invention is a random copolymer of a perfluoroolefin with a vinyl ether or a vinyl ester. In particular, a fluoropolymer having a group crosslinkable alone (for example, radical-reactive groups such as (meth)acryloyl group, and ring-opening polymerizable group such as epoxy group and oxetanyl group) is preferred. The content of the crosslinking reactive group-containing polymerization unit preferably amounts to 5 to 70% by mol, still preferably 30 to 60% by mol, of the total polymerization units. As preferable polymers, there can be enumerated those described in JP-A-2002-243907, JP-A-2002-372601, JP-A-2003-26732, JP-A-2003-222702, JP-A-2003-294911, JP-A-2003-329804, JP-A-2004-4444 and JP-A-2004-45462.

It is also preferable that the fluoropolymer preferably usable in the invention has a polysiloxane structure which has been introduced thereinto to impart antifouling properties. The polysiloxane structure may be introduced by an arbitrary method without restriction. For example, it is preferable to employ a method of introducing a polysiloxane block copolymerization component with the use of a silicone macroazo initiator as reported by JP-A-11-189621, JP-A-11-228631 and JP-A-2000-313709, or a method of introducing a polysiloxane graft copolymerization component with the use of a silicone macromer as reported by JP-A-2-251555 and JP-A-2-308806. As particularly preferable compounds, there can be enumerated the polymers described in EXAMPLES 1, 2 and 3 in JP-A-11-189621 and the copolymers A-2 and A-3 described in JP-A-2-251555. Such a polysiloxane component is preferably employed in an amount of from 0.5 to 10% by weight, particularly preferably from 1 to 5% by weight in the polymer.

The molecular weight of the fluoropolymer preferably usable in the invention is preferably 5,000 or more, more preferably from 10,000 to 500,000 and most preferably from 15,000 to 200,000, expressed in weight-average molecular weight. By using polymers having different molecular weights together, it is possible to improve the surface properties and scratch resistance of the coating film.

In the above polymers, use may be made of appropriate curing agents having a polymerizable unsaturated group as described in JP-A-10-25388 and JP-A-2000-17028. It is also preferable to use a fluorine-containing compound having a polyfunctional unsaturated group as described in JP-A-2002-145952. As examples of the compound having a polyfunctional unsaturated group, there can be enumerated the polyfunctional monomers as cited above. Among these compounds, it is particularly preferable to employ a compound having a polyfunctional unsaturated group in the polymer per se, since a remarkable effect of improving the scratch resistance can be established thereby.

1-(4) Organosilane Compound

In a film of the invention, it is preferable that at least one of the layers constituting the same contains, in the coating solution for the formation thereof, at least one of the hydrolysate of an organosilane compound and/or its partial condensation product as a so-called sol component (hereinafter also called so) from the viewpoint of the scratch resistance.

In the antireflective film, it is particularly preferable that the low refractive index layer and the light diffusion layer both contain a sol component so as to establish both of favorable antireflective properties and high scratch resistance. After applying and drying the coating solution, the sol component undergoes condensation in the course of heating to form a cured product, which becomes a part of these layers. In the case where the cured product has a polymerizable unsaturated bond, a binder having a three dimensional structure is formed upon the irradiation with an active ray.

As the organosilane compound, use may be preferably made of one which is represented by formula 1: $(R^1)_m$—Si$(X)_{4-m}$.

In the above formula 1, $R^1$ represents a substituted or unsubstituted alkyl group or a substituted or unsubstituted aryl group. As the alkyl group, it is preferable to use one having from 1 to 30 carbon atoms, still preferably from 1 to 16 carbon atoms and particularly preferably from 1 to 6 carbon atoms. Specific examples of the alkyl group include methyl, ethyl, propyl, isopropyl, hexyl, decyl and hexadecyl groups. Examples of the aryl group include phenyl and naphthyl groups and a phenyl group is preferred.

X represents a hydroxyl group or a hydrolyzable group. As the hydrolyzable group, citation may be made of alkoxy groups (preferably having from 1 to 5 carbon atoms such as methoxy and ethoxy groups), halogen atoms (for example, Cl, Br and I) and $R^2COO$ (wherein $R^2$ preferably represents a hydrogen atom or an alkyl group having from 1 to 5 carbon atoms, such as $CH_3COO$ and $C_2H_5COO$). An alkoxy group is preferable and a methoxy group or an ethoxy group is still preferable.

m is an integer of from 1 to 3, preferably 1 or 2.

In the case where there are a plurality of Xs, they may be either the same or different.

Although the substituent occurring in $R^1$ is not particularly restricted, examples thereof include a halogen atoms (for example, a fluorine, chlorine or bromine atom), a hydroxyl group, a mercapto group, a carboxyl group, an epoxy group, an alkyl group (for example, methyl, ethyl, i-propyl, propyl, n-propyl, or t-butyl), an aryl group (for example, phenyl or naphthyl), an aromatic heterocyclic group (for example, furyl, pyrazolyl or pyridyl), an alkoxy group (for example, methoxy, ethoxy, i-propoxy or hexyloxy), an aryloxy group (for example, phenoxy), an alkylthio groups (for example, methylthio or ethylthio), an arylthio groups (for example, phenylthio), an alkenyl groups (for example, vinyl or 1-propenyl), an acyloxy group (for example, acetoxy, acryloyloxy or methacryloyloxy), an alkoxycarbonyl group (for example, methoxycarbonyl or ethoxycarbonyl), an aryloxycarbonyl group (for example, phenoxycarbonyl), a carbamoyl group (for example, carbamoyl, N-methylcarbamoyl, N,N-dimethylcarbamoyl or N-methyl-N-octylcarbamoyl), and an acylamino group (for example, acetylamino, benzoylamino, acrylamino or methacrylamino). These substituents may be further substituted by the above-described substituents.

It is preferable that $R^1$ is a substituted alkyl group or a substituted aryl group.

In the case where there are a plurality of $R^1$s, these $R^1$s may be either the same or different.

Use may be made of two or more of the compounds of the formula 1.

As the organosilane compound to be used in the invention, it is also preferable to use an organosilane compound having a vinyl-polymerizable substituent represented by formula 2 below. The compound of the formula 2 can be synthesized by using two compounds of the formula 1 as described above as the starting materials.

Formula 2:

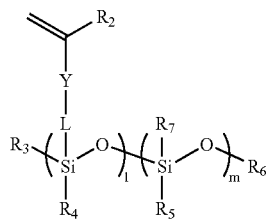

In the above formula 2, $R_2$ represents a hydrogen atom, a methyl group, a methoxy group, an alkoxycarbonyl group, a cyano group, a fluorine atom or a chlorine atom. As the alkoxycarbonyl group, a methoxycarbonyl group, an ethoxycarbonyl group or the like may be cited. A hydrogen atom, a methyl group, a methoxy group, a methoxycarbonyl group, a cyano group, a fluorine atom or a chlorine atom is preferred, still preferably, a hydrogen atom, a methyl group, a methoxycarbonyl group, a fluorine atom or a chlorine atom, and particularly preferably a hydrogen atom or a methyl group.

Y represents a single bond, *—COO—**, *—CONH—** or *—O—**, preferably a single bond, *—COO—** or *—CONH—**, still preferably a single bond or *—COO—**, and particularly preferably *—COO—**. * stands for the binding site to =C($R_2$) and ** stands for the binding site to L.

L represents a divalent linking group. Specific examples thereof include a substituted or unsubstituted alkylene group, a substituted or unsubstituted arylene group, a substituted or unsubstituted alkylene group having a liking group (for example, ether, ester or amide) within its molecule, and a substituted or unsubstituted arylene group having a liking group within its molecule. Preferable examples thereof include a substituted or unsubstituted alkylene group, a substituted or unsubstituted arylene groups and an alkylene groups containing a linking group therein; still preferably an unsubstituted alkylene group, an unsubstituted arylene group and an alkylene group having an ether or ester linking group therein; and particularly preferably an unsubstituted alkylene group or an alkylene group having an ether or ester linking group therein. Examples of the substituent include a halogen atom, a hydroxyl group, a mercapto group, a carboxyl group, an epoxy group, an alkyl group and an aryl group. These substituents may be further substituted.

l and m respectively represent the content (% by mol) of the two components. l represents a numerical value satisfying the formula l=100−m, while m represents a numerical value ranging from 0 to 50. It is preferable that m is from 0 to 40, particularly preferably form 0 to 30.

$R_3$ to $R_6$ preferably represent each a halogen atom, a hydroxyl group, an unsubstituted alkoxy group or an unsubstituted alkyl group. It is more preferable that $R_3$ to $R_5$ represent each a chlorine atom, a hydroxyl group or an unsubstituted alkoxy group having from 1 to 6 carbon atoms, more preferably a hydroxyl group or an alkoxy group having from 1 to 3 carbon atoms and particularly preferably a hydroxyl group or a methoxy group.

$R_6$ represents a hydrogen atom, an alkyl group, an alkoxy group, an alkoxycarbonyl group, a cyano group, a fluorine atom or a chlorine atom. Examples of the alkyl group include methyl and ethyl groups, examples of the alkoxy group include methoxy and ethoxy groups, and examples of the alkylcarbonyl group include methoxycarbonyl and ethoxycarbonyl group. Among them, a hydrogen atom, a methyl group, a methoxy group, a methoxycarbonyl group, a cyano group, a fluorine atom or a chlorine atom is preferable. A hydrogen atom, a methyl group, a methoxycarbonyl group, a fluorine atom or a chlorine atom is more preferable, and a hydrogen atom or a methyl group is particularly preferable.

$R_7$ has the same meaning as $R^1$ in the above formula 1. A hydroxyl group or an unsubstituted alkyl group is preferable, a hydroxyl group or an alkyl group having from 1 to 3 carbon atoms is more preferable and a hydroxyl group or a methyl group is particularly preferable therefor.

Next, specific examples of the starting materials for the compounds represented by the formula 1 will be presented, though the invention is not restricted thereto. A compound of the formula 2 can be synthesized by using two of the compounds of the formula 1 as the starting materials.

M-1

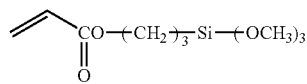

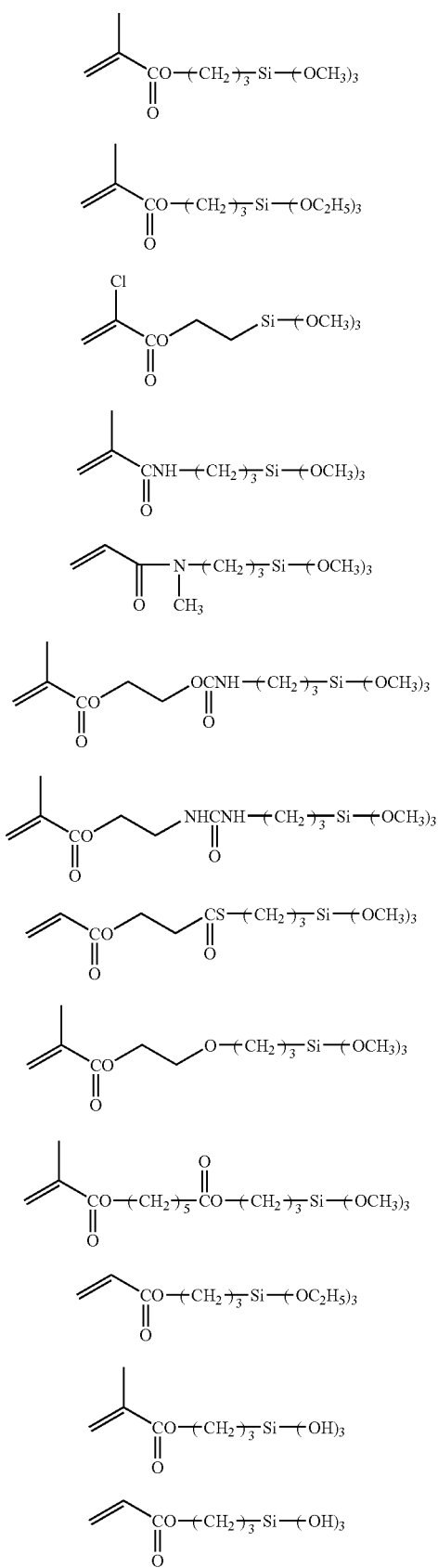
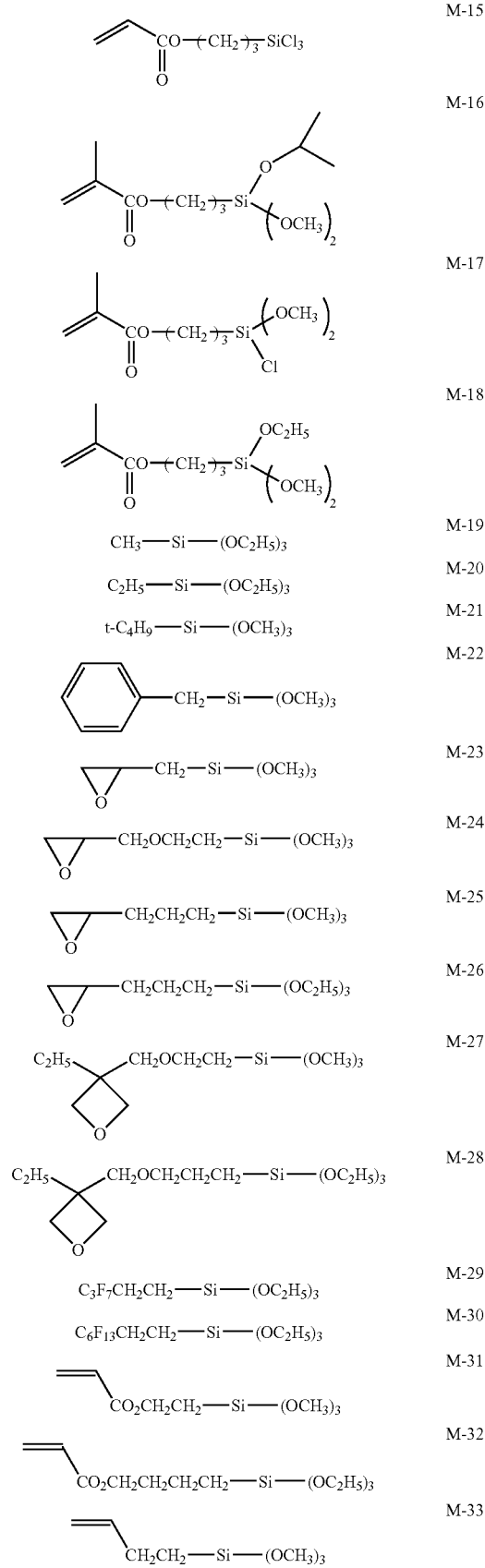

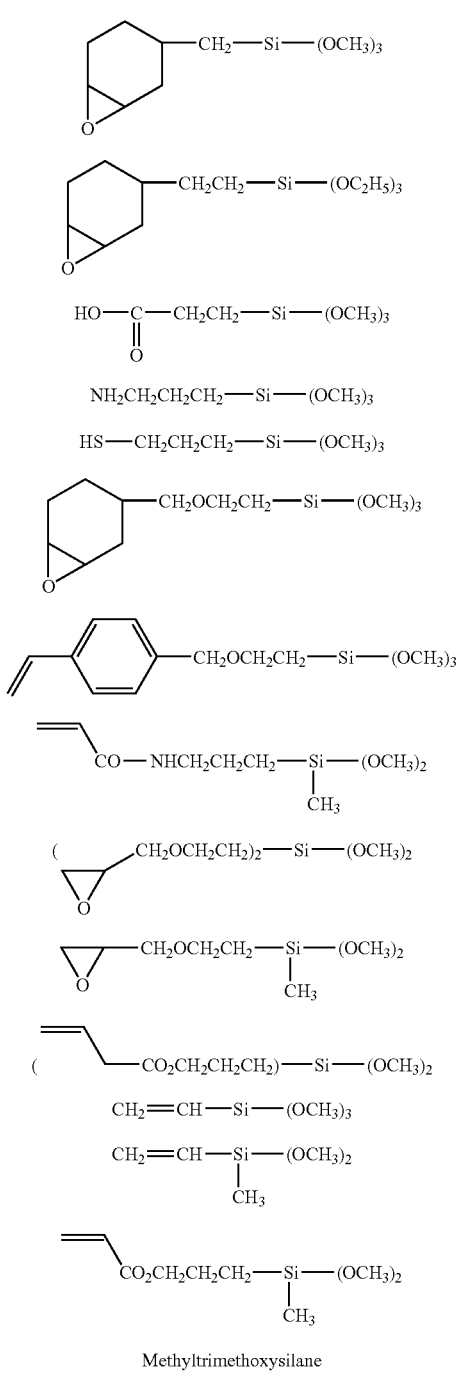

Methyltrimethoxysilane M-48

Among these specific examples, (M-1), (M-2) and (M-25) are particularly preferred as the organosilane having a polymerizable group.

To establish the advantages of the invention, the content of the above-described organosilane containing vinyl-polymerizable group is preferably from 30% by weight to 100% by weight, still preferably from 50% by weight to 100% by weight, still preferably from 70% by weight to 95% by weight, based on the total content of the organosilane hydrolysate and/or its partial condensation product. It is desirable that the content of the above-described organosilane containing vinyl-polymerizable group is not less than 30% by weight, since there arises no trouble such as formation of solid matters, clouding in the solution, worsening in the pot life, difficulties in molecular weight control (i.e., increase in the molecular weight) or little improvement in the performance (for example, scratch resistance of antireflective film) in polymerization due to a small content of the polymerizable group in this case. To synthesize the compound represented by the formula 2, it is preferable to combine an organosilane containing vinyl-polymerizable group selected between (M-1) and (M-2) with another organosilane containing no vinyl-polymerizable group selected from among (M-19) to (M-21) and (M-48) at the ratio as described above.

To stabilize the coating performance, it is preferable to regulate the volatility of at least one of the organosilane hydrolysate and its partial condensation product preferably usable in the invention. More specifically speaking, the volatilization amount at 105° C. per hour is preferably 5% by weight or less, more preferably 3% by weight or less and particularly preferably 1% by weight or less.

The sol component to be used in the invention is prepared by hydrolyzing and/or partly condensing the organosilane as described above.

The hydrolysis/condensation reaction is conducted by adding from 0.05 to 2.0 mol, preferably from 0.1 to 1.0 mol, of water per mol of the hydrolyzable group (X) to the organosilane and then stirring the obtained mixture in the presence of a catalyst usable in the invention at 25 to 100° C.

At least in one of the organosilane hydrolysate and its partial condensation product usable in the invention, the weight-average molecular weight of the organosilane hydrolysate and/or its partial condensation product containing the above-described vinyl-polymerizable group, in the case of eliminating components of molecular weight less than 300, preferably ranges from 450 to 20000, still preferably from 500 to 10000, still preferably from 550 to 5000 and most preferably from 600 to 3000.

In the components having molecular weight of 300 or more contained in the organosilane hydrolysate and/or its partial condensation product, the content of components having molecular weight of 20000 or more is preferably not more than 10% by weight, still preferably not more than 5% by weight and still preferably not more than 3% by weight. In the case where the content of the components having molecular weight of 20000 or more is not more than 10% by weight, a cured film obtained by curing such an organosilane hydrolysate and/or its partial condensation product has sufficient transparency and adhesiveness to a substrate.

The weight-average molecular weight and the molecular weight are values expressed in terms of polystyrene which are measured with a GPC analyzer provided with TSKgel GMHxL®, TSKgel G4000HxL® and TSKgel G2000HxL® (each manufactured by TOSOH CO.) columns by using THF as a solvent and a differential refractometer. The content corresponds to the peak area percentage in the molecular weight range as defined above, referring the peak area of the components having molecular weight of not less than 300 as to 100%.

The degree of dispersion (weight-average molecular weight/number-average molecular weight) preferably ranges from 3.0 to 1.1, still preferably from 2.5 to 1.1, still preferably from 2.0 to 1.1 and particularly preferably from 1.5 to 1.1.

The condensation state of X as —OSi in the formula 1 can be confirmed of by $^{29}$Si—NMR analysis of the organosilane hydrolysate and its partial condensation product usable in the invention.

When T3 shows the case where three Si bonds are condensed as —OSi, T2 shows the case where two Si bonds are condensed as —OSi, T1 shows the case where one Si bond is condensed as —Osi and T0 shows no Si is condensed, the degree of condensation (α) is expressed by numerical formula (II) below.

$$\alpha=(T3\times3+T2\times2+T1\times1)/3/(T3+T2+T1+T0) \quad \text{Numerical formula (II)}$$

The degree of condensation (α) preferably ranges from 0.2 to 0.95, still preferably from 0.3 to 0.93 and particularly preferably from 0.4 to 0.9.

When the degree of condensation (α) is not lower than the lower limit as specified above, the hydrolysis or condensation can sufficiently proceed and no increase is observed in the monomer components. As a result, a sufficiently cured film can be obtained. When the degree of condensation (α) is not higher than the upper limit as specified above, the hydrolysis or condensation do not excessively proceed and thus there remains the hydrolyzable group in an appropriate amount. Thus, excellent effects can be obtained without worsening the interactions among the binder polymer, a resin substrate, inorganic fine particles and so on.

Next, the organosilane hydrolysate and its partial condensation product usable in the invention will be described in greater detail.

The hydrolysis of the organosilane and the following condensation thereof are generally carried out in the presence of a catalyst. Examples of the catalyst include inorganic acids such as hydrochloric acid, sulfuric acid and nitric acid; organic acids such as oxalic acid, acetic acid, butyric acid, maleic acid, citric acid, formic acid, methanesulfonic acid and toluenesulfonic acid; inorganic bases such as sodium hydroxide, potassium hydroxide and ammonia; organic bases such as triethylamine and pyridine; metal alkoxides such as triisopropoxyaluminum, tetrabutoxyzirconium, tetrabutyl titanate and dibutyltin dilaurate; metal chelate compounds carrying Ar, Ti, Al, etc. as the central metal atom; and fluoro compounds such as KF and $NH_4F$.

Either one of these catalysts or a combination of two or more thereof may be used.

The hydrolysis and/or condensation of the organosilane can be carried out either in the absence of any solvent or in a solvent. As the solvent, it is preferable to employ an organic solvent so as to homogeneously mix the components. For example, use may be appropriately made of an alcohol, an aromatic hydrocarbon, an ether, a ketone or an ester.

It is preferable to use a solvent in which the organosilane and a catalyst are soluble. From the viewpoint of production procedure, it is favorable that the organic solvent is employed as a coating solution or a portion of the coating solution. Thus, it is favorable to employ a solvent which would not worsen the solubility or dispersibility when mixed with other materials such as the fluoropolymer.

As examples of the alcohol, monohydric alcohols and dihydric alcohols may be cited. As monohydric alcohols, saturated aliphatic alcohols having from 1 to 8 carbon atoms are preferable.

Specific examples of the alcohol include methanol, ethanol, n-propyl alcohol, i-propyl alcohol, n-butyl alcohol, sec-butyl alcohol, tert-butyl alcohol, ethylene glycol, diethylene glycol, triethylene glycol and ethylene glycol monobutyl ether.

Specific examples of the aromatic hydrocarbon include benzene, toluene and xylene. Specific examples of the ether include tetrahydrofuran and dioxane. Specific examples of the ketone include acetone, methyl ethyl ketone, methyl isobutyl ketone, diisobutyl ketone, cyclohexanone and ethylene glycol acetate monoethyl ether. Specific examples of the ester include methyl acetate, propyl acetate, butyl acetate and propylene carbonate.

Either one of these organic solvents or a mixture of two or more thereof may be used. The concentration of the solid matters in the solvent to be used in the hydrolysis and/or condensation of the organosilane is usually from 1% by weight to 100% by weight, though the invention is not restricted thereto.

The hydrolysis is conducted by adding to the organosilane from 0.05 to 2 mol, preferably from 0.1 to 1 mol, per mol of the hydrolyzable group in the organosilane and then stirring the obtained mixture at 25 to 100° C. in the presence or absence of the solvent as described above and in the presence of the catalyst.

In the invention, it is preferable to conduct the hydrolysis by stirring at 25 to 100° C. in the presence of at least one metal chelate compound having an alcohol represented by the formula $R^3OH$ (wherein $R^3$ represents an alkyl group having from 1 to 10 carbon atoms) and a compound represented by the formula $R^4COCH_2COR^5$ (wherein $R^4$ represents an alkyl group having from 1 to 10 carbon atoms, and $R^5$ represents an alkyl group having from 1 to 10 carbon atoms or an alkoxy group having from 1 to 10 carbon atoms) as a ligand and carrying a metal selected from among Zr, Ti and Al as the central metal atom.

In the case of using a fluoro compound as a catalyst, alternatively, the F-containing compound is capable of completely proceeding the hydrolysis/condensation. Therefore, the degree of polymerization can be determined by appropriately determining the amount of water to be added. This is preferable, since the molecular weight can be freely determined at any level. That is to say, an organosilane hydrolysate/partly condensation product having an average degree of polymerization M can be prepared by using M mol of hydrolyzable organosilane and (M-1) mol of water.

An arbitrary metal chelate compound may be used without particular restriction, so long as it is a metal chelate compound having an alcohol represented by the formula $R^3OH$ (wherein $R^3$ represents an alkyl group having from 1 to 10 carbon atoms) and a compound represented by the formula $R^4COCH_2COR^5$ (wherein $R^4$ represents an alkyl group having from 1 to 10 carbon atoms, and $R^5$ represents an alkyl group having from 1 to 10 carbon atoms or an alkoxy group having from 1 to 10 carbon atoms) as a ligand and carrying a metal selected from among Zr, Ti and Al as the central metal atom. Two or more metal chelate compounds may be used within this scope. The metal chelate compound to be used in the invention, which is preferably one selected from the group consisting of compounds represented by the formulae $Zr(OR^3)_{p1}(R^4COCHCOR^5)_{p2}$, $Ti(OR^3)_{q1}(R^4COCHCOR^5)_{q2}$ and $Al(OR^3)_{r1}(R^4COCHCOR^5)_{r2}$, has a function of promoting the condensation of the organosilane hydrolysate and/or its partial condensation product.

In the metal chelate compound, $R^3$ and $R^4$ may be either the same or different and each represents an alkyl group having from 1 to 10 carbon atoms such as an ethyl, n-propyl, i-propyl, n-butyl, sec-butyl, t-butyl, n-pentyl or phenyl group. $R^5$ represents the same alkyl group having from 1 to 10 carbon atoms as described above or an alkoxy group having from 1 to 10 carbon atoms such as a methoxy, ethoxy, n-propoxy, i-propoxy, n-butoxy, sec-butoxy or t-butoxy group. p1, p2, q1, q2, r1 and r2 in the metal chelate compounds respectively represent integers satisfying p1+p2=4, q1+q2=4 and r1+r2=3.

Specific examples of these metal chelate compounds include zirconium chelate compounds such as tri-n-butoxy-ethylacetoacetate zirconium, di-n-butoxybis(ethylacetoacetate)zirconium, n-butoxytris(ethylacetoacetate)zirconium, tetrakis(n-propylacetoacetate)zirconium, tetrakis(acetylacetoacetate)zirconium and tetrakis(ethylacetoacetate)zirconium; titanium chelate compounds such as diisopropoxy bis (ethylacetoacetate) titanium, diisopropoxy bis(acetylacetate) titanium and diisopropoxy bis(acetylacetone) titanium; and aluminum chelate compounds such as diisopropoxyethylacetoacetate aluminum, diisopropoxyacetylacetonate aluminum, isopropoxybis(ethylacetoacetate) aluminum, isopropoxybis(acetylacetonate) aluminum, tris(ethylacetoacetate) aluminum, tris(acetylacetonate) aluminum and monoacetylacetonate bis(ethylacetoacetate) aluminum.

Among these metal chelate compounds, tri-n-butoxyethylacetoacetate zirconium, diisopropoxy bis(acetylacetonate) titanium, diisopropyloxyethylacetoacetate aluminum and tris (ethylacetoacetate) aluminum are preferable. One of these metal chelate compounds may be used alone. Alternatively, a mixture of two or more thereof may be used. Also, use can be made of a partly hydrolyzed product of such a metal chelate compound.

It is preferable to use the metal chelate compound a in an amount of from 0.01 to 50% by weight, still preferably from 0.1 to 50% by weight and still preferably from 0.5 to 10% by weight based on the organosilane compound as described above. So long as the metal chelate compound is employed in an amount falling within the range as specified above, the condensation reaction quickly proceeds, the obtained coating film has a favorable durability and the composition containing the organosilane hydrolysate and its partial condensation product and the metal chelate compound has a high storage stability.

It is preferable that the coating solution to be used in the invention contains at least one of a β-diketone compound and a β-ketoester compound in addition to the composition containing the sol component and the metal chelate compound. Now, the reason therefor will be further described.

In the invention, use is made of at least one of Examples a β-diketone compound and a β-ketoester compound represented by the formula $R^4COCH_2COR^5$ that serves as an agent for improving the stability of the composition to be used in the invention. Namely, it is considered that coordination to the metal atom in the metal chelate compound (preferably at least one of zirconium, titanium and aluminum compounds) would regulate the effect of the metal chelate compound of promoting the condensation reaction of the organosilane hydrolysate and its partial condensation product, thereby achieving the effect of improving the storage stability of the resulting composition. $R^4$ and $R^5$ constituting the β-diketone compound and the β-ketoester compound have the same meaning as $R^4$ and $R^5$ constituting the metal chelate compound as described above.

Specific examples of the β-diketone compound and the β-ketoester compound include acetylacetone, methyl acetoacetate, ethyl acetoacetate, n-propyl acetoacetate, i-propyl acetoacetate, n-butyl acetoacetate, s-butyl acetoacetate, t-butyl acetoacetate, 2,4-hexandione, 2,4-heptandione, 3,5-heptandione, 2,4-octandione, 2,4-nonandione, and 5-methylhexan-dione. Among these compounds, ethyl acetoacetate and acetylacetone are preferable and acetylacetone is particularly preferred. Either one of these β-diketone compounds and β-ketoester compounds or a mixture of two or more thereof may be used. Such a β-diketone compound and a β-ketoester compound are used in an amount of 2 mol or more, preferably from 3 to 20 mol per mol of the metal chelate compound. By using 2 mol or more thereof, the storage stability of the composition can be improved.

It is preferable that the content of the organosilane hydrolysate and its partial condensation product is small in the case of an antireflective layer being relatively thin but large in the case of a hard coat layer or a light diffusion layer having a large thickness. Considering the expression of the effects, refractive index, film shape, surface conditions and so on, it is preferable that the content thereof is from 0.1 to 50% by weight, based on the total solid matters in the composition for the formation, more preferably from 0.5 to 30% by weight and most preferably from 1 to 15% by weight. So long as the content falls within this range, condensation occurs in the course of drying and heating following the coating to form a cured product which serves as a part of the antireflective layer, the hard coat layer or the light diffusion layer as described above, thereby improving the scratch resistance.

1-(5) Initiator

Various monomers having ethylenically unsaturated group can be polymerized by ionizing radiation or heating in the presence of a photo polymerization initiator or a heat radical polymerization initiator.

To produce the film according to the invention, use can be made of a combination of a photo polymerization initiator with a heat radical polymerization initiator.

<Photo Polymerization Initiator>

As the photo radical polymerization initiator, use can be made of acetophenones, benzoins, benzophenones, phosphine oxides, ketals, anthraquinones, thioxanthones, azo compounds, peroxides (see, for example, JP-A-2001-139663), 2,3-dialkyldione compounds, disulfide compounds, fluoroamine compounds, aromatic sulfonium compounds, lophine dimers, onium salts, borate salts, active esters, active halogens, inorganic complexes and coumarines.

Examples of the acetophenones include 2,2-dimethoxyacetophenone, 2,2-diethoxyacetophenone, p-dimethylacetophenone, 1-hydroxy-dimethyl phenyl ketone, 1-hydroxy-dimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone and 4-t-butyl-dichloroacetophenone.

Examples of the benzoins include benzoin, benzoin methyl ether, benzoin ethyl ether, benzoin isopropyl ether, benzyl dimethyl ketal, benzoin benzenesulfonate and benzoin toluenesulfonate. Examples of the benzophenones include benzophenone, hydroxybenzophenone, 4-benzoyl-4'-methyl diphenyl sulfite, 2,4-dichlorobenzophenone, 4,4-dichlorobenzophenone, p-chlorobenzophenone, 4,4'-dimethylaminobenzophenone (Michler's ketone) and 3,3',4,4'-tetra(t-butylperoxycarbonyl)benzophenone.

Examples of the borate salts include organic boric acid salts described in Japanese Patent No. 2764769, JP-A-2002-116539, Kunz, Martin, *Rad Tech '98, Proceeding* Apr. 19-22, 1998, Chicago. For example, there can be enumerated the compounds described in the paragraphs (0022) to (0027) in the specification of JP-A-2002-116539 as cited above. Examples of other organic boron compounds include organic boron transition metal-coordinated complexes reported in JP-A-6-348011, JP-A-7-128785, JP-A-7-140589, JP-A-7-306527 and JP-A-7-292014. More specifically speaking, ion complexes with cationic dyes may be cited.

Examples of the phosphine oxides include 2,4,6-trimethylbenzoyldiphenylphosphine oxide.

Examples of the active esters include 1,2-octanedione, 1-(4-(phenylthio)-2-(O-benzoyloxime)), sulfonic acid esters and cyclic active ester compounds.

More specifically speaking, compounds 1 to 21 described in EXAMPLES in JP-A-2000-80068 are particularly preferred.

Examples of the onium salts include aromatic diazonium salts, aromatic iodonium salts and aromatic sulfonium salts.

Examples of the active halogens include compounds described in Wakabayashi et al., *Bull. Chem. Soc. Japan,* 42, 2924 (1969), U.S. Pat. No. 3,905,815, JP-A-5-27830 and M. P. Hutt, *Journal of Heterocyclic Chemistry,* 1 (No. 3), 1970. Among all, tirhalomethyl-substituted oxazole compounds: s-triazine compounds may be cited. More appropriate examples thereof include s-triazine derivatives having at least one mono-, di- or tri-halomethyl group is attached to an s-triazine ring, such as s-triazine and oxathiazole compounds including 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate)amino)phenyl)-4,6-bis(trichloromethyl)-s-triazine and 2-trihalomethyl-5-(p-methoxyphenyl)-1,3,4-oxadiazole. As specific examples, the compounds described in pages 14 to 30 in JP-A-58-15503, the compounds described pages 6 to 10 in JP-A-55-77742, the compounds No. 1 to No. 8 described in page 287 in JP-B-60-27673, the compounds No. 1 to No. 17 described in pages 443 to 444 in JP-A-60-239736 and the compounds No. 1 to No. 19 in U.S. Pat. No. 4,701,399 are particularly preferable.

As an examples of the inorganic complexes, bis($\eta^5$-2,4-cyclopentadien-1-yl)-bis(2,6-difluoro-3-(1H-pyrrol-1-yl)-phenyl) titanium may be cited.

As an example of the coumarines, 3-ketocoumarine may be cited.

Either one of these initiators or a mixture thereof may be used. Moreover, various examples of photo radical polymerization initiator are presented in *Saishin UV Koka Gijutsu,* 1991, p. 159 and *Shigaisen Koka Sisutemu,* Kiyoshi Kato, 1989, Sogo Gijutsu Senta, p. 65 to 148 and these initiators are useful in the invention.

As preferable examples of commercially available photo radical polymerization initiators of photo cleavage type, KAYACURE (DETX-S, BP-100, BDMX, CTX, BMS, 2-EAQ, ABQ, CPTX, EPD, ITX, QTX, BTC, MCA, etc.; manufactured by NIPPON KAYAKU Co., Ltd.), IRGACURES (651, 184, 500, 819, 907, 369, 1173, 1870, 2959, 4265, 4263, etc.; manufactured by Ciba Specialty Chemicals), ESACURE (KIP100F, KB1, EB3, BP, X33, KT046, KT37, KIP150, TZT; manufactured by SARTOMER) and combinations of the same.

It is preferable to use the photo polymerization initiator in an amount of from 0.1 to 15 parts by weight, more preferably from 1 to 10 parts by weight, per 100 parts by weight of the polyfunctional monomer.

<Photo Sensitizer>

In addition to the photo polymerization initiator, it is also possible to use a photo sensitizer. Specific examples of the photo sensitizer include n-butylamine, triethylamine, tri-n-butylphosphine, Micheler's ketone and thioxanthone.

Furthermore, use can be also made of one or more auxiliary agents such as an azide compound, a thiourea compound and a mercapto compound.

As an example of a commercially available photo sensitizer, KAYACURE (DMBI, EPA; manufactured by NIPPON KAYAKU Co., Ltd.) can be cited.

<Heat Initiator>

As a heat initiator, use can be made of, for example, an organic or inorganic peroxide, an organic azo or diazo-compound.

More specifically speaking, examples of the organic peroxide include benzoyl peroxide, halogenobenzoyl peroxides, lauroyl peroxide, acetyl peroxide, dibutyl peroxide, cumene hydroxyperoxide and butyl hydroxyperoxide; examples of the inorganic peroxide include hydrogen peroxide, ammonium persulfate and potassium persulfate; examples of the azo compound include 2-azobis(isobutyronitrile), 2-azobis(propionitrile) and 1,1'-azobis(cyclohexanecarbonitrile); and examples of the diazo compound include diazoaminobenzene and p-nitrobenzene diazonium.

1-(6) Crosslinkable Compound

In the case where the monomer or the polymer binder constituting the invention shows only an insufficient curability when employed alone, a desired curability can be imparted by adding a crosslinkable compound.

When the polymer per se has hydroxyl group, for example, it is preferable to use various amino compounds as a curing agent. An amino compound usable as the crosslinkable compound is a compound which has two or more groups in total selected from one or both of hydroxylalkylamino and alkoxyalkylamino groups per molecule. Specific examples thereof include a melamine compound, a urea compound, a benzoguanamine compound and a glycoluryl compound.

A melamine compound is generally known as a compound having a skeleton in which a nitrogen atom is bonded to a triazine ring. Specific examples thereof include melamine, an alkylated melamine, methylol melamine and an alkoxylated methyl melamine. A compound having two or more groups in total selected from one or both of methylol and alkoxylated methyl groups per molecule. More specifically speaking, it is preferable to use methylol melamine obtained by reacting melamine with formaldehyde under basic conditions, an alkoxylated methyl melamine or a derivative thereof. From the viewpoints of achieving a favorable storage stability of the curable resin composition and showing a high reactivity, an alkoxylated methyl melamine is preferred. The methylol melamine and alkoxylated methyl melamine to be used as the crosslinkable compound are not particularly restricted. For example, use can be made of various resin products obtained by a method described in *Purasuchikku Zairyo Koza* (8) *Yuria Meramin Jushi* (Nikkan Kogyo Shinbunsha).

Examples of the urea compound include urea, polymethylol urea and alkoxylated methyl urea which is a derivative thereof, methylol uron having a uron ring and an alkoxylated methyl uron. As a compound such as a urea derivative, use can be also made of various resin products reported by the above document.

1-(7) Curing Catalyst

In the film of the invention, use can be made of a radical or an acid generated by ionizing radiation or heat radiation as a curing catalyst promoting curing.

<Heat Acid-Generating Agent>

Specific examples of a heat acid-generating agent include various aliphatic sulfonic acids and salts thereof, various aliphatic carboxylic acids such as citric acid, acetic acid and maleic acid and salts thereof, various aromatic carboxylic acids such as benzoic acid and phthalic acid and salts thereof, alkylbenzenesulfonic acids and ammonium salts thereof, amine salts, various metal salts, phosphoric acid and phosphoric esters of organic acids.

Examples of commercially available materials include CATALYST 4040, CATALYST 4050, CATALYST 600, CATALYST 602, CATALYST 500 and CATALYST 296-6 (manufactured by Nippon Cytec Industries) and NACURE Series 155, 1051, 5076, 4054J and NACURE Series 2500, 5225, X49-110, 3525 and 4167 which are block types thereof (manufactured by King Industries).

It is preferable to use the heat acid-generating agent in an amount of from 0.01 to 10 parts by weight, more preferably from 0.1 to 5 parts by weight per 100 parts by weight of the total solid matters contained in the composition for forming the layer containing the same (the layer to which it is to be added). So long as the content of the heat acid-generating agent falls within this range, the resultant composition has a high storage stability and the coating film has a favorable scratch resistance.

<Photosensitive Acid-Generating Agent and Photo Acid-Generating Agent>

Next, a photo acid-generating agent which is usable as a photo polymerization initiator will be described in detail.

As the acid-generating agent, there can be enumerated a photo cationic polymerization initiator, a photo decoloring agent, a photo color changing agent, publicly known acid-generating agents employed in microresists and so on, publicly known compounds and mixtures thereof. Examples the acid-generating agent include an organic halogen compound, a disulfone compound and an onium compound. Specific examples of the organic halogen compound are the same as those cited above with respect to <photo initiator>.

As photosensitive acid-generating agent, there can be enumerated: (1) various onium salts such as an iodonium salt, a sulfonium salt, a phosphonium salt, a diazonium salt, an ammonium salt and a pyridinium salt; (2) sulfone compounds such as a β-ketoester, a β-sulfonylsulfone and α-diazo compounds thereof; (3) sulfonic esters such as an alkyl sulfonate, a haloalkyl sulfonate, an aryl sulfonate and imino sulfonate; (4) sulfonimide compounds; and (5) diazomethane compounds.

Examples of the onium salts include a diazonium salt, an ammonium salt, an iminium salt, a phosphonium salt, an iodonium salt, a sulfonium salt, an arsonium salt and a selenonium salt. Among them, a diazonium salt, an iodonium salt, a sulfonium salt and a iminium salt are preferable from the viewpoints of the photosensitivity at the initiation of photo polymerization, the stability as a starting compound and so on. For example there can be enumerated compounds described in JP-A-2002-29162, paragraphs (0058) to (0059).

It is preferable to use the photosensitive acid-generating agent in an amount of from 0.01 to 10 parts by weight, more preferably from 0.1 to 5 parts by weight per 100 parts by weight of the total solid matters contained in the composition for forming the layer containing the same (the layer to which it is to be added).

Specific compounds and methods of using the same can be appropriately selected by referring to, for example, JP-A-2005-43876.

1-(8) Light-Transmitting Particle

In a light diffusion layer of the invention, various light-transmitting particles are employed so as to impart antiglare properties (surface scattering properties) and internal scattering properties thereto.

As the light-transmitting particles in a light diffusion layer of the invention, use can be made of polymethyl methacrylate particles (refractive index 1.49), crosslinked poly(acryl-styrene) copolymer particles (refractive index 1.54), melamine resin particles (refractive index 1.57), polycarbonate particles (refractive index 1.57), polystyrene particles (refractive index 1.60), crosslinked polystyrene particles (refractive index 1.61), polyvinyl chloride particles (refractive index 1.60), benzoguanamine-melamine formaldehyde particles (refractive index 1.68), silica particles (refractive index 1.44), alumina particles (refractive index 1.63), zirconia particles, titania particles or particles having hollow parts or pores.

Among all, it is preferable to use crosslinked poly((meth) acrylate) particles or crosslinked (acryl-styrene) particles. By controlling the refractive index of the binder depending on the refractive index of individual light-transmitting particles selected from among the above-described particles, it is possible to establish an appropriate internal haze of the light diffusion layer in the optical film of the invention.

Moreover, it is preferable to combine a binder comprising a trifunctional or higher (meth)acrylate monomer as the main component (showing a refractive index after curing of 1.50 to 1.53) with light-transmitting particles made of a crosslinked poly(meth)acrylate polymer containing from 50 to 100% by weight of acryl. It is particularly preferable to employ a combination of a binder comprising a trifunctional or higher (meth)acrylate monomer as the main component with poly ((meth)acrylate) particles (refractive index 1.49).

The refractive indexes of the binder (the light-transmitting resin) and the light-transmitting particles of the invention preferably range from 1.45 to 1.70, more preferably from 1.48 to 1.65. The refractive indexes may be adjusted within the above range by appropriately selecting the types and ratios of the binder and the light-transmitting particles. It can be easily understood based on a preliminary test how to select.

In the invention, the difference (absolute value) between the refractive index of the light-transmitting particles and the refractive index of the light diffusion layer excluding the light-transmitting particles ("refractive index of light-transmitting particles"—"refractive index of light diffusion layer excluding light-transmitting particles") is preferably from 0.001 to 0.03, more preferably from 0.001 to 0.020 and more preferably from 0.005 to 0.015. In the case where the difference between the refractive indexes is less than 0.001, an extremely large amount of the light-transmitting particles should be added to the binder to achieve the light diffusion properties of the light diffusion layer. As a result, the film strength and the coating suitability of the light diffusion layer are worsened. In the case where the difference between the refractive indexes is more than 0.03, no even light diffusion layer can be formed because of the small content of the light-transmitting particles in the light diffusion layer. To achieve the refractive index difference as specified in the invention, it is preferable to control the refractive index of the binder. The refractive index of the binder can be controlled by selecting an appropriate binder species or using form 1 to 90% by weight of inorganic particles as will be described hereinafter.

The refractive index of the light diffusion layer film excluding the light-transmitting particles can be quantitatively evaluated by directly measuring with an Abbe refractometer or using spectral reflectometry or spectral ellipsometry. The refractive index of the light-transmitting particles can be measured by dispersing an equal amount of the light-transmitting particles in solvents, which have different refractive indexes established by changing the mixing ratio of two solvents having different refractive indexes, measuring the turbidities and then measuring the refractive index with an Abbe refractometer when the refractive index attains the minimum level.

Since the light-transmitting particles as described above are liable to settle out in the binder, an organic filler such as silica may be added to thereby prevent sedimentation. Although the sedimentation of the light-transmitting particles can be more effectively prevented with an increase in the amount of the inorganic filler added, the transparency of the coating film is lowered thereby. It is therefore preferable that an inorganic filler of 0.5 μm or less in particle diameter is added in an amount of less than about 0.1 part by weight per 100 parts by weight of the binder-constituting components so that the transparency of the coating film is not damaged.

The average particle diameter of the light-transmitting particles preferably ranges from 3 to 12 μm, more preferably from 4.0 to 10.0 μm and more preferably from 5 to 8 μm. When the average particle diameter is less than 3 μm, the light scattering angle is broadened, which results in undesirable phenomena such as blur characters in the display. When the average particle diameter exceeds 12 μm, on the other hand, the layer containing the light-transmitting particles should be thickened, which results in some problems such as curling and an increase in the cost. In the case of thickening the film, moreover, the amount of the coating solution is also increased in the course of coating. As a result, the drying time is prolonged and there arise surface errors such as drying irregularity.

The average particle diameter of the light-transmitting particles may be measured by using an arbitrary method so long as the average particle diameter of particles can be measured thereby. It is preferable to observe 100 particles under a scanning electron microscope (500,000 to 2,000,000× magnification) and referring the means thereof as the average particle diameter.

In the invention, the light-transmitting particles are not restricted in shape. Namely, use can be made of particles having different shapes, e.g., a combination of spherical particles with irregular-shaped (for example, non-spherical) particles.

It is preferable to add the light-transmitting particles in an amount of from 5 to 40% by weight, more preferably from 5 to 25% by weight and more preferably from 7 to 20% by weight, based on the total solid matters in the light diffusion layer. In the case where the content of the light-transmitting particles is 5% by weight or more, the effects of the addition thereof can be fully exerted. So long as the content thereof is not more than 40% by weight, the occurrence of problems such as fuzzy image, surface clouding and dazzling can be regulated.

The coating amount of the light-transmitting particles preferably ranges from 30 to 2500 mg/m$^2$, more preferably from 100 to 2400 mg/m$^2$, and more preferably from 600 to 2300 mg/m$^2$.

The swelling ratio of resin particles was determined by dispersing the resin particles in MIBK at a concentration of 30% by mass, measuring the particle diameter (r1) within 1 day after the completion of the dispersion, then allowing the dispersion to stand at room temperature, measuring the particle diameter (r2) again when the particle diameter stopped to increase and achieved equilibrium and assigning the values to formula below.

Swelling ratio (% by volume)=$\{(r2/r1)^3-1\}\times 100$

The swelling ratio of the resin particles preferably is 20% by volume or less, more preferably 10% by volume or less, and most preferably 5% by volume or less.

The compression strength of the resin particles according to the invention preferably ranges from 4 to 10 kgf/mm$^2$, more preferably from 4 to 8 kgf/mm$^2$, and more preferably from 4 to 6 kgf/mm$^2$. So long as the compression strength falls within this range, the film hardness can be improved and there scarcely arises particle breakage due to worsening in brittleness.

The compression strength is expressed in the compression strength at 10% deformation of the particle diameter (particle size). The compression strength at 10% deformation of the particle size, i.e., the particle compression strength (S10 strength) is a value that is determined by compressing a resin particle itself with the use of a micro compression tester for precise strength measurements MCTW201 (manufactured by Shimadzu Scientific Instruments, Inc.) and assigning the load at 10% deformation and the particle size before the compression to the following formula.

S10 strength (kgf/mm$^2$)=2.8×load (kgf)/$\{(\pi\times$particle diameter (mm)×particle diameter (mm))$\}$ <Method of Preparing and Classifying Light-Transmitting Particles>

Examples of the method for producing the light-transmitting particles according to the invention include the suspension polymerization method, the emulsion polymerization method, the soap-free emulsion polymerization method, the dispersion polymerization method and the seed polymerization method. Any one of these methods may be employed therefor. These production methods can be conducted by referring to methods described in, for example, *Kobunshi Gosei no Jikkenho*, Takayuki Otsu and Masayoshi Kinoshita, Kagakudojin, 1972, pages 130 and 146 to 147, *Gosei Kobunshi*, No. 1, pages 246 to 290, ibid., No. 3, pages 1 to 108, Japanese Patent No. 2543503, Japanese Patent No. 3508304, Japanese Patent No. 2746275, Japanese Patent No. 3521560, Japanese Patent No. 3580320, JP-A-10-1561, JP-A-7-2908, JP-A-5-297506 and JP-A-2002-145919.

Concerning the particle size distribution of the light-transmitting particles, as described above, monodispersion is most desirable from the viewpoint of controlling the haze value and the diffusion properties and obtaining even surface. That is to say, it is preferred that the (coefficient of variation) value indicating the evenness of the particle diameter is not more than 15%, more preferably not more than 13% and more preferably not more than 10%. In the case where particles having particle size larger by 20% or more than the average particle size are specified as coarse particles, for example, it is preferable that the content of these coarse particles is 1% or less of all particles, still preferably 0.1% or less and still preferably 0.01% or less. Light-transmitting particles having such a particle size distribution can be obtained by classifying particles after the completion of a usual synthesis reaction. Light-transmitting particles having a still preferable distribution can be obtained by performing the classification in an increased number or at an elevated level.

For the classification, use is preferably made of the centrifugal classification method, the sedimentation classification method, the filtration classification method or the static classification method.

1-(9) Inorganic Particles

To improve the physical properties such as hardness and optical characteristics such as refractive index and diffusion properties, the functional layer of the film according to the invention can contain various inorganic particles.

As the inorganic particles, use can be made of oxide of at least one metal selected from among silicon, zirconium, titanium, aluminum, indium, zinc, tin and antimony. Specific examples thereof include $ZrO_2$, $TiO_2$, $Al_2P_3$, $I_2O_3$, ZnO, $SnO_2$, $Sb_2O_3$ and ITO. Further examples thereof include $BaSO_4$, $CaCO_3$ talc and kaolin.

It is preferable that the inorganic particles to be used in the invention have as a small particle diameter as possible in the dispersion medium. The weight-average diameter is from 1 to 200 nm, preferably from 5 to 150 nm and more preferably from 10 to 100 nm. By reducing the diameter of the inorganic particles to 100 nm or less, the transparency of the film is not damaged. The particle diameter of the inorganic particles can be measured by the light scattering method or the electron microscopic photography method.

The specific surface area of the inorganic particles is preferably from 10 to 400 m$^2$/g, still preferably from 20 to 200 m$^2$/g and most preferably from 30 to 150 m$^2$/g.

It is preferable that the inorganic particles to be used in the invention are added to the coating solution of the layer for which these particles are employed in the form of being dispersed in a dispersion medium.

As the dispersion medium for the inorganic particles, use may be preferably made of a liquid having a boiling point of from 60 to 170° C. Examples of the dispersion medium include water, alcohols (for example, methanol, ethanol, isopropanol, butanol and benzyl alcohol), ketones (for example, acetone, methyl ethyl ketone, methyl isobutyl ketone and cyclohexanone), esters (for example, methyl acetate, ethyl acetate, propyl acetate, butyl acetate, methyl formate, ethyl formate, propyl formate and butyl formate), aliphatic hydrocarbons (for example, hexane and cyclohexane), halogenated hydrocarbons (for example, methylene chloride, chloroform and carbon tetrachloride), aromatic hydrocarbons (for example, benzene, toluene and xylene), amides (for example, dimethylformamide, dimethylacetamide and n-methylpyrrolidone), ethers (for example, diethyl ether, dioxane and tetrahydrofuran), and ether alcohols (for example, 1-methoxy-2-propanol). Among all, toluene, xylene, methyl ethyl ketone, methyl isobutyl ketone, cyclohexanone and butanol are particularly preferred.

As particularly preferable dispersion media, methyl ethyl ketone, methyl isobutyl ketone and cyclohexanone may be cited.

The inorganic particles can be dispersed in the medium with the use of a dispersion machine. Examples of the dispersion machine include a sand grinder mill (for example, a bead mill provided with pins), a high-speed impeller mill, a pebble mill, a roller mill, an attritor and a colloid mill. Among all, a sand grinder mill and a high-speed impeller mill are preferred. It is also possible to carry out a pre-dispersion treatment. Examples of the dispersion machine to be used in the pre-dispersion treatment include a ball mill, a three-roll mill, a kneader and an extruder.

<High Refractive Index Particles>

To elevate the refractive index of the functional layer which is optionally formed in the film of the invention, use is preferably made of the cured product of a composition in which inorganic particles with a high refractive index are dispersed in a monomer, an initiator and an organosilane compound.

As the inorganic particles, $ZrO_2$ and $TiO_2$ are preferable from the viewpoint of refractive index. Namely, $ZrO_2$ is preferable for elevating the refractive index of the light diffusion layer or the hard coat layer, while $TiO_2$ is preferable as microparticles in the high refractive index layer and the medium refractive index layer.

As the $TiO_2$ particles as described above, inorganic particles containing $TiO_2$ as the main component together with at least one element selected from among cobalt, aluminum and zirconium are particularly preferred. The term "main component" means the component having the largest content (% by weight) among the components constituting the particles.

The particles containing $TiO_2$ as the main component according to the invention preferably have a refractive index of from 1.90 to 2.80, still preferably from 2.10 to 2.80 and most desirably from 2.20 to 2.80.

The weight-average particle diameter of the primary particles of the particles containing $TiO_2$ as the main component preferably ranges from 1 to 200 nm, still preferably from 1 to 150 nm and particularly preferably from 1 to 80 nm.

It is preferable that the particles containing $TiO_2$ as the main component have a crystalline structure mainly comprising rutile, mixed crystals of rutile with anatase, anatase or amorphous structure. It is particularly preferable to contain rutile structure as the main component. The term "main component" means the component having the largest content (% by weight) among the components constituting the particles.

By adding at least one element selected from Co (cobalt), Al (aluminum) and Zr (zirconium) to the particles containing $TiO_2$ as the main component, the photo catalytic activity of the $TiO_2$ can be regulated and thus the weatherability of the film according to the invention can be improved.

Co (cobalt) is a particularly preferable element. It is also preferred to use two or more elements.

The inorganic particles containing $TiO_2$ as the main component according to the invention may have a core/shell structure formed by a surface treatment as described in JP-A-2001-166104.

The content of the inorganic particles in the layer ranges preferably from 1 to 45% by weight, more preferably from 1 to 30% by weight based on the binder. Use can be made of two or more types of inorganic particles in the layer.

<Low Refractive Index Particles>

It is preferable that the low refractive index layer contains inorganic particles. It is desirable that the inorganic particles have a low refractive index and examples thereof include microparticles of magnesium fluoride and silica. From the viewpoints of refractive index, dispersion stability and cost, silica microparticles are particularly preferred.

The average particle diameter of the silica microparticles corresponds to 30% or more but not more than 150% of the thickness of the low refractive index layer, preferably 35% or more but not more than 80% and still preferably 40% or more but not more than 60%. In the case where the thickness of the low refractive index layer is 100 nm, that is, the particle diameter of the silica microparticles is preferably 30 nm or more but not more than 150 nm, still preferably 35 nm or more but not more than 80 nm and still preferably 40 nm or more but not more than 60 nm. The average diameter of the inorganic particles is measured with a Coulter's counter.

In the case where the particle diameter of the silica microparticles is too small, the effect of improving scratch resistance is sometimes worsened. In the case where the particle diameter thereof is too large, fine peaks and valleys are formed on the surface of the low refractive index layer and there sometimes arise worsening in appearance such as definitiveness in black color and lowering in integral reflection ratio. The silica microparticles may be either crystalline particles or amorphous ones. Also, use may be made of either monodispersed particles or aggregated particles so long as having a particle size satisfying the requirement as defined above. Concerning the shape, spherical particles are most desirable but those having an undefined shape may be also usable without any problem.

It is also preferred to employ at least one type of silica microparticles the average particle diameter of which corresponds to less than 25% of the thickness of the low refractive index layer (which are called "silica microparticles with smaller particle diameter") together with the silica microparticles having the particle diameter as specified above (which are called "silica microparticles with larger particle diameter").

These silica microparticles with smaller particle diameter can exist in the spaces among the silica microparticles with larger particle diameter and thus contribute as a holder for these silica microparticles with larger particle diameter.

In the case where the thickness of the low refractive index layer is 100 nm, the average particle diameter of the silica microparticles with smaller particle diameter is preferably 1 nm or more but not more than 20 nm, more preferably 5 nm or more but not more than 15 nm and particularly preferably 10 nm or more but not more than 15 nm. It is preferable to employ such silica microparticles from the viewpoints of material cost and holding effect.

The coating amount of the low refractive index layer ranges preferably from 1 mg/m² to 100 mg/m², more preferably from 5 mg/m² to 80 mg/m², and more preferably from 10 mg/m² to 60 mg/m². When the coating amount is too small, the effect of improving scratch resistance is lessened. When it is too large, fine peaks and valleys are formed on the surface of the low refractive index layer and there sometimes arise worsening in appearance such as definitiveness in black color and lowering in integral reflection ratio.

<Hollow Silica Particles>

To further lower the refractive index, it is preferable to employ hollow silica microparticles.

The refractive index of the hollow silica microparticles preferably ranges from 1.15 to 1.40, still preferably from 1.17 to 1.35 and most preferably from 1.17 to 1.30. The refractive index as used herein means not the refractive index of the silica, i.e., the shell forming the hollow particles, but the refractive index of the particles as a whole. When the radius of the inner cavity in a particle is referred to as a and the radius of the outer shell of the particle is referred to as b, the porosity x, which is represented by numerical formula (VIII) below, preferably ranges from 10 to 60%, still preferably from 20 to 60% and most preferably from 30 to 60%.

$$x=(4\pi a^3/3)/(4\pi b^3/3)\times 100 \qquad \text{Numerical formula (VII)}$$

In the case of attempting to achieve a lower refractive index of the hollow silica particles and a higher porosity thereof, the thickness of the shell is reduced and the strength of the particles is worsened. From the viewpoint of the scratch resistance, therefore, particles having a refractive index of 1.15 or more are preferred.

Methods of producing hollow silica particles are described in, for example, JP-A-2001-233611 and JP-A-2002-79616. In particular, particles having a cavity therein and the pores of the shell being closed are preferred. The refractive index of these hollow silica particles can be calculated in accordance with a method disclosed in JP-A-2002-79616.

The coating amount of the hollow silica particles is preferably from 1 mg/m² to 100 mg/m², still preferably from 5 mg/m² to 80 mg/m² and still preferably from 10 mg/m² to 60 mg/m². When the coating amount is too small, the effects of lowering refractive index and improving scratch resistance are lessened. When it is too large, fine peaks and valleys are formed on the surface of the low refractive index layer and there sometimes arise worsening in appearance such as definitiveness in black color and lowering in integral reflection ratio.

The average particle diameter of the hollow silica particles preferably amounts to 30% or more but not more than 150% of the thickness of the low refractive index layer, still preferably 35% or more but not more than 80% and still preferably 40% or more but not more than 60%. In the case where the low refractive index layer has a thickness of 100 nm, namely, the average particle diameter of the hollow silica particles is preferably 30 nm or more but not more than 150 nm, still preferably 35 nm or more but not more than 100 nm and still preferably 40 nm or more but not more than 65 nm.

When the particle diameter is too small, the porosity is decreased and thus the effect of lowering refractive index is lessened. When it is too large, fine peaks and valleys are formed on the surface of the low refractive index layer and there sometimes arise worsening in appearance such as definitiveness in black color and lowering in integral reflection ratio. The silica microparticles may have either crystalline or amorphous nature. Monodispersed particles are preferred. Although spherical particles are desirable, those having undefined shapes may be used without any problem.

It is also possible to employ two or more types of hollow silica particles having different particle sizes. The average particle diameter of the hollow silica can be determined by the electron microscopic photography method.

In the invention, the specific surface area of the hollow silica ranges preferably from 20 to 300 m²/g, more preferably from 30 to 120 m²/g, and most preferably from 40 to 90 m²/g. The surface area can be determined by the BET method with the use of nitrogen.

In the invention, use can be also made of voidless silica particles together with the hollow silica. The particle size of the voidless silica is preferably 30 nm or more but not more than 150 nm, more preferably 35 nm or more but not more than 100 nm, and most preferably 40 nm or more but not more than 80 nm.

1-(10) Electrically Conductive Particles

In the film according to the invention, use can be made of various electrically conductive particles to impart electrical conductivity.

It is preferable that the electrically conductive particles are made of a metal oxide or nitride. Examples of the metal oxide and nitride include tin oxide, indium oxide, zinc oxide and titanium nitride. Tin oxide and indium oxide are particularly preferred. The electrically conductive particles may comprise such a metal oxide or nitride as the main component optionally together with other element(s). The term "main component" means the component having the largest content (% by weight) among the components constituting the particles. Examples of the other elements include Ti, Zr, Sn, Sb, Cu, Fe, Mn, Pb, Cd, As, Cr, Hg, Zn, Al, Mg, Si, P, S, B, Nb, In, V and halogen atoms. To elevate the electrical conductivity of tin oxide or indium oxide, it is preferable to add Sb, Pb, Nb, In, V and halogen atoms. Tin oxide containing Sb (ATO) and indium oxide containing Sn (ITO) are particularly preferable. The content of Sb in ATO is preferably from 3 to 20% by weight. The content of Sn in ITO is preferably from 5 to 20% by weight.

The average particle diameter of primary particles of the electrically conductive inorganic particles employed in the antistatic layer preferably ranges from 1 to 150 nm, still preferably from 5 to 100 nm and most preferably from 5 to 70 nm. The average particle diameter of the electrically conductive inorganic particles in the antistatic layer thus formed ranges from 1 to 200 nm, preferably from 5 to 150 nm, still preferably from 10 to 100 nm and most preferably from 10 to 80 nm. The average particle diameter of the electrically conductive inorganic particles is the weight-weighted average particle diameter which can be measured by the light scattering method or electron microscopic photographing.

The specific surface area of the electrically conductive inorganic particles is preferably from 10 to 400 m²/g, still preferably from 20 to 200 m²/g and most preferably from 30 to 150 m²/g.

The electrically conductive inorganic particles may have been surface-treated. The surface-treatment is performed by using an inorganic compound or an organic compound. Examples of the inorganic compound usable in the surface-treatment include alumina and silica. A treatment with silica is particularly preferred. Examples of the organic compound usable in the surface treatment include polyols, alkanolamines, stearic acid, silane coupling agents and titanate coupling agents. A silane coupling agent is most desirable. It is also possible to carry out the surface treatment by combining two or more surface treating agents.

It is preferable that the electrically conductive inorganic particles are in a rice-grain shape, a spherical shape, a cubic shape, a spindle shape or an irregular shape.

It is also possible to use two or more types of electrically conductive inorganic particles in a specific functional layer of the film or in different layers of the film.

In the antistatic layer, the content of the electrically conductive inorganic particles preferably amounts to 20 to 90% by weight, still preferably 25 to 85% by weight and still preferably 30 to 80% by weight.

The electrically conductive inorganic particles are employed in the state of a dispersion in forming the antistatic layer.

1-(11) Surface Treating Agent

The inorganic particles to be used in the invention may be subjected to a physical surface treatment such as plasma discharge treatment or corona discharge treatment or a chemical surface treatment with the use of, for example, a surfactant or a coupling agent to thereby stabilize the dispersion thereof in a liquid dispersion or a coating solution or to improve the affinity and binding properties thereof to a binder component.

The surface treatment can be conducted by using a surface treating agent which is an inorganic or organic compound. Examples of the inorganic compound usable in the surface treatment include an inorganic compound containing cobalt (for example, $CoO_2$, $Co_2O_3$ or $Co_3O_4$), an inorganic compound containing aluminum (for example, $Al_2O_3$ or $Al(OH)_3$), an inorganic compound containing zirconium (for example, $ZeO_2$ or $Zr(OH)_4$), an inorganic compound containing silicon (for example, $SiO_2$) and an inorganic compound containing iron ($Fe_2O_3$).

Among all, an inorganic compound containing cobalt, an inorganic compound containing aluminum and an inorganic compound containing zirconium are preferable and an inorganic compound containing cobalt, $Al(OH)_3$ and $Zr(OH)_4$ are most preferable.

Examples of the organic compound usable in the surface treatment include polyols, alkanolamines, stearic acid, silane coupling agents and titanate coupling agents. A silane coupling agent is most desirable. It is particularly preferable to surface-treat the inorganic particles by using at least one of a silane coupling agent (an organosilane compound), a partial hydrolysate thereof and a condensation product thereof.

Examples of the titanate coupling agent include metal alkoxides such as tetramethoxytitanium, tetraethoxytitanium and tetraisopropoxytitanium and PLENACT (KA-TTS, KR-46B, KR-55, KR-41B, etc.; manufactured by Ajinomoto Co., Ltd.).

Preferable examples of the organic compound usable in the surface treatment include polyols, alkanolamines and other organic compounds having anionic groups. Among all, organic compounds having a carboxyl, sulfonate or phosphate group are preferable. Use can be preferably made of stearic acid, lauric acid, oleic acid, linoleic acid and linolenic acid.

It is preferable that the organic compound to be used in the surface treatment further has a crosslinkable or polymerizable functional group. Examples of the crosslinkable or polymerizable functional group include ethylenically unsaturated groups capable of undergoing an addition or polymerization reaction with a radical species (for example, a (meth)acryl group, an allyl group, a styryl group and a vinyloxy group), cationic polymerizable groups (for example, an epoxy group, an oxatanyl group and a vinyloxy group) and a condensation-polymerizable group (for example, a hydrolyzable silyl group and an N-methylol group). Among them, a group having an ethylenically unsaturated group is preferred.

Use can be made of two or more of these surface treating agents. It is particularly preferable to employ an inorganic compound containing aluminum together with an inorganic compound containing zirconium.

In the case where the inorganic particles are silica, it is particularly preferable to use a coupling agent. As the coupling agent, it is preferable to use an alkoxymetal compound (for example, a titanium coupling agent or a silane coupling agent). Among all, a treatment with a silane coupling agent is particularly advantageous.

The coupling agent is employed as a surface treating agent by which the inorganic particles in the low refractive index layer are preliminarily surface-treated before the preparation of the composition for forming low refractive index layer. It is preferable that the coupling agent is further added as an additive in preparing the composition for forming low refractive index layer so that the low refractive index layer contains the coupling agent.

To lessen the load during the surface-treatment, it is preferable that the silica microparticles are preliminarily dispersed in a medium before the surface-treatment.

As specific examples preferably usable as the surface treating agent and the catalyst for the surface-treatment in the invention, there can be enumerated organosilane compounds and catalysts described in WO 2004/017105.

It is preferable to use the surface treating agent in an amount of form 10 to 150 parts by weight, more preferably from 15 to 120 parts by weight and most preferably from 20 to 100 parts by weight, per 100 parts by weight of the inorganic particles. It is possible to use two or more of the surface treating agents as described above.

1-(12) Dispersant

To disperse the particles to be used in the invention, use can be made of various dispersants.

It is preferable that the dispersant further has a crosslinkable or polymerizable functional group. Examples of the crosslinkable or polymerizable functional group include ethylenically unsaturated groups capable of undergoing an addition or polymerization reaction with a radical species (for example, a (meth)acryl group, an allyl group, a styryl group and a vinyloxy group), cationic polymerizable groups (for example, an epoxy group, an oxatanyl group and a vinyloxy group) and a condensation-polymerizable group (for example, a hydrolyzable silyl group and an N-methylol group). Among them, a group having an ethylenically unsaturated group is preferred.

To disperse inorganic particles (in particular, inorganic particles comprising $TiO_2$ as the main component), it is preferable to use a dispersant having an anionic group, still preferably a dispersant having an anionic group and a crosslinkable or polymerizable functional group and particularly preferably a dispersant having the crosslinkable or polymerizable functional group in its side chain.

As the anionic group, it is effective to use a group having an acidic proton (for example, a carboxyl group, a sulfonate group (sulfo), a phosphate group (phosphono) or a sulfonamide group) or a salt thereof. A carboxyl group, a sulfonate group, a phosphate group or its salt are more preferable and a carboxyl group and a phosphate group are particularly preferred. Anionic groups of two or more types may be contained per molecule of the dispersant. It is preferable that the dispersant contain two or more anionic groups on average, more preferably five or more and particularly preferably 10 or more. Anionic groups of different types may be contained per molecule of the dispersant.

In the dispersant having an anionic group in its side chain, the composition ratio of the repeating unit containing the anionic group ranges from $10^{-4}$ to 100% by mol, more preferably from 1 to 50% by mol and particularly preferably from 5 to 20% by mol, based on the total repeating units.

It is preferable that the dispersant further contains a crosslinkable or polymerizable functional group. Examples of the crosslinkable or polymerizable functional group include ethylenically unsaturated groups capable of undergoing an addition or polymerization reaction with a radical species (for example, a (meth)acryl group, an allyl group, a styryl group and a vinyloxy group), cationic polymerizable groups (for example, an epoxy group, an oxatanyl group and a vinyloxy group) and a condensation-polymerizable group (for example, a hydrolyzable silyl group and an N-methylol group). Among them, a group having an ethylenically unsaturated group is preferred.

Crosslinkable or polymerizable functional groups of two or more types may be contained per molecule of the dispersant. It is preferable that the dispersant contain two or more crosslinkable or polymerizable functional groups on average, more preferably five or more and particularly preferably 10 or more. Crosslinkable or polymerizable functional groups of different types may be contained per molecule of the dispersant.

In the dispersant preferably usable in the invention, it is possible to use, as an example of the repeating unit having an ethylenically unsaturated group in its side chain, a repeating unit of poly-1,2-butadiene and poly-1,2-isoprene structure or a (meth)acrylic ester or amide to which a specific residue (the R in —COOR or —CONHR) is attached. Examples of the specific residue (the R group) include —$(CH_2)_n$—$CR^{21}$=$CR^{22}R^{23}$, —$(CH_2O)_n$—$CH_2CR^{21}$=$CR^{22}CR^{23}$, —$(CH_2CH_2O)_n$—$CH_2CR^{21}$=$CR^{22}CR^{23}$, —$(CH_2O)_n$—NH—CO—O—$CH_2CR^{21}$=$CR^{22}CR^{23}$, —$(CH_2O)_n$—O—CO—$CR^{21}$=$CR^{22}CR^{23}$ and —$(CH_2CH_2O)_2$—X (wherein $R^{21}$ to $R^{23}$ represent each a hydrogen atom, a halogen atom, or an alkyl group, an aryl group, an alkoxy group or an aryloxy group having from 1 to 20 carbon atoms, provided that $R^{21}$ and $R^{22}$ or $R^{23}$ may be bonded together to form a ring; n is an integer of from 1 to 10; and X represents a dicyclopentadienyl group). Specific example of R in an ester residue include —$CH_2CH$=$CH_2$ (corresponding to an allyl(meth)acrylate polymer described in JP-A-64-17047), —$CH_2CH_2O$—$CH_2CH$=$CH_2$, —$CH_2CH_2OCOCH$=$CH_2$, —$CH_2CH_2OCOC(CH_3)$=$CH_2$, —$CH_2C(CH_3)$=$CH_2$, —$CH_2CH_2$—$CH$—$C_6H_5$, —$CH_2CH_2OCOCH$=$CH$—$C_6G_5$, —$CH_2CH_2$—NHCO—$CH_2CH$=$CH_2$ and —$CH_2CHO$—X (wherein X represents a dicyclopentadienyl group). Specific example of R in an amide residue include —$CH_2CH$=$CH_2$, —$CH_2CH_2$—Y (wherein Y represents a 1-cyclohexenyl residue) and —$CH_2CH_2$—OCO—$CH$=$CH_2$ and —$CH_2CH_2$—OCO—$C(CH_3)$=$CH_2$.

In a dispersant having an ethylenically unsaturated group as described above, a free radical (a polymerization initiator radical or a growth radical in the course of the polymerization of a polymerizable compound) attaches to the unsaturated bond. Thus, addition polymerization arises either directly among molecules or via a polymerization chain of a polymerizable group so that a crosslinkage is formed among molecules, thereby causing curing. Alternatively, an atom in the molecule (for example, a hydrogen atom on the carbon atom adjacent to the unsaturated bond) is withdrawn by a free radical to form polymer radicals. Then, these polymer radicals are bonded together so that a crosslinkage is formed among molecules, thereby causing curing.

The weight-average molecular weight (Mw) of the dispersant which has an anionic group and a crosslinkable or polymerizable functional group and in which the crosslinkable or polymerizable functional group exists in its side chain, is preferably 1000 or more, though the invention is not particularly restricted thereto. It is more preferable that the weight-average molecular weight (Mw) of the dispersant is from 2000 to 1000000, more preferably from 5000 to 200000 and particularly preferably from 10000 to 100000.

Although the unit having the crosslinkable or polymerizable functional group may constitutes all of the repeating units other than the unit having the anionic group, the preferable content thereof is from 5 to 50% by mol, more preferably from 5 to 30% by mol, based on the total crosslinkable or repeating units.

The dispersant may be a copolymer with an appropriate monomer other than the one having a crosslinkable or polymerizable functional group and an anionic group. Although the copolymerization component is not particularly restricted, it is selected by taking various points (for example, dispersion stability, compatibility with other monomer(s), film strength and so on) into consideration. Preferable examples thereof include methyl(meth)acrylate, n-butyl (meth)acrylate, t-butyl(meth)acrylate, cyclohexyl(meth) acrylate and styrene.

Although the dispersant is not particularly restricted in its form, a block copolymer or a random copolymer is preferred. From the viewpoints of cost and easiness in synthesis, a random copolymer is still preferable.

It is preferable to use the dispersant in an amount, based on the inorganic microparticles, of from 1 to 50 parts by weight, more preferably from 5 to 30 parts by weight and most preferably from 5 to 20 parts by weight, per 100 parts by weight of the inorganic microparticles.

Next, specific examples of the dispersant preferably usable in the invention will be presented, though the dispersant to be used in the invention is not restricted thereto. Unless otherwise noted, these dispersants are random copolymers.

$$-\!\!\left(CH_2-\underset{\underset{CO_2CH_2CH=CH_2}{|}}{\overset{\overset{CH_3}{|}}{C}}\right)_{\!x}\!\!-\!\!\left(CH_2-\underset{\underset{CO_2H}{|}}{\overset{\overset{CH_3}{|}}{C}}\right)_{\!y}\!\!-\!\!\left(CH_2-\underset{\underset{COOR}{|}}{\overset{\overset{CH_3}{|}}{C}}\right)_{\!z}\!\!-$$

x/y/z stands for a molar ratio.

| | x | y | z | R | Mw |
|---|---|---|---|---|---|
| P-(1) | 80 | 20 | 0 | — | 40,000 |
| P-(2) | 80 | 20 | 0 | — | 110,000 |
| P-(3) | 80 | 20 | 0 | — | 10,000 |
| P-(4) | 90 | 10 | 0 | — | 40,000 |
| P-(5) | 50 | 50 | 0 | — | 40,000 |
| P-(6) | 30 | 20 | 50 | $CH_2CH_2CH_3$ | 30,000 |
| P-(7) | 20 | 30 | 50 | $CH_2CH_2CH_2CH_3$ | 50,000 |
| P-(8) | 70 | 20 | 10 | $CH(CH_3)_3$ | 60,000 |
| P-(9) | 70 | 20 | 10 | —$CH_2CHCH_2CH_2CH_2CH_3$ $\quad\quad\;\;\;$ $\mid$ $\quad\quad\;\;\;$ $CH_2CH_3$ | 150,000 |
| P-(10) | 40 | 30 | 30 | —$CH_2$—$\phantom{xx}$⟨phenyl⟩ | 15,000 |

| | $-(CH_2-\underset{\underset{CO_2CH_2CH=CH_2}{\mid}}{\overset{\overset{CH_3}{\mid}}{C}})_{80}-(A)_{20}-$ | |
|---|---|---|
| | A | Mw |
| P-(11) | $-CH_2-\underset{\underset{COOH}{\mid}}{CH}-$ | 20,000 |
| P-(12) | $-CH_2-\underset{\underset{CO_2CH_2CH_2COOH}{\mid}}{CH}-$ | 30,000 |
| P-(13) | $-CH_2-\underset{\underset{\underset{\underset{SO_3Na}{\mid}}{\bigcirc}}{\mid}}{CH}-$ | 100,000 |
| P-(14) | $-CH_2-\underset{\underset{CO_2CH_2CH_2SO_3H}{\mid}}{\overset{\overset{CH_3}{\mid}}{C}}-$ | 20,000 |
| P-(15) | $-CH_2-\underset{\underset{CO_2CH_2CH_2OP(OH)_2}{\mid}}{\overset{\overset{CH_3}{\mid}}{C}}-$ (with =O) | 50,000 |
| P-(16) | $-CH_2-\underset{\underset{CO_2CH_2CH_2O-(CH_2)_5-OP(OH)_2}{\mid}}{CH}-$ (with =O) | 15,000 |

| | $-(A)_{80}-(CH_2-\underset{\underset{COOH}{\mid}}{\overset{\overset{CH_3}{\mid}}{C}})_{20}-$ | |
|---|---|---|
| | A | Mw |
| P-(17) | $-CH_2-\underset{\underset{COOCH_2CH_2OCH=CH-C_6H_5}{\mid}}{\overset{\overset{CH_3}{\mid}}{C}}-$ | 20,000 |
| P-(18) | $-CH_2-\underset{\underset{COOCH_2CH_2OCCH_2CH=CH_2}{\mid}}{CH}-$ (with =O) | 25,000 |
| P-(19) | $-CH_2-\underset{\underset{COO-CH_2-C_6H_4-CH=CH_2}{\mid}}{\overset{\overset{CH_3}{\mid}}{C}}-$ | 18,000 |
| P-(20) | $-CH_2-\underset{\underset{C_6H_4-OCCH_2CH=CH_2}{\mid}}{CH}-$ (with =O) | 20,000 |
| P-(21) | $-CH_2-\underset{\underset{CONHCH_2CH_2OCCH=CH_2}{\mid}}{CH}-$ (with =O) | 35,000 |

$-(CH_2-\underset{\underset{COOR^1}{\mid}}{\overset{\overset{CH_3}{\mid}}{C}})_x- \quad -(CH_2-\underset{\underset{COOH}{\mid}}{\overset{\overset{CH_3}{\mid}}{C}})_y- \quad -(CH_2-\underset{\underset{COOR^2}{\mid}}{\overset{\overset{CH_3}{\mid}}{C}})_z-$

| | $R^1$ | $R^2$ | x | y | z | Mw |
|---|---|---|---|---|---|---|
| P-(22) | $CH_2CH_2OCCH=CH_2$ (with =O) | $C_4H_9(n)$ | 10 | 10 | 80 | 25,000 |
| P-(23) | $CH_2CH_2OCCH=CH_2$ (with =O) | $C_4H_9(t)$ | 10 | 10 | 80 | 25,000 |
| P-(24) | $CH_2CH_2OC(CH_3)=CH_2$ (with =O) | $C_4H_9(n)$ | 10 | 10 | 80 | 500,000 |

-continued $$-(CH_2-\underset{\underset{COOR^1}{|}}{\overset{\overset{CH_3}{|}}{C}})_x- \quad -(CH_2-\underset{\underset{COOH}{|}}{\overset{\overset{CH_3}{|}}{C}})_y- \quad -(CH_2-\underset{\underset{COOR^2}{|}}{\overset{\overset{CH_3}{|}}{C}})_z-$$

| | $R^1$ | $R^2$ | x | y | z | Mw |
|---|---|---|---|---|---|---|
| P-(25) | 4-hydroxycyclohexylmethyl acrylate ester | $C_4H_9(n)$ | 10 | 10 | 80 | 23,000 |
| P-(26) | 4-hydroxycyclohexylmethyl acrylate ester | $C_4H_9(n)$ | 80 | 10 | 10 | 30,000 |
| P-(27) | 4-hydroxycyclohexylmethyl acrylate ester | $C_4H_9(n)$ | 50 | 20 | 30 | 30,000 |
| P-(28) | 4-hydroxycyclohexylmethyl acrylate ester | $C_4H_9(t)$ | 10 | 10 | 80 | 20,000 |
| P-(29) | 4-hydroxycyclohexylmethyl acrylate ester | $CH_2CH_2OH$ | 50 | 10 | 40 | 20,000 |
| P-(30) | 4-hydroxycyclohexylmethyl methacrylate ester | $C_4H_9(n)$ | 10 | 10 | 80 | 25,000 |
| P-(31) | $-(CH_2-CH)-$ with phenyl–O–$CH_2CH(OCCH=CH_2)CH_2OOC$–(phthalic acid COOH) | | | | | Mw = 60,000 |
| P-(32) | $-(CH_2-\underset{\underset{CO_2CH_2CH=CH_2}{|}}{\overset{\overset{CH_3}{|}}{C}})-S-COOH$ | | | | | Mw = 10,000 |
| P-(33) | $-(CH_2-\underset{\underset{CO_2CH_2CH=CH_2}{|}}{\overset{\overset{CH_3}{|}}{C}})-S-\underset{\underset{CHCH_2COOH}{}}{\overset{\overset{COOH}{|}}{C}}H$ | | | | | Mw = 20,000 |

-continued

| | $-\text{(CH}_2-\underset{\underset{\text{COOR}^1}{|}}{\overset{\overset{\text{CH}_3}{|}}{\text{C}}}\text{)}_x-$ | $-\text{(CH}_2-\underset{\underset{\text{COOH}}{|}}{\overset{\overset{\text{CH}_3}{|}}{\text{C}}}\text{)}_y-$ | $-\text{(CH}_2-\underset{\underset{\text{COOR}^2}{|}}{\overset{\overset{\text{CH}_3}{|}}{\text{C}}}\text{)}_z-$ | | | | |
|---|---|---|---|---|---|---|---|
| | $R^1$ | $R^2$ | x | y | z | Mw | |
| P-(34) | $-\text{(CH}_2-\text{CH)}_{80}-$ <br> $\mid$ <br> $\text{CO}_2\text{CH}_2\text{CH}=\text{CH}_2$ | $-\text{(CH}_2-\text{CH)}_{20}-$ <br> $\mid$ <br> $\text{CO}_2\text{CH}_2\text{CH}_2\text{COOH}$ | | | | Mw = 30,000 (block copolymer) | |
| P-(35) | $-\text{(CH}_2-\overset{\overset{\text{CH}_3}{|}}{\underset{\underset{\text{CO}_2\text{CH}_2\text{CH}_2\text{OCCH}=\text{CH}_2}{|}}{\text{CH}}}\text{)}_{80}-$ <br> $\qquad\qquad\qquad\qquad\parallel$ <br> $\qquad\qquad\qquad\qquad\text{O}$ | $-\text{(CH}_2\overset{\overset{\text{COOH}}{|}}{\text{CH}}\text{)}_{20}-$ | | | | Mw = 15,000 (block copolymer) | |
| P-(36) | $-\text{(CH}_2-\underset{\underset{\text{CO}_2\text{CH}_2-\triangleleft\text{O}}{|}}{\overset{\overset{\text{CH}_3}{|}}{\text{C}}}\text{)}_{80}-$ | $-\text{(CH}_2-\underset{\underset{\text{CO}_2\text{H}}{|}}{\overset{\overset{\text{CH}_3}{|}}{\text{C}}}\text{)}_{20}-$ | | | | Mw = 8,000 | |
| P-(37) | $-\text{(CH}_2-\underset{\underset{\text{CO}_2\text{CH}_2\text{CH}_2\text{CH}_2\text{Si(OCH}_2\text{CH}_3)_3}{|}}{\overset{\overset{\text{CH}_3}{|}}{\text{C}}}\text{)}_{80}-$ | $-\text{(CH}_2-\underset{\underset{\text{COOH}}{|}}{\overset{\overset{\text{CH}_3}{|}}{\text{C}}}\text{)}_{20}-$ | | | | Mw = 5,000 | |
| P-(38) | $-\text{(CH}-\text{CH}_2-\text{O)}_{80}-$ <br> $\mid$ <br> $\text{CH}_2-\text{O-(CH}_2\text{)}_3-\text{OCCH}=\text{CH}_2$ <br> $\qquad\qquad\qquad\qquad\parallel$ <br> $\qquad\qquad\qquad\qquad\text{O}$ | $-\text{(CH}-\text{CH}-\text{O)}_{20}-$ <br> $\mid$ <br> $\text{CH}_2\text{O-(CH}_2\text{)}_3-\text{Si(OCH}_2\text{CH}_3)_3$ | | | | Mw = 10,000 | |

[0151]

1-(13) Antifouling Agent

To impart various characteristics such as antifouling properties, water resistance, chemical resistance and slipperiness, it is preferable to add an appropriate amount of a publicly known silicone- or fluorine-based antifouling agent, a slipping agent and so on to the film of the invention, in particular, the uppermost layer of the film.

In the case of using such an additive, the amount thereof preferably ranges from 0.01 to 20% by weight, more preferably from 0.05 to 10% by weight and particularly preferably from 0.1 to 5% by weight based on the total solid matters in the low refractive index layer.

Preferable examples of the silicone-based compound include a compound which contains a plural number of dimethylsilyloxy units as a repeating unit and has substituent(s) at an end and/or a side chain thereof. It may contain a structural unit other than the dimethylsilyloxy units in the chain having the dimethylsilyloxy units as the constitutional unit. The substituents may be either the same or different and it is preferable that the compound has two or more substituents. Examples of preferable substituents include an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group or an amino group. Although the molecular weight thereof is not particularly restricted, it is preferably not more than 100,000, more preferably not more than 50,000, particularly preferably from 3,000 to 30,000 and most preferably from 10,000 to 20,000. Although the silicon atom content in the silicone-based compound is not particularly restricted, it is preferably 18.0% by weight ore more, more preferably from 25.0 to 37.8% by weight and most preferably from 30.0 to 37.0% by weight. Preferable examples of the silicone-based compound include "X-22-174DX", "X-22-2426", "X-22-164B", "X-22-164C", "X-22-170DX", "X-22-176D", and X-22-1821" (trade names, each manufactured by SHIN-ETSU CHEMICAL Co.), "FM-0725", "FM-7725", "FM-4421", "FM-5521", "FM-6621" and "FM-1121" (trade names, each manufactured by Chisso Corporation), and "DMS-U22", "RMS-033", "RMS-083", "UMS-182", "DMS-H21", "DMS-H31", "HMS-301", "FMS121", "FMS123", "FMS131", "FMS141" and "FMS221" (trade names, each manufactured by Gelest), though the invention is not restricted thereto.

As the fluorine-based compound as described above, a compound having a fluoroalkyl group is preferred. It is preferable that the fluoroalkyl group has from 1 to 20 carbon atoms, more preferably from 1 to 10 carbon atoms. It may have either a linear structure {for example, $-CF_2CF_3$, $-CH_2(CF_2)_4H$, $-CH_2(CF_2)_8CF_3$, $-CH_2CH_2(CF_2)_4$ and so on}, a branched structure {for example, $-CH(CF_3)_2$, $-CH_2CF(CF_3)_2$, $-CH(CH_3)CF_2CF_3$, $-CH(CH_3)(CF_2)_5CF_2H$ and so on}, or an alicyclic structure (preferably a 5-membered or 6-membered ring such as a perfluorocyclohexyl group, a perfluorocyclopentyl group or an alkyl group substituted by such a group and so on). Moreover, it may have an ether bond (for example, $-CH_2OCH_2CF_2CF_3$, $-CH_2CH_2OCH_2C_4F_8H$, $-CH_2CH_2OCH_2CH_2C_8F_{17}$, $-CH_2CH_2OCF_2CF_2OCF_2CF_2H$ and so on). Two or more fluoroalkyl groups may be contained in a single molecule.

It is preferable that the fluorine-based compound further has a substituent which contributes to the formation of a bond with the coating film of the low refractive index layer or the compatibility therewith. It may have either the same or different substituents and two or more substituents are preferred. Preferable examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group, an amino group and so on. The fluorine-based compound may be a polymer or an oligomer with a fluorine-free compound and the molecular weight thereof is not particularly restricted. Although the fluorine content in the fluorine-based compound is not particularly restricted, it is preferably 20% by weight or above, more preferably from 30 to 70% by weight and most preferably from 40 to 70% by weight. Preferable examples of the fluorine-based compound include "R-2020", "M-2020", "R-3833" and "M-3833" (trade names, each manufactured by DAIKIN INDUSTRIES, Ltd.), "MEGAFAC F-171", "MEGAFAC F-172", "MEGAFAC F-179A" and "DEFENSA MCF-300" (trade names, each manufactured by DAINIPPON INK & CHEMICALS, Co.) and so on, though the invention is not restricted thereto.

To impart favorable characteristics such as dust proofness and antistatic properties, it is possible to add a publicly known dust proof agent such as a cationic surfactant or a polyoxyalkylene compound, an antistatic agent and so on. The structural units of such dust proof agent and antistatic agent may be contained as one of the functions thereof in the silicone-based compound or the fluorine-based compound as described above. In the case of using these additives, the content thereof is preferably from 0.01 to 20% by weight, more preferably from 0.05 to 10% by weight and particularly preferably from 0.1 to 5% thereof, based on the total solid matters in the low refractive index layer. Preferable examples of these compounds include "MEGAFAC F-150" (trade name, manufactured by DAINIPPON INK & CHEMICALS, Co.) and "SH-3748" (trade name, manufactured by DOW CORNING TORAY) and so on, though the invention is not restricted thereto.

1-(14) Surfactant

To ensure an excellent surface uniformity free from, for example, coating irregularity, drying irregularity or defect spots, the coating solution for forming light scattering layer preferably contains a fluorine-based surfactant, a silicone-based surfactant or both of them. It is particularly preferable to employ a fluorine-based surfactant, since it can exert effects of improving plane failures such as coating irregularity, drying irregularity or defect spots even in a smaller amount. Such surfactants are added in order to improve the plane uniformity while imparting suitability for high-speed coating to thereby elevate the productivity.

Preferable examples of the fluorine-based surfactant include a copolymer containing a fluoroaliphatic group (hereinafter sometimes abbreviated as "a fluoropolymer"). As the fluoropolymer, an acrylic resin and a methacrylic resin containing a repeating unit corresponding to a monomer represented by the following formula (i) or a repeating unit corresponding to a monomer represented by the following formula (i) together with another repeating unit corresponding to a monomer represented by the following formula (ii) and a copolymer with a vinyl-based monomer copolymerizable with the above monomer(s).

(i) Fluoroaliphatic Group-Containing Monomer Represented by Formula (a)

Formula (a):

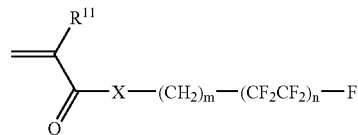

In the formula (a), $R^{11}$ represents a hydrogen atom or methyl group; X represents an oxygen atom, a sulfur atom or —N($R^{12}$)—; m represents an integer of from 1 to 6; and n represents an integer of from 2 to 4. $R^{12}$ represents a hydrogen atom or an alkyl group having from 1 to 4 carbon atoms (for example, a methyl group, an ethyl group, a propyl group or a butyl group), and a hydrogen atom or a methyl group is preferred. As X, an oxygen atom is preferred.

(ii) Monomer Being Represented by the Following Formula (b) and Copolymerizable with the Above Monomer (i)

Formula (b):

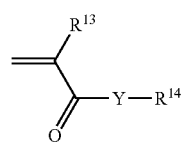

In the formula (b), $R^{13}$ represents a hydrogen atom or methyl group; and Y represents an oxygen atom, a sulfur atom or —N($R^{15}$)—. $R^{15}$ represents a hydrogen atom or an alkyl group having from 1 to 4 carbon atoms (for example, a methyl group, an ethyl group, a propyl group or a butyl group), and a hydrogen atom or a methyl group is preferred. As Y, an oxygen atom, —N(H)— or —N($CH_3$)— is preferred.

$R^{14}$ represents a linear, branched or cyclic alkyl group having from 4 to 20 carbon atoms and optionally having a substituent. Examples of the substituent of the alkyl group $R^{14}$ include a hydroxyl group, an alkylcarbonyl group, an arylcarbonyl group, a carboxyl group, an alkyl ether group, an aryl ether group, a halogen atom such as a fluorine atom, a chlorine atom or an iodine atom, a nitro group, a cyano group and an amino group, though the invention is not restricted thereto. Appropriately usable examples of the linear, branched or cyclic alkyl group having from 4 to 20 carbon atoms include a butyl group, a pentyl group, a hexyl group, a heptyl group, an octyl group, a nonyl group, a decyl group, an undecyl group, a dodecyl group, a tridecyl group, a tetradecyl group, a pentadecyl group, an octadecyl group and an eicosanyl group, each of which may be either linear or branched, monocylic cycloalkyl groups such as a cyclohexyl group and a cycloheptyl group, and polycyclic cycloalkyl groups such as a bicyclodecyl group, a tricycloundecyl group, a tetracyclododecyl group, an adamantyl group, a norbornyl group and a tetracyclodecyl group.

The amount of the fluoroaliphatic group-containing monomer represented by the formula (b) that is to be used in the fluoropolymer employed in the invention is 10% by mol or more, preferably from 15 to 70% by mol and more preferably from 20 to 60% by mol, based on the individual monomers of the fluoropolymer.

The weight-average molecular weight of the fluoropolymer to be used in the invention is preferably from 3,000 to 100,000, more preferably from 5,000 to 80,000.

It is preferable that the fluoropolymer to be used in the invention is added in an amount of from 0.001 to 5 parts by weight, more preferably from 0.00 t to 3 parts by weight and more preferably from 0.1 to 1 part by weight per 100 parts by weight of the coating solution. So long as the fluoropolymer is added in an amount of 0.001 part by weight or more, the effect of the addition of the fluoropolymer can be sufficiently established. So long as the content thereof is not more than 5 parts by weight, there arises no trouble such as insufficient drying of the coating film or worsening in the properties (for example, reflectivity and scratch resistance) of the coating film.

Next, specific structural examples of the fluoropolymer derived from the repeating unit corresponding to the fluoroaliphatic group-containing monomer represented by the formula (a) will be presented, though the invention is not restricted thereto. Each of the numerical values in these formulae stands for the molar ratio of the monomer. Mw represents weight-average molecular weight.

FP-1
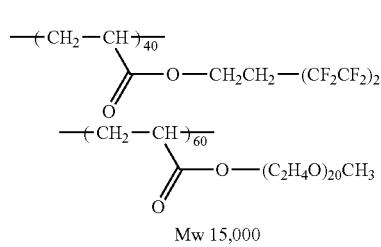
Mw 15,000

FP-2
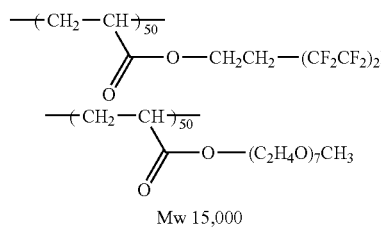
Mw 15,000

FP-3
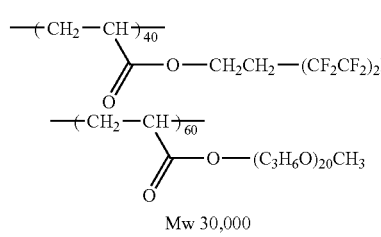
Mw 30,000

FP-4
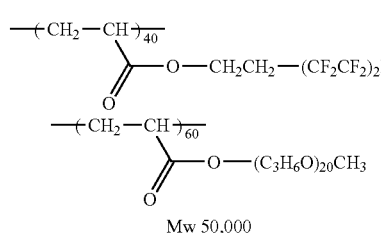
Mw 50,000

FP-5
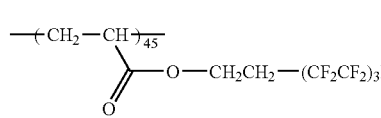

-continued
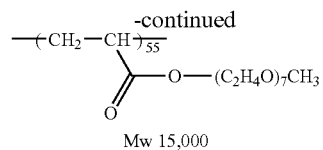
Mw 15,000

FP-6
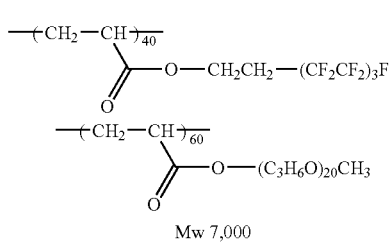
Mw 7,000

FP-7
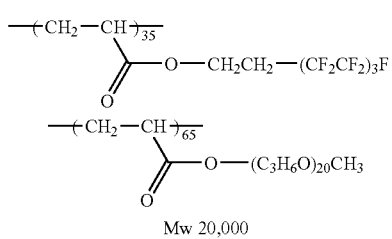
Mw 20,000

FP-8
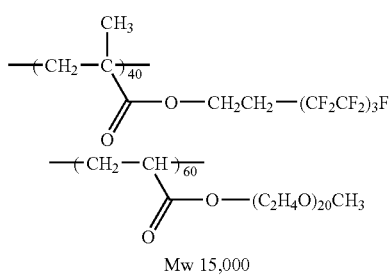
Mw 15,000

FP-9
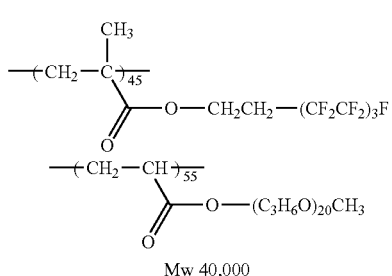
Mw 40,000

FP-10
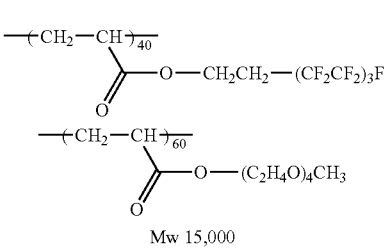
Mw 15,000

FP-11
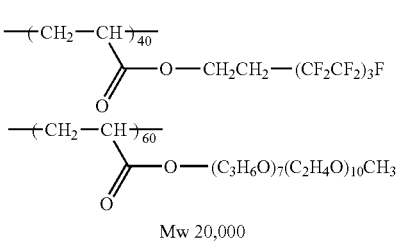
Mw 20,000

-continued

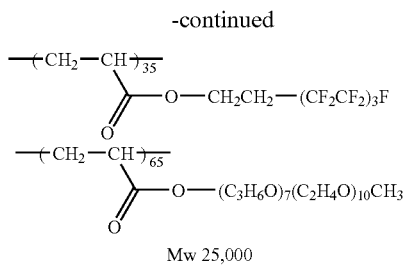

FP-12

Mw 25,000

1-(15) Thickener

In the film according to the invention, a thickener may be used to control the viscosity of the coating solution.

The term "thickener" as used herein means a substance the addition of which results in an increase in the viscosity of a liquid. It is preferable to use a thickener the addition of which results in an increase in the viscosity of the coating solution of from 0.05 to 50 cP, more preferably from 0.10 to 20 cP and most preferably from 0.10 to 10 cP.

Examples of the thickener include the following ones, though the invention is not restricted thereto.

Poly-ε-caprolactone
Poly-ε-caprolactone diol
Poly-ε-caprolactone triol
Polyvinyl acetate
Poly(ethylene adipate)
Poly(1,4-butylene adipate)
Poly(1,4-butylene glutarate)
Poly(1,4-butylene succinate)
Poly(1,4-butylene terephthalate)
Poly(ethylene terephthalate)
Poly(2-methyl-1,3-propylene adipate)
Poly(2-methyl-1,3-propylene glutarate)
Poly(neopentylglycol adipate)
Poly(neopentylglycol cebacate)
Poly(1,3-propylene adipate)
Poly(1,3-propylene glutarate)
Polyvinylbutyral
Polyvinylformal
Polyvinylacetal
Polyvinylpropanal
Polyvinylhexanal
Polyvinylpyrrolidone
Polyacrylic ester
Polymethacrylic ester
Cellulose acetate
Cellulose propionate
Cellulose acetate butyrate In addition to these thickeners, use can be made of publicly known viscosity-controlling agents and thixotropy imparting agents, for example, smectite, fluorine tetrasilicon mica, bentonite, silica, montmorilonite, montmorillonite and polyacrylic soda as described in JP-A-8-325491, ethylcellulose, polyacrylic acid and organic clay as described in JP-A-10-219136.

1-(16) Coating Solution

As the solvents to be used in the coating solutions for forming the individual layers of the film according to the invention, use can be made of various solvents that are selected from such viewpoints as allowing the dissolution or dispersion of individual components, easily achieving an excellent surface uniformity in the coating and drying steps, ensuring a high storage stability of the solution and having an adequate saturated vapor pressure.

It is also possible to use a mixture of two or more solvents. To lessen the load during drying, it is preferable to use a solvent which contains a solvent having a boiling point of 100° C. or lower under atmospheric pressure as the main component together with a small amount of another solvent having a boiling point of 100° C. or higher for controlling the drying speed.

Examples of the solvent having a boiling point of 100° C. or lower include hydrocarbons such as hexane (boiling point: 68.7° C.), heptane (98.4° C.), cyclohexane (80.7° C.) and benzene (80.1° C.),); halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.); ethers such as diethyl ether (34.6° C.), diisopropyl ether (68.5° C.), dipropyl ether (90.5° C.) and tetrahydrofuran (66° C.); esters such as ethyl formate (54.2° C.), methyl acetate (57.8° C.), ethyl acetate (77.1° C.) and isopropyl acetate (89° C.); ketones such as acetone (56.1° C.) and 2-butanone (the same as methyl ethyl ketone; 79.6° C.); alcohols such as methanol (64.5° C.), ethanol (78.3° C.), 2-propanol (82.4° C.) and 1-propanol (97.2° C.); cyano compounds such as acetonitrile (81.6° C.) and propionitrile (97.4° C.); carbon disulfide (46.2° C.), and so on. Among all, ketones and esters are preferred and ketones are particularly preferred. Among ketones, 2-butanone is particularly preferable.

Examples of the solvent having a boiling point of 100° C. or higher include octane (125.7° C.), toluene (110.6° C.), xylene (138° C.), tetrachloroethylene (121.2° C.), chlorobenzene (13.17° C.), dioxane (101.3° C.), dibutyl ether (142.4° C.), isobutyl acetate (118° C.), cyclohexanone (155.7° C.), 2-methyl-4-pentanone (the same as MIBK; 115.9° C.), 1-butanol (117.7° C.), N,N-dimethylformamide (153° C.), N,N-dimethylacetamide (166° C.), dimethyl sulfoxide (189° C.) and so on. Cyclohexanone and 2-methyl-4-pentanone are preferred.

1-(17) Others

In addition to the components as described above, the film of the invention may contain, for example, a resin, a coupling agent, a coloration inhibitor, a coloring agent (a pigment or a dye), a defoaming agent, a leveling agent, a flame retardant, an ultraviolet light absorber, an infrared light absorber, a tackifier, a polymerization inhibitor or a surface modifier.

1-(18) Support

As the support of the film according to the invention, use may be made of, for example, a transparent resin film, a transparent resin plate, a transparent resin sheet or a transparent glass without specific restriction. As the transparent resin film, it is possible to use, for example, a cellulose acylate film (for example, a cellulose triacetate film (refractive index 1.48), a cellulose diacetate film, a cellulose acetate butyrate film or a cellulose acetate propionate film), a polyethylene terephthalate film, a polyether sulfone film, a polyacrylic resin film, a polyurethane resin film, a polyester film, a polycarbonate film, a polysulfone film, a polyether film, a polymethylpentene film, a polyether ketone film, a (meth)acryinitrile film and so on.

A support having a thickness of from about 25 μm to about 1000 μm may be generally employed. The thickness thereof preferably ranges from 25 μm to 250 μm and more preferably from 30 μm to 90 μm.

Although a support having an arbitrary width may be used, a support having a width of from 100 to 5000 mm is used from the viewpoints of handling, yield and productivity. The width preferably ranges from 800 to 3000 mm and more preferably from 1000 to 2000 mm.

It is preferable that the support has a smooth surface. The average roughness Ra is preferably 1 µm or less, more preferably from 0.0001 to 0.5 µm and more preferably from 0.001 to 0.1 µm.

<Cellulose Acylate Film>

Among these various films as discussed above, a cellulose acylate film, which has a high transparency, shows little optical birefringence, can be easily produced and has been generally employed as a protective film for a polarizing plate, is preferred.

There have been known various techniques for improving the properties (for example, mechanical characteristics, transparency, surface planarity and so on) of cellulose acylate films. Techniques described in Japan Institute of Invention and Innovation Journal of Technical Disclosure No. 2001-1745 are applicable to the film of the invention as publicly known techniques.

Among cellulose acylate films, it is particularly preferable in the invention to use a cellulose triacetate film. In the cellulose triacetate film, use is preferably made of cellulose acetate having a degree of acetylation of from 59.0 to 61.5%. The term "degree of acetylation" means the acetic acid content per unit weight of cellulose. The degree of acetylation is measured and calculated in accordance with ASTM:D-817-91 (Tests of cellulose acetate).

The viscosity-average degree of polymerization (DP) of cellulose acylate is preferably 250 or above and more preferably 290 or above.

In the cellulose acylate to be used in the invention, it is also preferable that Mw/Mn determined by gel permeation chromatography (wherein Mw represents the weight-average molecular weight while Mn represents the number-average molecular weight) is as close to 1.0 as possible, i.e., having a narrow molecular weight distribution. More specifically speaking, it is preferable that the Mw/Mn ranges from 1.0 to 1.7, more preferably from 1.3 to 1.65 and most preferably from 1.4 to 1.6.

In general, the hydroxyl groups at the 2-, 3- and 6-positions in cellulose acylate are not evenly distributed each by ⅓ based on the total degree of substitution but the degree of substitution at the 6-position tends to be smaller. It is preferable in the invention that the degree of substitution at the 6-position exceeds those at the 2- and 3-positions.

It is preferable that the hydroxyl groups at the 6-position have been substituted by acyl groups at the ratio of 32% or higher, more preferably 33% or higher and particularly preferably 34% or higher, based on the total degree of substitution. In the cellulose acylate, it is further preferable that the degree of substitution by acyl groups at the 6-position is 0.88 or more. The hydroxyl groups at the 6-position may be substituted by an acyl group having three or more carbon atoms such as a propionyl group, a butyroyl group, a valeroyl group, a benzoyl group or an acryloyl group, in addition to an acetyl group. The degree of substitution at each position can be determined by NMR.

As the cellulose acylate in the invention, use can be made of cellulose acylates obtained by the methods described in JP-A-11-5851, (Examples), (Synthesis Example 1) (paragraphs (0043 to (0044)), (Synthesis Example 2) (paragraphs (0048 to (0049)) and (Synthesis Example 3) (paragraphs (0051) to (0052)).

<Polyethylene Terephthalate Film>

In the invention, it is also preferable to use a polyethylene terephthalte film since it is excellent in transparency, mechanical strength, planarity, chemical resistance and moisture resistance.

To further elevate the adhesion strength between the transparent plastic film and the light diffusion layer to be provided thereon, it is preferable to use a transparent plastic film having been subjected to a treatment for facilitating adhesion.

As examples of a PET film provided with an adhesion-facilitating layer for optical use, there can be enumerated COSMOSHINE A4100 and A4300 (manufactured by Toyobo Co., Ltd.).

2. Layers Constituting Film

Films according to the invention can be obtained by mixing various compounds as described above and applying the same. As discussed above, an optical film of the invention has a light diffusion layer containing light-transmitting particles and a binder on a transparent support. An antireflective film of the invention has a low refractive index layer on the light diffusion layer of the optical film as described above. In addition to the functional layers such as the light diffusion layer and the low refractive index layer, the optical film and the antireflective film according to the invention may have other functional group(s), if needed. Next, the individual layers constituting the films of the invention will be illustrated.

2-(1) Hard Coat Layer

To impart mechanical strength to film, a hard coat layer is formed preferably on one face of the transparent support of the film according to the invention. In a preferred embodiment, hard coat properties may be imparted to the light diffusion layer so that the light diffusion layer also serves as a hard coat layer, as will be described in "2-(2) Light diffusion layer" and "3. Layer constitution of film". In the case of forming a hard coat layer separately form the light diffusion layer, the hard coat layer may be provided either in the transparent support side of the light diffusion layer or in the opposite side, though the transparent support side is preferred.

It is preferable that an optical film of the invention has a hard coat layer, which alters the arithmetic average roughness (Ra) of the light diffusion layer (that is, the hard coat layer alters the arithmetic average roughness (Ra) of the surface of the optical film as described above), is layered on the light diffusion layer of the optical film. The expression "a hard coat layer which alters the arithmetic average roughness (Ra) of the light diffusion layer as described above" means a hard coat layer having been controlled by a method of smoothening the peaks and valleys on the surface of the light diffusion layer to thereby give smooth peaks and valleys, a method of reducing the frequency of the peaks and thus enlarging the intervals among the peaks and valleys (i.e., elevating the Sm value) or a method of lowering the peaks (i.e., lowering the Ra value), when formed on the light diffusion layer.

The hard coat layer may consist of two or more layers laminated together.

From the viewpoint of imparting a sufficient durability and impact resistance to the film, the thickness of the hard coat layer usually ranges from about 0.5 µm to about 50 µm, preferably from 1 µm to 20 µm, more preferably from 2 µm to 10 µm and most preferably from 3 µm to 7 µm.

It is also preferable that the hard coat layer has a strength of H or above, more preferably 2 H or above, more preferably 3 H or above and most preferably 4 H or above, when determined by the pencil hardness test.

Moreover, a less abrasion of the test piece before and after the taber test in accordance with JIS K5400 is preferred.

The hard coat layer is preferably formed by a crosslinkage reaction or polymerization of an ionizing radiation curable compound. For example, it can be formed by applying a coating composition containing an ionizing radiation curable polyfunctional monomer or polyfunctional oligomer on the transparent support and then subjecting toe polyfunctional monomer or the polyfunctional oligomer to crosslinkage or polymerization.

As the functional groups in the ionizing radiation curable polyfunctional monomer or polyfunctional oligomer, those undergoing polymerization upon light, electron beam or ionizing radiation are preferable and photopolymerizable functional groups are particularly preferable.

Examples of the photopolymerizable functional groups include unsaturated polymerizable functional groups such as a (meth)acryloyl group, a vinyl group, a styryl group and an allyl group and a (meth)acryloyl group is particularly preferable.

In order to control the refractive index of the hard coat layer, the binder in the hard coat layer may contain a high refractive index monomer, inorganic particles or both of them. The inorganic particles have an effect of preventing shrinkage caused by curing, in addition to the effect of controlling the refractive index. In the invention, a polymer formed by the polymerization of the polyfunctional monomer and/or the high refractive index monomer after the formation of the hard coat layer, which contains the inorganic particles dispersed therein, is referred to as the binder.

In order to lessen marks, color irregularities, brightness irregularities and dazzling in a liquid crystal panel due to the internal scattering within the hard coat layer or impart a function of enlarging the viewing angle due to scattering, the internal haze (the value calculated by subtracting the surface haze from the total haze) preferably ranges from 0% to 60%, more preferably from 10% to 40% and most preferably from 20% to 30%.

In the film according to the invention, the surface haze and the internal haze can be freely designed depending on the purpose.

2-(2) Light Diffusion Layer

As described above, an optical film of the invention has a light diffusion layer containing light-transmitting particles and a binder on a transparent support, wherein the light diffusion layer has a specific average thickness. The light diffusion layer, which imparts antiglare properties to the film by surface scattering, preferably contributes to the hard coat properties of the film for improving the scratch resistance of the film. In a preferred embodiment, therefore, the light diffusion layer also serves as a hard coat layer.

The antireflective film of the invention is an antireflective film that has a low refractive index layer on the light diffusion layer of the optical film as described above. In a preferred case, the antireflective film is further provided with a medium refractive index layer and a high refractive index layer between the light diffusion layer, a hard coat layer formed if necessary and the low refractive index layer. From the viewpoint of optical design for obtaining an antireflective film, the refractive index of the light diffusion layer in the invention preferably falls within the range of 1.48 to 2.00, more preferably 1.52 to 1.90 and more preferably 1.55 to 1.80. In the invention, at least one low refractive index layer is formed on the light diffusion layer. When the refractive index is smaller than the lower limit as defined above, the antireflective properties are worsened. When the refractive index is too large, the color of the reflected light tends to be strengthen.

As a method of imparting antiglare properties, there have been known a method of forming a mat-shaped shaping film having small peaks and valleys on the surface by the lamination method as disclosed in JP-A-6-16851, a method of subjecting an ionizing radiation curable resin to shrinkage due to curing depending on the difference in ionizing radiation doses as disclosed in JP-A-2000-206317, a method of reducing the weight ratio of a good solvent to a light-transmitting resin by drying and thus gelling/solidifying light-transmitting microparticles and the light-transmitting resin so as to form peaks and valleys on the film surface as disclosed in JP-A-2000-338310, and a method of forming peaks and valleys on the surface by applying external pressure as disclosed in JP-A-2000-275404 and use can be made of these publicly known methods.

It is preferable that the light diffusion layer to be used in the invention is a light diffusion layer which contains, as the essential component(s), a composition for forming light diffusion layer (more preferably, a coating composition containing a binder-forming component capable of imparting hard coat properties, light-transmitting particles for imparting antiglare properties and a solvent) and on which small peaks and valleys can be formed due to convexes formed by the individual light-transmitting particles or convexes formed by a weight of the light-transmitting particles in the step of forming the light diffusion layer.

Specific examples of the light-transmitting particles are those as described in 1-(8) Light-transmitting particles. That is to say, preferable examples thereof include resin particles such as acryl particles, crosslinked acryl particles, polystyrene particles, crosslinked styrene particles, melamine resin particles and benzoguanamine particles. Among all, crosslinked styrene particles, crosslinked poly(acryl-styrene) particles and crosslinked acryl particles are preferred.

Although the average thickness of the light diffusion layer can be measured by an arbitrary method without restriction, it can be measured by, for example, enlarging the sectional view with an electron microscope (5,000× magnification), transcribing the light diffusion layer onto a tracing paper (Se-TD58:50 g/m$^2$, manufactured by KOKUYO) and then determining the weight. The light diffusion layer is measured in the length of 1500 μm (parallel direction) and the average thickness is calculated. The average thickness of the light diffusion layer is from 1.4 to 3.5 times as large as the average particle size, preferably from 1.5 to 3.0 times, more preferably 1.5 to 2.5 times and particularly preferably 1.6 to 2.0 times.

Figure 10:
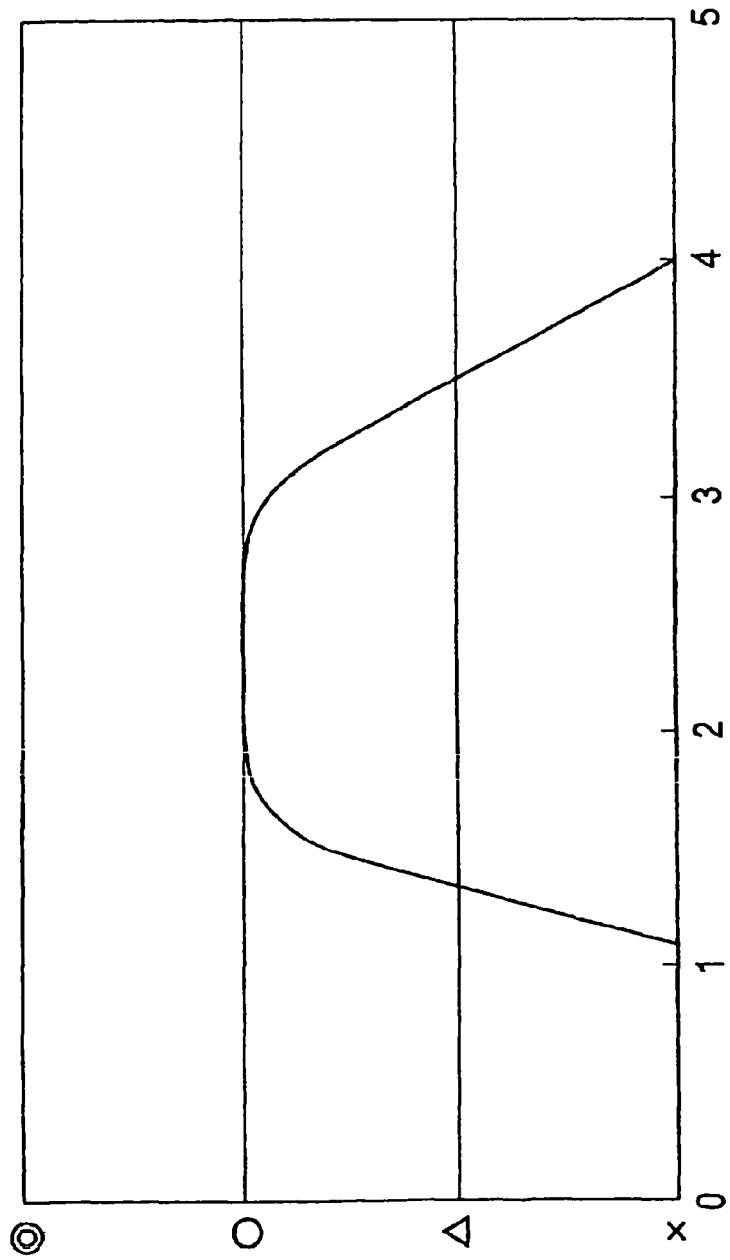
FIG. 10 is a diagram schematically showing the relationship among the thickness of a light diffusion layer, the average particle diameter of light-transmitting particles and antiglare properties.
Figure 11:
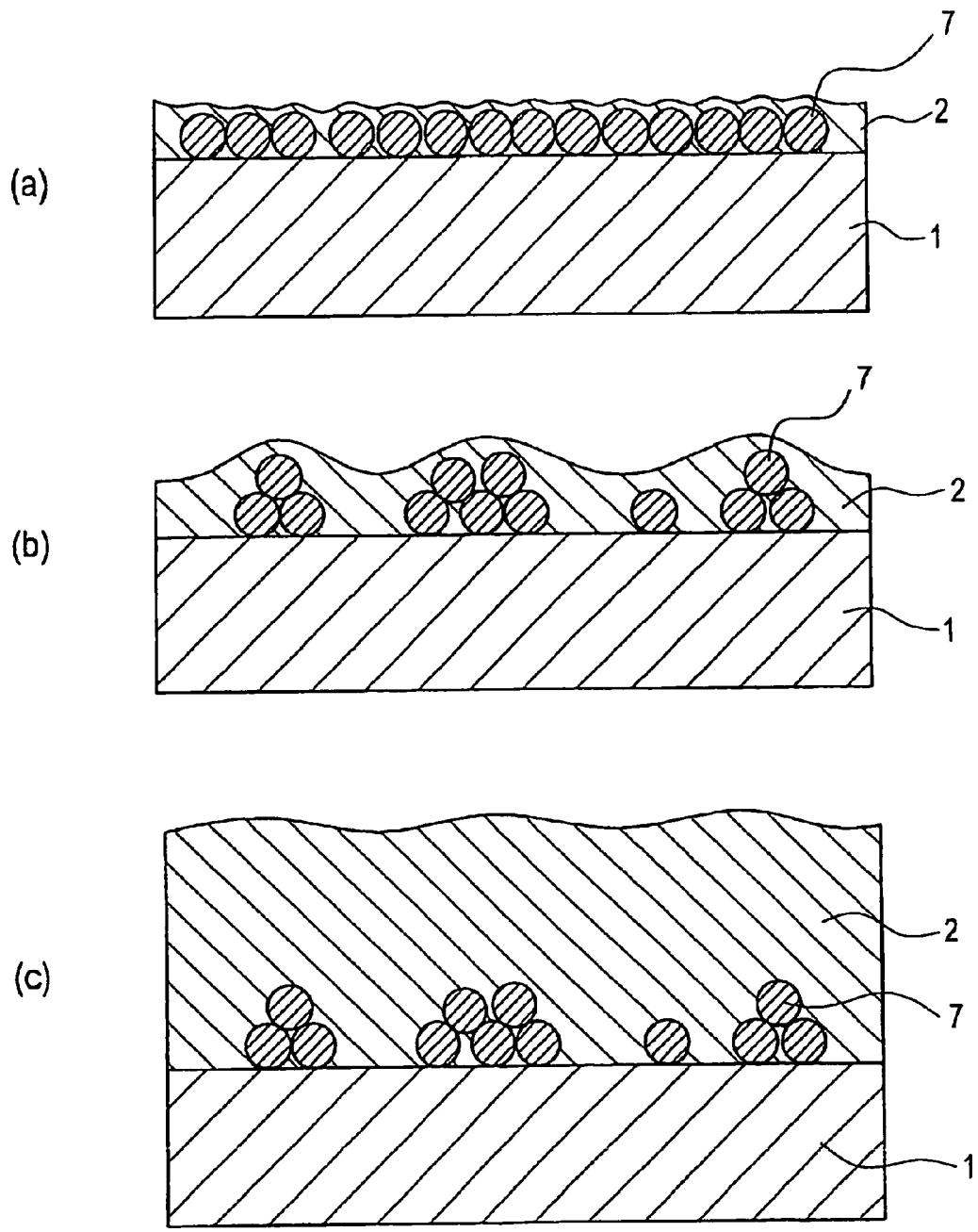
FIG. 11 is a diagram schematically showing localization of particles with respect to the film thickness.

FIG. 10 presents a graph wherein the ordinate indicates antiglare properties while the abscissa indicates the average film thickness/average particle ratio. The antiglare properties indicated by the ordinate is evaluated as in (1) Evaluation of antiglare properties in (EXAMPLES). As FIG. 10 shows, the antiglare properties remain at an almost constant level in the case where the average film thickness of the light diffusion layer is 1.4 to 3.5 times as large as the average particle diameter. Thus, the antiglare properties scarcely alters even though the film thickness varies depending on streaks formed in the course of coating or drying irregularities. Namely, the antiglare properties scarcely alters and, therefore, little surface errors such as streaks or irregularities can be observed. According to the inventor's estimation, the reason for the phenomenon that the antiglare properties remain at an almost constant level in the case where the average film thickness of the light diffusion layer is 1.4 to 3.5 times as large as the average particle diameter resides in that the light-transmitting particles are distributed against the average thickness of the light diffusion layer as shown in FIG. 11 b). Namely, b) is a model view showing the distribution of the light-transmitting particles 7 in the light diffusion layer 2 in the case where the average film thickness/average particle ratio ranges from 1.4 to 3.5. In this state, the antiglare properties are imparted by peaks and valleys are formed on the surface of the light diffusion layer due to convexes formed by masses of the particles. Even though the film thickness or the particle diameter slightly alters, the size of the peaks and valleys on the surface scarcely is changed. As a result, the antiglare properties scarcely alter. a) shows the case wherein the average film thickness/average particle ratio is less than 1.4. In this state, the particles exist in a single layer in the film and thus a slight change in the film thickness or the particle diameter causes a change in the size of peaks and valleys on the surface. As a result, the antiglare properties largely alter. c) shows the case wherein the average film thickness/average particle ratio is larger than 3.5. In this state, masses of the particles are embedded in the film and only very small peaks and valleys are formed. As a result, only little antiglare properties can be established in this case.

By controlling the average film thickness/average particle ratio to 1.4 to 3.5, there arises little change in the antiglare properties due to difference in the average particle diameter from lot to lot. Thus, it becomes possible to obtain films with little variation among lots.

The average film thickness of the light diffusion layer is preferably from 7.5 to 30 μm, more preferably form 8 to 20 μm and more preferably from 10 to 16 μm. In the case where the layer is too thin, only insufficient hard coat properties can be obtained. In the case where the layer is too thick, it is sometimes observed that curling properties and fragility are worsened and the processing suitability is lowered. It is therefore preferable to control the film thickness within the range as specified above.

The light-transmitting particles as described above, which are also called matting particles, are preferably contained in the light diffusion layer in such an amount as to give a matting particle content in the light diffusion layer of from 30 to 2500 mg/m$^2$, more preferably form 100 to 2300 mg/m$^2$ and more preferably from 600 to 2300 mg/m$^2$.

The particle size distribution of the matting particles are determined by measuring with a Coulter's counter and then converting the distribution thus measured into the CV value.

The CV value showing the distribution of particle sizes is represented by formula below, and the distribution of particle size is narrower as this value is smaller.

$$CV (\%)=\{\text{standard deviation of particle sizes (μm)}/\text{average particle size (μm)}\}\times 100$$

It is preferable that the light diffusion layer has a strength of 4 H or above and most preferably 5 H or above, when determined by the pencil hardness test.

To establish both of favorable antiglare properties and definitiveness in black color, the surface haze of the light diffusion layer preferably ranges from 0.3% to 20%, more preferably form 0.3% to 10% and more preferably from 0.3% to 1.5%.

In order to lessen marks, color irregularities, brightness irregularities and dazzling in a liquid crystal panel due to the internal scattering within the light diffusion layer or impart a function of enlarging the viewing angle due to scattering, the internal haze (the value calculated by subtracting the surface haze from the total haze) preferably ranges from 0% to 60%, more preferably from 10% to 40% and most preferably from 20% to 30%.

In the film according to the invention, the surface haze and the internal haze can be freely designed depending on the purpose.

To establish both of favorable antiglare properties and definitiveness in black color, it is preferable that the arithmetic average roughness (Ra) is from 0.03 to 0.30 μm, more preferably form 0.04 to 0.12 μm. The average interval among the peaks and valleys (the Sm value) is preferably from 40 to 200 μm, more preferably from 50 to 170 μm and more preferably from 60 to 150 μm.

2-(3) High Refractive Index Layer and Medium Refractive Index Layer

The antireflective film of the invention can be provided with a high refractive index layer and a medium refractive index layer to thereby elevate the antireflective properties.

These high refractive index layer and medium refractive index layer are sometimes collectively called "high refractive index layers" hereinafter. The terms "high", "medium" and "low" regarding the high refractive index layer, the medium refractive index layer and the low refractive index layer in the present invention are expressed concerning the relative refractive index levels among these layers. With regard to the relationship to the transparent support, it is preferable that the refractive indexes of these layers satisfy the following relationships: refractive index of transparent support>refractive index of low refractive index layer, and refractive index of high refractive index layer>refractive index of transparent support. With regard to the relationship of the refractive index of the light diffusion layer to the refractive index of the transparent support, it is preferable that the following relationship is satisfied: refractive index of light diffusion layer>refractive index of transparent support and the refractive index of the light diffusion layer may be higher than the refractive index of the high refractive index layer or vice versa.

The high refractive index layer, the medium refractive index layer, the low refractive index layer and so on are sometimes collectively called "antireflective layers" hereinafter.

To construct an antireflective film by forming a low refractive index layer on the high refractive index layer, the refractive index of the high refractive index layer preferably ranges from 1.55 to 2.40, more preferably from 1.60 to 2.20, more preferably from 1.65 to 2.10 and most preferably from 1.80 to 2.00.

In the case of constructing an antireflective film by forming a medium refractive index layer, a high refractive index layer and a low refractive index layer from the support side in this order, the refractive index of the high refractive index layer preferably ranges from 1.65 to 2.40, more preferably from 1.70 to 2.20. The refractive index of the medium refractive index layer is regulated to the intermediate between the refractive index of the low refractive index layer and the refractive index of the high refractive index layer. The refractive index of the medium refractive index layer preferably ranges from 1.55 to 1.80.

As the organic particles to be used in the high refractive index layer and the medium refractive index layer, inorganic particles comprising TiO$_2$ as the main component as described above in 1-(9). These inorganic particles are employed in the form of a dispersion in forming the high refractive index layer and the medium refractive index layer.

These inorganic particles are dispersed in a dispersion medium in the presence of a dispersant.

It is preferable that the high refractive index layer or the medium refractive index layer to be used in the invention is formed by using a dispersion having the inorganic particles dispersed therein, preferably adding a binder precursor required for matrix formation (for example, a polyfunctional monomer or a polyfunctional oligomer as described above), a photopolymerization initiator, etc. thereto to give a coating solution for forming the high refractive index layer or the medium refractive index layer, applying the coating solution for forming the high refractive index layer or the medium refractive index layer on a transparent support and then curing the same by a crosslinking reaction or polymerization of an ionizing radiation curable compound (for example, a polyfunctional monomer or a polyfunctional oligomer).

It is also preferable that the binder component in the high refractive index layer or the medium refractive index layer is subjected to the crosslinking reaction or polymerization with the dispersant simultaneously with the application of the layer or after the application thereof.

In the binder in the high refractive index layer and the medium refractive index layer thus formed, the preferable dispersant and the ionizing radiation curable polyfunctional monomer or polyfunctional oligomer as described above undergo a crosslinking reaction or polymerization and thus the anionic group in the dispersant is incorporated into the binder. Furthermore, the binder in the high refractive index layer and the medium refractive index layer has a function that the anionic group contributes to the maintenance of the dispersed state of the inorganic particles and the crosslinked or polymerized structure imparts a film forming ability to the binder, thereby improving the mechanical strength, chemical resistance and weatherability of the high refractive index layer and the medium refractive index layer.

The binder-forming components is added to the high refractive index layer at a ratio of from 5 to 80 parts by weight per 100 parts by weight of the solid matters in the coating composition for high refractive index layer.

The content of the inorganic particles in the high refractive index layer ranges preferably from 10 to 90% by weight, more preferably from 15 to 80% by weight and particularly preferably from 15 to 75% by weight based on the weight of the high refractive index layer. Two or more types of inorganic particles may be employed in the high refractive index layer.

In the case of forming a low refractive index layer on the high refractive index layer, it is preferable that the refractive index of the high refractive index layer is higher than the refractive index of the transparent support.

Moreover, use may be preferably made of a binder obtained by crosslinking or polymerizing an ionizing radiation curable compound having an aromatic ring, an ionizing radiation curable compound having a halogen atom other than fluorine (for example, Br, I or Cl) or an ionizing radiation curable compound having S, N, P, etc.

The film thickness of the high refractive index layer can be appropriately designed depending on the purpose. The high refractive index layer is also usable as a layer for preventing interference fringes. In this case, the film thickness thereof preferably ranges from 30 to 200 nm, more preferably from 50 to 170 nm and particularly preferably from 60 to 150 nm.

It is preferable that the high refractive index layer has as low haze as possible. Namely, the haze is preferably 5% or less, more preferably 3% or less and particularly preferably 1% or less.

It is preferable that the light diffusion layer is formed on the transparent support and then the high refractive index layer is constructed either directly thereon or via other layer(s).

2-(4) Low Refractive Index Layer

As discussed above, the antireflective film according to the invention is an antireflective film having a low refractive index layer on the light diffusion layer of the optical film. Thus, the reflectivity of the film of the invention can be lowered.

The refractive index of the of the low refractive index layer is preferably from 1.20 to 1.46, more preferably from 1.25 to 1.46 and particularly preferably from 1.30 to 1.46.

The thickness of the low refractive index layer is preferably from 50 to 200 nm, more preferably from 70 to 100 nm. The haze of the low refractive index layer is preferably 3% or less, more preferably 2% or less and most preferably 1% or less. It is also preferable that the low refractive index layer has a strength of H or above, more preferably 2 H or above and most preferably 3 H or above, when determined by the pencil hardness test.

To improve the antifouling performance of the antireflective film, the surface contact angle to water is preferably 90° or above, more preferably 95° or above and particularly preferably 100° or above.

In the low refractive index layer, a binder is used to disperse and fix the microparticles according to the invention. Although the binder described in 1-(1) is usable as the binder-forming component, it is preferable to use a fluoropolymer as described in 1-(3) or a fluorine-containing sol/gel material as a binder having a low refractive index per se. As the fluoropolymer or the fluorine-containing sol/gel material, a material which is crosslinked by heat or ionizing radiation and gives a dynamic friction coefficient of from 0.03 to 0.30 to the low refractive index layer surface thus formed is favorable.

A composition for forming low refractive index layer preferably contains the fluoropolymer as described in the above 1-(3), the inorganic particles as described in the above 1-(9) and an organosilane compound as described in the above 1-(4).

2-(5) Antistatic Layer and Electrically Conducive Layer

It is preferable in the invention to provide an antistatic layer from the viewpoint of controlling static electricity on the film surface. The antistatic layer may be formed by a publicly known method such as the method of applying an electrically conductive coating solution comprising electrically conductive microparticles and a reactive curing resin or the method of depositing or sputtering a metal or a metal oxide capable of forming a transparent film to thereby form a thin conductive film. An electrically conductive layer can be formed by either directly on the support or via a primer layer capable of strengthening the adhesion to the support. It is also possible to use the antistatic layer as a part of the antireflective film. In the case where the antistatic layer is formed close to the outermost layer, sufficient antistatic properties can be established even though the layer has a small thickness.

The thickness of the antistatic layer is preferably from 0.01 to 10 μm, more preferably from 0.03 to 7 μm and more preferably from 0.05 to 5 μm. The surface resistance of the antistatic layer is preferably from $10^5$ to $10^{12}$ Ω/sq, more preferably from $10^5$ to $10^9$ Ω/sq and most desirably from $10^5$ to $10^8$ Ω/sq. The surface resistance of the antistatic layer can be measured by the four-point probe method.

It is preferable that the antistatic layer is substantially transparent. More specifically speaking, the haze of the antistatic layer is preferably 10% or less, more preferably 5% or less, more preferably 3% or less and most preferably 1% or less. It preferably has a transmittance of light of 550 nm in wavelength of 50% or more, more preferably 60% or more, more preferably 65% or more and most preferably 70% or more.

It is preferred that the antistatic layer to be used in the invention has a high hardness. More specifically speaking, the hardness of the antistatic layer is preferably H or above, more preferably 2 H or above, more preferably 3 H or above and most preferably 4 H or above, when determined by the pencil hardness test in accordance with JIS K-5400.

2-(6) Antifouling Layer

An antifouling layer can be provided as the outermost layer in the invention. The antifouling layer has an effect of lowering the surface energy of the antireflective layer so as to prevent sticking of hydrophilic or lipophilic stains.

The antifouling layer can be formed by using a fluoropolymer and an antifouling agent.

The thickness of the antifouling layer is preferably from 2 to 100 nm, more preferably from 5 to 30 nm.

2-(7) Interference Fringe (Rainbow Effect) Preventing Layer

In the case where there is a substantial difference in refractive index (a refractive index difference of 0.03 or more) between the transparent support and the hard coat layer or the transparent support and the light diffusion layer, light reflection occurs at the transparent support/hard coat layer or transparent support/light diffusion layer interface. As a result, there arises interference of the reflected light with the reflected light on the antireflective layer surface, which sometimes results in interference fringes caused by minor irregularities in the thickness of the hard coat layer or the light diffusion layer. To prevent these interference fringes, it is possible to form a interference fringe preventing layer between the transparent support and the hard coat layer or the light diffusion layer which has an intermediate refractive index np and a film thickness dp satisfying the following formula.

$$dp=(2N-1)\times\lambda/(4np) \quad \text{Numerical formula (III)}$$

In the above formula, $\lambda$ represents the wavelength of visible light falling within the range of from 450 to 650 nm; and N is a positive integer.

In the case of bonding the antireflective film to an image display or the like, a pressure-sensitive adhesive layer (or an adhesive layer) is sometimes layered on the transparent support in the side having no antireflective layer. When there is a substantial difference (0.03 or more) in refractive index between the transparent support and the pressure-sensitive adhesive layer (or the adhesive layer) in this mode, light reflection occurs at the transparent support/pressure-sensitive adhesive layer (or adhesive layer). As a result, there arises interference of the reflected light with the reflected light on the antireflective layer surface, which sometimes results in interference fringes caused by irregularities in the thickness of the transparent support, the hard coat layer or the light diffusion layer, similar to the above-described case. To prevent these interference fringes, it is possible to form a interference fringe preventing layer similar to the above-described one on the transparent support in the side having no antireflective layer.

Such interference fringe preventive layers are described in detail in JP-A-2004-345333 and the interference fringe preventive layers disclosed therein are usable in the present invention.

2-(8) Adhesion Facilitating Layer

It is also possible to form an adhesion facilitating layer in the film of the invention. The term "adhesion facilitating layer" means a layer capable of imparting a function of facilitating the adhesion between, for example, a protective film for a polarizing plate and the adjacent layer, the light diffusion layer and the support, or the hard coat layer and the support.

Adhesion can be facilitated by, for example, a treatment which comprises forming an adhesion facilitating layer on a transparent plastic film by using an adhesion facilitating agent comprising a polyester, an acrylic ester, polyurethane, polyethyleneimine, a silane coupling agent and so on.

As an example of the adhesion facilitating layer preferably usable in the invention, there can be enumerated one having a layer containing a high molecule compound carrying —COOM (wherein M represents a hydrogen atom or a cation) group. A still preferred example thereof is one having a layer containing a high molecule compound carrying —COOM group is formed in the film base side while another layer containing a hydrophilic a high molecule compound as the main compound is formed adjacent thereto in the polarizing film side. Examples of the high molecule compound carrying —COOM group include a styrene-maleic acid copolymer having a —COOM group, a vinyl acetate/maleic acid copolymer having a —COOM group, and a vinyl acetate/maleic acid/maleic anhydride copolymer having a —COOM group. Among all, it is preferable to use a vinyl acetate/maleic acid copolymer having a —COOM group. It is preferable to use either one of these high molecule compounds or a combination of two or more thereof to give a weight-average molecular weight of about 500 to about 500,000. As particularly preferable examples of the high molecule compound having a —COOM group, use can be made of those described in JP-A-6-094915 and JP-A-7-333436.

Preferable examples of the hydrophilic high molecule compound include hydrophilic cellulose derivatives (for example, methylcellulose, carboxymethylcellulose, hydroxycellulose and so on), polyvinyl alcohol derivatives (for example, polyvinyl alcohol, vinyl acetate/vinyl alcohol copolymer, polyvinyl acetal, polyvinyl formal, polyvinyl benzal and so on), natural high molecule compounds (for example, gelatin, casein, acacia and so on), hydrophilic polyester derivatives (for example, partly sulfonated polyethylene terephthalate and so on), hydrophilic polyvinyl derivatives (for example, poly-N-vinylpyrrolidone, polyacrylamide, polyvinylimidazole, polyvinylpyrazole and so on). Either one of these compounds or a combination of two or more may be used.

The thickness of the adhesion facilitating layer preferably ranges from 0.05 to 1.0 μm. In the case where it is thinner than 0.05 μm, a sufficient adhesion performance can be hardly established. When it exceeds 1.0 μm, on the other hand, the adhering effect cannot be improved any more.

2-(9) Anticurling Layer

The film of the invention may be subjected to an anticurling treatment. The term "anticurling treatment" means imparting a function of curling as the thus treated face inside. Owing to this treatment, curling inside can be prevented in the case where both faces of a transparent resin film are subjected to surface-treatments differing in type or extent from each other. The anticurling treatment is performed on the face of the transparent resin film opposite to the face liable to curl inside. As an example of the anticurling treatment, the formation of an anticurling layer may be cited.

In one embodiment, the anticurling layer may be formed on the base material in the side opposite to the side having the light diffusion layer and the antireflective layer. In another embodiment, the adhesion facilitating layer is formed on one face of a transparent resin film and then the anticurling layer is formed on the opposite face thereof.

Specific examples of the anticurling treatment include a method of applying a solvent and a method of forming a transparent resin layer with the use of a solvent together with cellulose triacetate, cellulose diacetate, cellulose acetate propionate or the like. The method with the use of a solvent is carried out by applying a composition containing a solvent in which a cellulose acylate film to be used as a protective film for a polarizing plate is soluble or swellable. It is therefore preferable that such a coating solution for the layer having the anticurling effect contains an organic solvent of the ketone or ester type. Preferable examples of the organic solvent of the ketone type include acetone, methyl ethyl ketone, methyl isobutyl ketone, cyclohexanone, ethyl acetate, acetyl acetone, diacetone alcohol, isophorone, ethyl-n-butyl ketone, diisopropyl ketone, diethyl ketone, di-n-propyl ketone, methylcyclohexanone, methyl-n-butyl ketone, methyl-n-propyl ketone, methyl-n-hexyl ketone, methyl-n-heptyl ketone and so on. Preferable examples of the organic solvent of the ester type include methyl acetate, ethyl acetate, butyl acetate, methyl lactate and ethyl lactate. However, usable solvents sometimes include a mixture of solvents allowing dissolution and/or swelling and a mixture further containing a solvent not allowing dissolution and/or swelling. Namely, the treatment is conducted by using a composition, which has been prepared by appropriately mixing these solvents depending on the curling degree of the transparent resin film and the resin type, in an appropriate coating amount. Furthermore, a transparent hard treatment or an antistatic treatment can exert an anticurling effect.

2-(10) Water Absorbing Layer

In the film according to the invention, use can be made of a water absorbent. The water absorbent can be selected from among compounds having water absorbing function typified by alkaline earth metals. Examples thereof include BaO, SrO, CaO, MgO and so on. Moreover, it can be selected from among metal elements such as Ti, Mg, Ba and Ca. The particle size of the absorbent is preferably 100 nm or less, more preferably 50 nm or less.

A layer containing the water absorbent can be formed by using, for example, the vacuum deposition method. Alternatively, it may be formed by various methods with the use of nanoparticles. The thickness of the layer is preferably from 1 to 100 nm, more preferably from 1 to 10 nm. The layer containing the water absorbent may be provided between the support and a functional layer, as the uppermost layer of the functional layers, or between functional layers.

2-(11) Primer Layer and Inorganic Film Layer

In the film according to the invention, a publicly known primer layer or an inorganic film layer may be provided between the support and a functional layer to thereby improve the gas barrier properties.

As the primer layer, use can be made of, for example, an acrylic resin, an epoxy resin, an urethane resin or a silicone resin. It is preferable in the invention that an organic/inorganic hybrid layer is employed as the primer layer while an inorganic deposition layer or a dense inorganic coating film formed by the sol-gel method is employed as the inorganic film layer. As the inorganic deposition layer, a deposition layer comprising silica, zirconia, alumina, etc. are preferred. The inorganic deposition layer can be formed by the vacuum deposition method, the sputtering method or the like.

3. Layer Constitution of Film

Figure 2:
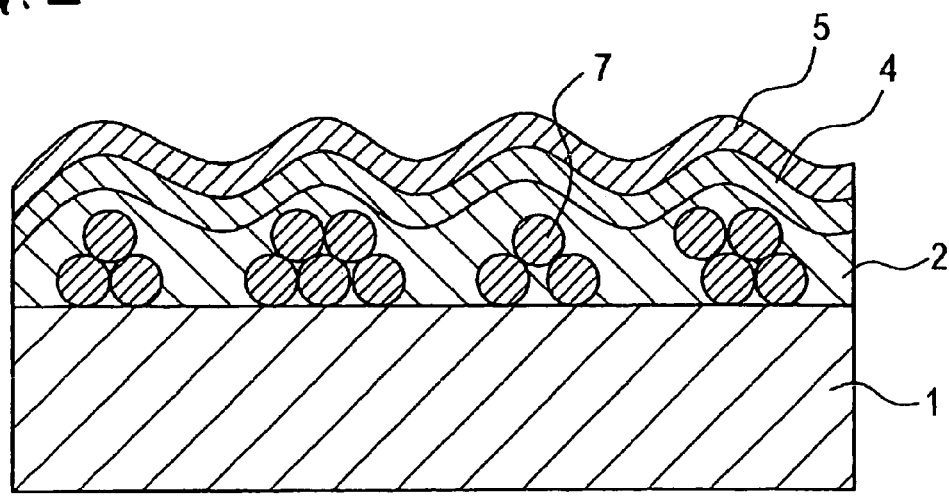
FIG. 2 is a schematic view showing a cross section of a film which is an exemplary embodiment of the invention.
Figure 3:
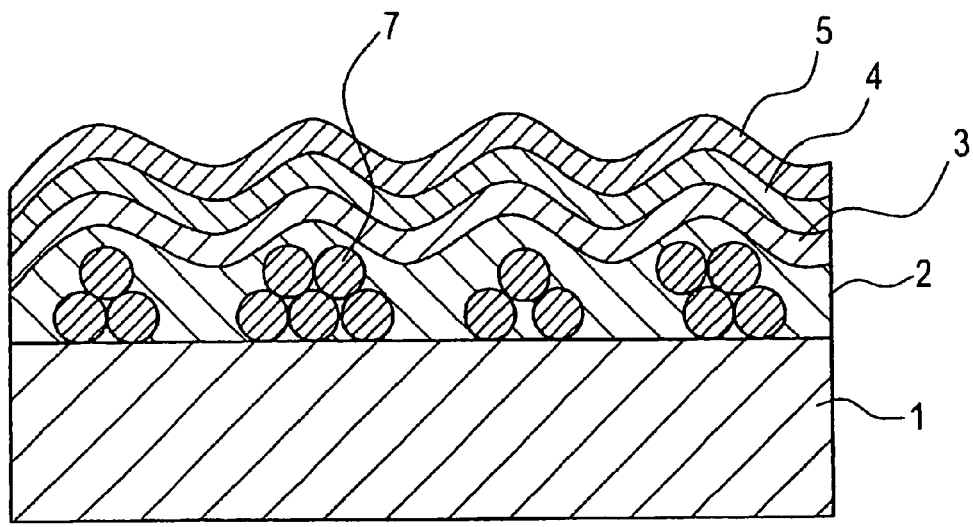
FIG. 3 is a schematic view showing a cross section of a film which is an exemplary embodiment of the invention.

In the film according to the invention, use can be made of a publicly known layer constitution with the use of the layers as discussed above. Typical examples thereof are as follows.

a. Support/light diffusion layer (exclusively consisting of the layers essentially required in the optical film according to the invention)

b. Support/light diffusion layer/low refractive index layer (FIG. 1) (exclusively consisting of the layers essentially required in the antireflective film according to the invention)

c. Support/light diffusion layer/high refractive index layer/low refractive index layer (FIG. 2)

d. Support/light diffusion layer/medium refractive index layer/high refractive index layer/low refractive index layer (FIG. 3)

A film in which a light diffusion layer is formed on a support and then a low refractive index layer is layered thereon as in b (FIG. 1) can be appropriately usable as an antireflective film. Since the low refractive index layer formed on the light diffusion layer has a thickness amounting to about ¼ of the light wavelength, the surface reflection can be lessened according to the principle of thin film interference.

A film in which a light diffusion layer is formed on a support and then a high refractive index layer and a low refractive index layer are layered thereon as in c (FIG. 2) can be also appropriately usable as an antireflective film. Owing to the layer constitution of a support, a light diffusion layer, a medium refractive index layer, a high refractive index layer and a low refractive index layer in this order as in d (FIG. 3), the reflectivity can be lessened to 1% or lower.

Figure 4:
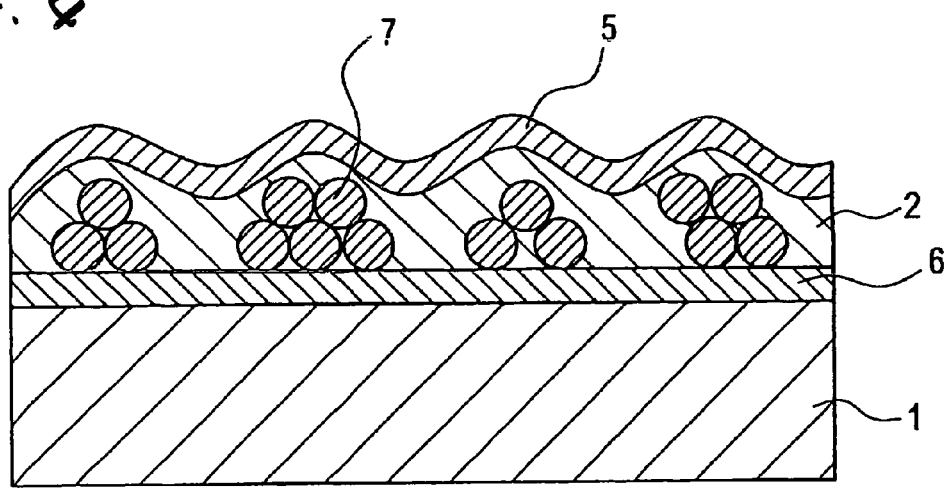
FIG. 4 is a schematic view showing a cross section of a film which is an exemplary embodiment of the invention.
Figure 5:
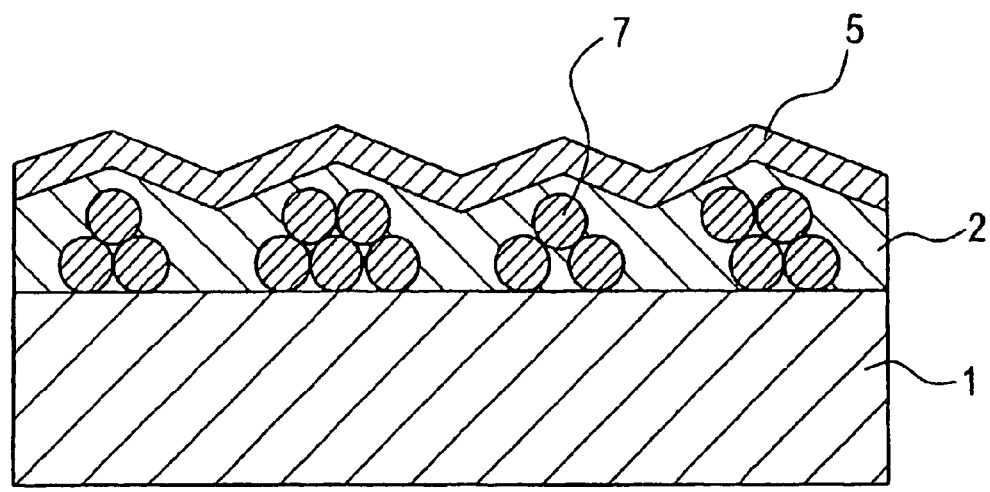
FIG. 5 is a schematic view showing a cross section of a film which is an exemplary embodiment of the invention.

In the constitutions a to d as described above, the light diffusion layer (2) has antiglare properties and may be composed of either a single layer or two or more layers. The antiglare properties may be imparted either by dispersing matting particles as shown in FIGS. 1 to 4 or surface-molding by, for example, embossing as shown in FIG. 5. A light diffusion layer formed by dispersing matting particles contains a binder and light-transmitting particles dispersed in the binder. As shown in FIG. 4, a light diffusion layer (2) may be formed on a hard coat layer (6). On the contrary, a hard coat layer (6) may be formed on a light diffusion layer (2) so that the hard coat layer has a function of controlling the peaks and valleys on the surface of the light diffusion layer, In a preferable case, the light diffusion layer having antiglare properties also have hard coat properties. It may be composed of multiple layers, for example, two to four layers.

As layers optionally provided between the transparent support and a layer located in the surface side thereof or as the outermost layer, there can be enumerated an interference fringe (rainbow effect) preventing layer, an antistatic layer (provided in the case where the surface resistance from the display side should be lowered or sticking of dust and debris to the surface, etc. should be prevented), another hard coat layer (in the case where only insufficient hardness is obtained by a single hard coat layer or a light diffusion layer as, for example, the embodiment shown in FIG. 4), a gas barrier layer, a water absorbing layer (a moisture proof layer), an adhesion improving layer, an antifouling layer (a stain proof layer) and so on.

It is preferable that the refractive indexes of the individual layers constituting the antireflective film according to the invention satisfy the following relationship.

Refractive index of light diffusion layer>refractive index of transparent support>refractive index of low refractive index layer

4. Production Method

The film of the invention can be produced by the following method, though the invention is not restricted thereto.

4-(1) Preparation of Coating Solution

<Preparation>

First, a coating solution containing components for forming each layer is prepared. In this step, an increase in the moisture content in the coating solution can be regulated by minimizing the volatilization of the solvent. The moisture content in the coating solution is preferably 5% or less, more preferably 2% or less. The volatilization of the solvent can be regulated by enhancing the air-tightness after pouring individual materials into a tank, minimizing the air-contact area of the coating solution in the course of transferring the solution and so on. It is also possible to provide a means of lowering the moisture content of the coating solution during the coating or before or after the same.

<Physical Properties of Coating Solution>

Concerning the coating solution for a layer having a dry film thickness of 200 nm or less such as the low refractive index layer, the medium refractive index layer, the high refractive index layer or the antifouling layer, the upper limit of the coating speed is largely affected by the physical properties of the solution. It is therefore necessary to control the physical properties of the solution (in particular, the viscosity and the surface tension) upon the coating.

The viscosity of the coating solution is preferably 2.0 (mPa·sec) or less, more preferably 1.5 (mPa·sec) or less and most preferably 1.0 (mPa·sec) or less. Since the viscosities of some coating solutions vary depending on shear speed, the values as defined above each means the viscosity at shear speed at the point of the coating. It is preferable to add a thixotropic agent to the coating solution. This is because the viscosity can be regulated to a low level thereby in the coating under a high shear force while the viscosity is elevated in the course of drying with little shear force, thus preventing irregularities in drying.

The amount of the coating solution to be applied to the transparent support also affects the upper coating speed, though it does not falls within the category of physical properties. That is, the amount of the coating solution to be applied to the transparent support preferably ranges from 2.0 to 5.0 (cc/m$^2$). Although it is preferable to increase the amount of the coating solution to be applied to the transparent support so as to elevate the upper coating speed, an increase in the amount of the coating solution to be applied to the transparent support results in an increase in the load during drying. It is therefore preferable to determine the optimum amount of the coating solution to be applied to the transparent support depending on the formulation of the solution and process conditions.

The surface tension preferably ranges from 15 to 36 (mN/m). It is preferable to lower the surface tension by adding, for example, a leveling agent, since irregularities in drying can be regulated thereby. When the surface tension is excessively lowered, on the other hand, the upper limit of the coating speed is also lowered. Thus, the surface tension more preferably ranges from 17 (mN/m) to 32 (mN/m) and particularly preferably from 19 (mN/m) to 26 (mN/m).

In the light diffusion layer containing light-transmitting particles, it is preferable to adjust the viscosity of the coating solution to 4 cp or above, more preferably 6 cp or above from the viewpoint of preventing the particles from sedimentation.

<Filtration>

Before the coating, it is preferable to filter the coating solution to be used in the coating. In the filtration, it is preferable to employ a filter having as small pore size as possible so long as the components in the coating solution are not eliminated thereby. In the filtration, it is preferable to use a filter having an absolute filtration accuracy of from 0.1 to 50 μm, more preferably to use a filter having an absolute filtration accuracy of from 0.1 to 40 μm. The thickness of the filter is preferably from 0.1 to 10 mm, more preferably from 0.2 to 2 mm. In such a case, it is preferable to perform the filtration at a filtration pressure of 1.5 MPa or less, more preferably 1.0 MPa or less and more preferably 0.2 MPa or less.

The material of the filter is not particularly restricted, so long as the coating solution is not affected thereby.

It is also preferable to ultrasonically disperse the filtered coating solution so as to accelerate defoaming of the dispersion and the retention of the dispersed state.

4-(2) Pre-Coating Treatment

It is preferable that the support to be used in the invention is subjected to a surface treatment before coating other layers thereon. Specific examples of the surface treatment include corona discharge treatment, glow discharge treatment, flame treatment, acid treatment, alkali treatment and ultraviolet irradiation treatment. Moreover, use can be preferably made of a method of forming an undercoat layer as disclosed by JP-A-7-333433.

Examples of the dedusting method to be used in the dedusting step, which is a preliminary step before the coating, include dry dedusting methods such as a method of pressing a nonwoven fabric or a blade against the film surface as described in JP-A-59-150571; a method of spraying air of a high cleanliness at a high speed, thus stripping extraneous matters from the film surface and then sucking via a suction port closely located as described in JP-A-10-309553; and a method of spraying compressed air under ultrasonic vibration, thus stripping extraneous matters from the film surface and then sucking as described in JP-A-7-333613 (for example, NEW ULTRA CLEANER manufactured by SHINKO).

It is also possible to employ wet dedusting methods, for example, a method of introducing a film into a washing tank and stripping extraneous matters by using an ultrasonic vibrator; a method of supplying a washing liquor to a film and spraying air at a high speed followed by sucking, as described in JP-B-49-13020; and a method of continuously rubbing a web with a moistened roll and jetting a liquid onto the rubbed face to thereby wash the web as described in JP-A-2001-38306. Among these dedusting methods, an ultrasonic dedusting method or a wet dedusting method is particularly favorable from the viewpoint of dedusting effect.

To elevate the dedusting effect and prevent sticking of dust and debris, it is particularly preferable that, before the dedusting step as described above, to eliminate static electricity from the substrate film. To remove the electricity, use can be made of an ionizer of the corona discharge type or an ionizer of the irradiation type (UV, soft X-ray and so on). Before and after the dedusting and coating, the electric potential of the substrate film is preferably 1000 V or less, more preferably 300 V or less and particularly preferably 100 V or less.

In the case of using a cellulose acylate film as the, it is preferable to control the cellulose acylate film temperature to Tg or lower (more specifically speaking, 150° C. or lower) during the above treatments from the viewpoint of maintaining the planarity of the film.

In the case of adhering the cellulose acylate film to a polarizing film as in using the film of the invention as a protective film for a polarizing plate, it is preferable to treat the cellulose acylate film with an acid or an alkali (i.e., saponification) from the viewpoint of the adhesiveness to the polarizing film.

From the viewpoints of adhesiveness and so on, the surface energy of the cellulose acylate film is preferably 55 mN/m or above, ore preferably from 60 mN/m to 75 mN/m. The surface energy can be controlled by the surface treatment as described above.

4-(3) Coating

Each of the layers of the film according to the invention can be formed by the following coating methods, though the invention is not restricted thereto.

Namely, use can be made of publicly known methods such as dip coating method, air knife coating method, curtain coating method, roller coating method, wire bar coating method, gravure coating method, extrusion coating method (die coating method)(see U.S. Pat. No. 2,681,294) or microgravure coating method. Among all, the microgravure coating method and the die coating method are favorable.

The microgravure coating method to be used in the invention is a coating method characterized by comprising rotating a gravure roll, which has a diameter of from about 10 to about 100 mm (preferably from about 20 to about 50 mm) and has a gravure pattern printed all over the periphery thereof, in the lower part of the substrate in the direction opposite to the transporting direction of the support, stripping off the excessive coating solution by a doctor blade from the surface of the gravure roll and thus transferring an almost definite amount of the coating solution to the lower face of the support at a position where the upper face of the support is in the free state, thereby conducting coating. The transparent support in a rolled form is continuously unwound. Thus, at least one layer of the light diffusion layer and the low refractive index layer containing a fluoroolefin polymer can be coated in one side of the thus unwound support by the microgravure method.

Concerning the coating conditions by the microgravure method, it is preferable that a gravure pattern has a line density of from 50 to 800 lines/in. and more preferably from 100 to 300 lines/in. The depth of the gravure pattern is preferably from 1 to 600 μm and more preferably from 5 to 200 μm. The rotational speed of the gravure roll is preferably from 3 to 800 rpm and more preferably from 5 to 200 rpm. The transporting speed of the support is preferably from 0.5 to 100 m/min and more preferably from 1 to 50 m/min.

To provide the film according to the invention at a high productivity, use is preferably made of the extrusion method (the die coat method). In particular, a die coater preferably usable in an area with a small wet coating amount (20 cc/m² or less) such as the hard coat layer or the antireflective layer will be illustrated below.

<Constitution of Die Coater>

Figure 6:
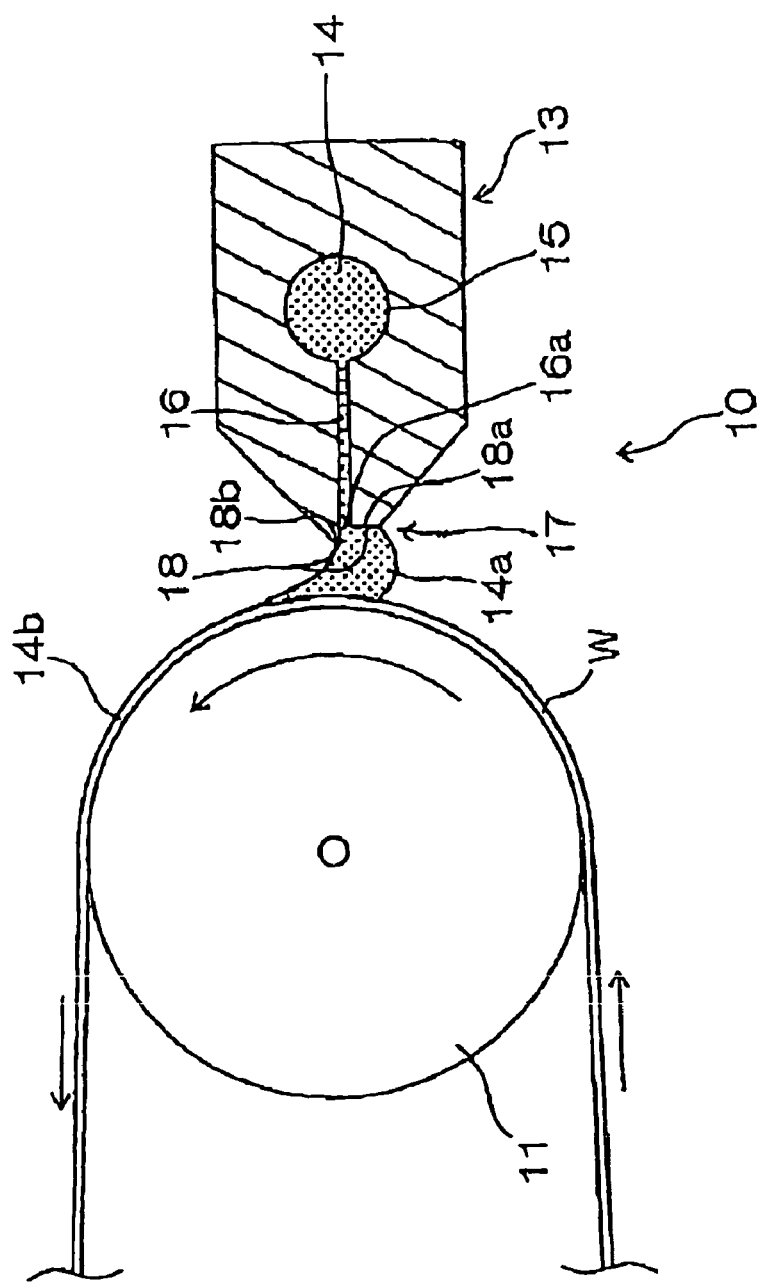
FIG. 6 is a view showing a cross section of a coater 10 having a slot die 13 suitable for an exemplary embodiment of the invention.

FIG. 6 is a sectional view of a coater having a slot die whereby the invention is carried out.

In a coater 10, a coating solution 14 is discharged in a bead-like form 14a from the slot die 13 onto a web W that is continuously running while being supported by the backup roll 11. Thus, the coating solution is applied to the web W to form a coating film 14b thereon.

A pocket 15 and a slot 16 are formed within the slot die 13. The pocket 15 has a cross section made up of a curve and a line and it may have either an almost round shape as in FIG. 5 or a half-round shape. This pocket 15 is a space for pooling the coating solution which is extended, while keeping the cross-sectional shape, along the width direction of the slot die 13. In general, its effective extension length is adjusted almost the same as or somewhat longer than the coating width. To the pocket 15, the coating solution 14 is supplied from the side face of the slot die 13 or from the center of the face opposite to the slot opening 16a. The pocket 15 is also provided with a stopper for preventing the coating solution 14 form leakage.

The slot die 16, which serves as a flow channel of the coating solution 14 from the pocket 15 to the web W, has a cross section shape in the width direction of the slot die as in the pocket 15. The opening 16a located in the web side is regulated to almost the same length as the coating width usually by using a width regulating plate which is not shown in the drawing. At the front edge of the slot 16, the angle between the backup roll 11 and the tangent line in the web-transporting direction is preferably 30° or larger but not larger than 90°.

A front lip 17 of the slot die 13, where the opening 16a of the slot 16 is provided, has a tapered form and has a flat front edge 18 called a land. Concerning this land 18, the upstream side in the web W-transporting direction to the slot 16 is referred to as the upstream lip land 18a, while the downstream side is referred to as the downstream lip land 18b.

Figure 7A:
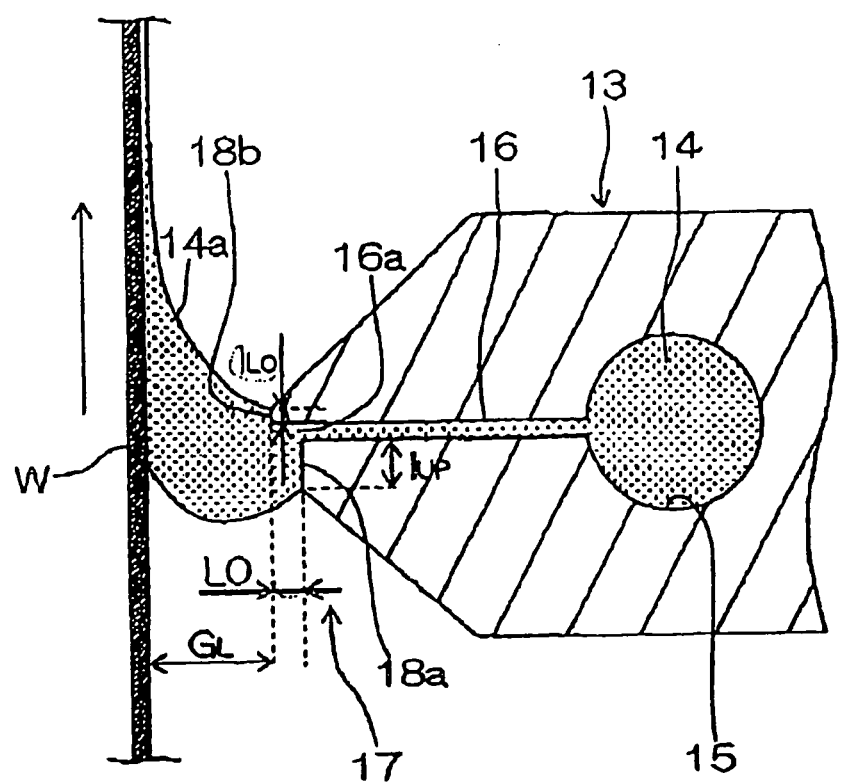
Figure 7B:
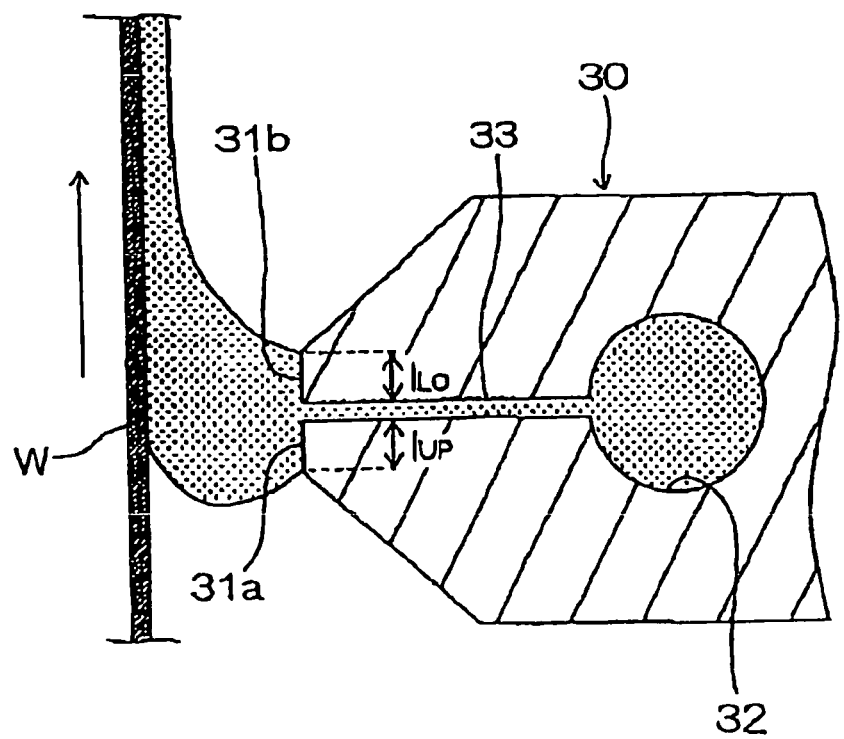
FIG. 7B shows a cross section of a slot die 30 in the background art.

FIG. 7 presents a comparison of the cross section shape of the slot die 13 with the conventional one, wherein (A) shows the slot die 13 according to the invention while (B) shows a conventional slot die 30. In the conventional slot die 30, the distance between the upstream lip land 31a and the web is the same as the distance between the downstream lip land 31b and the web. Symbols 32 and 33 represent a pocket and a slot respectively. In contrast, the downstream lip land length $L_{LO}$ is shortened in the slot die 13 according to the invention and, as a result, coating at a wet film thickness of 20 μm or less can be highly accurately carried out.

The land length $I_{UP}$ of the upstream lip land 18a is preferably from 500 μm to 1 mm, though the invention is not particularly restricted thereto. The land length $L_{LO}$ of the downstream lip land 18b is 30 μm or more but not more than 100 μm, preferably 30 μm or more but not more than 80 μm and more preferably 30 μm or more but not more than 60 μm. When the land length $L_{LO}$ of the downstream lip land 18b is shorter than 30 μmm, the edge or the land of the front lip is easily chipped off and thus streaks are frequently formed in the coating film, which makes the coating impossible. Moreover, there arise problems such that the wet line position in the downstream side can be hardly determined and, furthermore, the coating solution spreads in the downstream side. It has been known that spreading of the coating solution in the downstream side means non-uniformity of the wet line and, in its turn, brings about troubles such as streaks on the coated face. When the land length $L_{LO}$ of the downstream lip land exceeds 100 μm, on the other hand, a bead 14a per se cannot be formed and, therefore, film coating cannot be carried out.

The downstream lip land 18b has an overbite shape closer to web W than the upstream lip land 18a. Thus, the degree of vacuum can be elevated and a bead 14a appropriate for the thin film coating can be formed. The difference of the distance between the downstream lip land 18b and the web W from the distance between the upstream lip land 18a and the web W (hereinafter referred to as the overbite length LO) is preferably 30 μm or more but not more than 120 μm, more preferably 30 μm or more but not more than 100 μm and most preferably 30 μm or more but not more than 80 μm. In the case where the slot die 13 has an overbite shape, the gap $G_L$ between the front lip 17 and the web W means the gap between the downstream lip land 18b and the web W.

Figure 8:
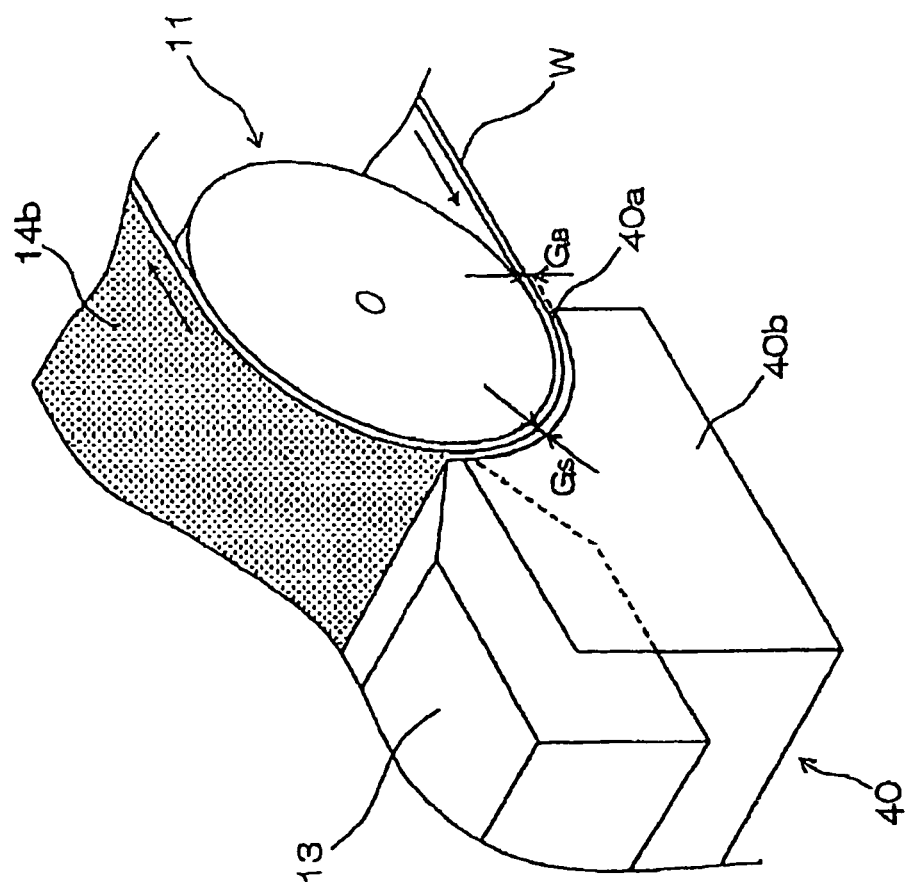
FIG. 8 is a perspective view showing a slot die and its vicinity in a coating step in a method for producing a film according to an exemplary embodiment of the invention.

FIG. 8 is a perspective view showing the slot die and its vicinity in the coating step.

In the opposite side to the web W-transporting direction side, a vacuum chamber 40 is provided at a non-contact position so as to sufficiently control the degree of vacuum of the bead 14a. The vacuum chamber 40 has a back plate 40a and a side plate 40b for maintaining its driving efficiency. The gap between the back plate 40a and the web is referred to as $G_B$, while the gap between the side plate 40b and the web is referred to as $G_S$.

Figure 9:
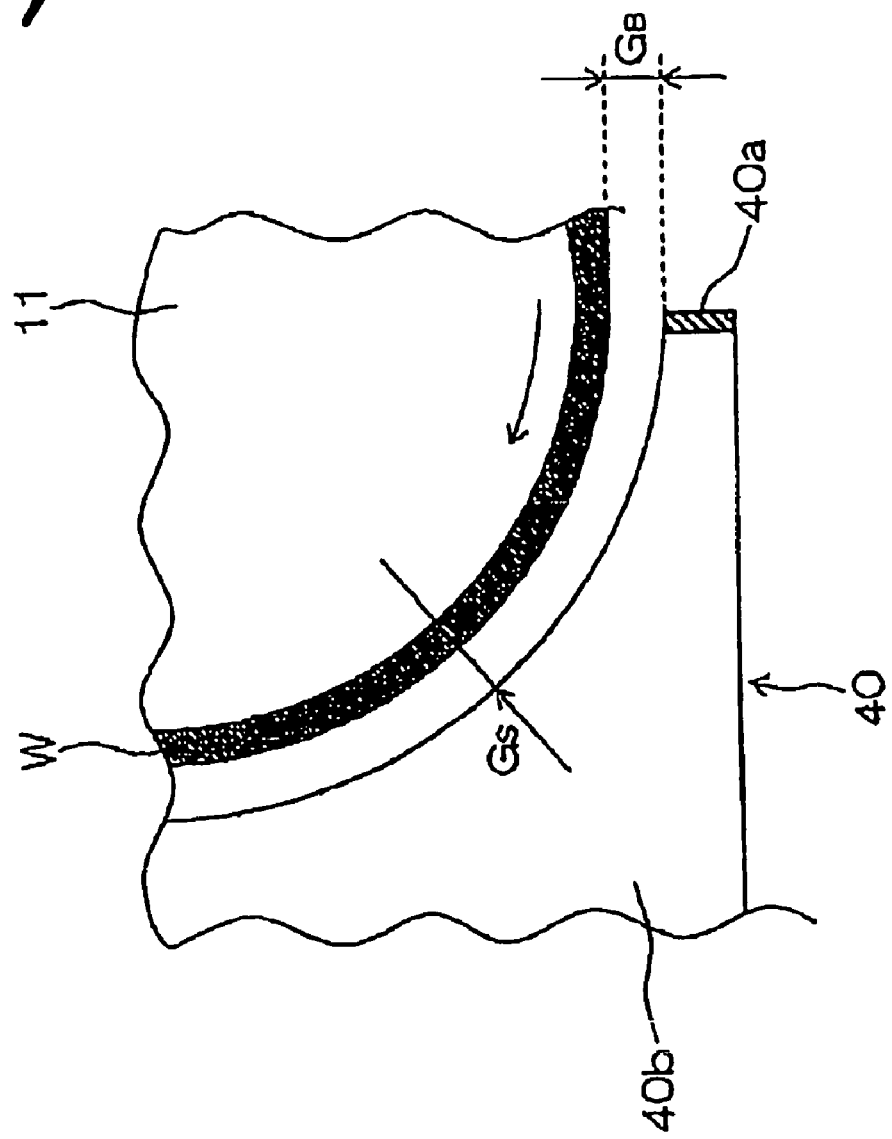
FIG. 9 shows a cross section of a vacuum chamber 40 and a web W (wherein a back plate 40a is united together the chamber 40)

FIG. 9 is a sectional view showing the vacuum chamber 40 and the web W being close to each other. The side plate 40b and the back plate 40a may be united with the chamber body 40 as shown in FIG. 9. Alternatively, the back plate 40a may be fixed to the chamber 40 by, for example, screwing so that the gap $G_B$ can be appropriately altered. In any structure, the gap between the back plate 40a and the web W and the gap between the side plate 40b and the web W are defined respectively as $G_B$ and $G_S$. In the case of locating the vacuum chamber 40 below the web W and the slot die 13 as in FIG. 8, the gap $G_B$ between the back plate 40a of the vacuum chamber 40 and the web W means the space from top end of the back plate 40a to the web W.

It is preferable that the gap $G_B$ between the back plate 40a and the web W is larger than the gap $G_L$ between the front lip 17 of the slot die 13 and the web W. Owing to this structure, change in the degree of vacuum around the bead caused by decentering of the backup roll 11 can be regulated. In the case where the gap $G_L$ between the front lip 17 of the slot die 13 and the web W is 30 μm or more but not more than 100 μm, the gap $G_B$ between the back plate 40a and the web W is preferably 100 μm or more but not more than 500 μm.

<Material and Accuracy>

A longer length in the web-transporting direction of the front lip in the web-transporting direction side is the less advantageous in forming the beads. When this length alters between arbitrary points in the slot die width direction, the beads become unstable even upon slight external disturbance. Therefore, it is preferable to regulate the fluctuation range of $I_{LO}$ in the slot die width direction within 20 μm.

It is undesirable to employ a material such as stainless steel in the front lip of the slot die, since it would undergo sagging in the step of die processing. By using stainless steel or the like, the front lip accuracy can be hardly satisfied even though the slot die front lip length in the web-transporting direction is controlled to the above-described range, i.e., from 30 μm to 100 μm. To maintain a high processing accuracy, use is preferably made of an ultrahard material as reported by Japanese Patent No. 2817053. More specifically speaking, it is preferable that at least the front lip of the slot die is made of an ultrahard alloy consisting of carbide crystals having an average grain size of 5 μm or less bonded together. Examples of such an ultrahigh alloy include those obtained by bonding carbide crystal grains by using a metallic binder such as cobalt, e.g., tungsten carbide (hereinafter referred to as WC). As the metallic binder, it is also possible to use titanium, tantalum, niobium or a mixture thereof. It is still preferable that the average grain size of WC crystals is 3 μm or less.

To achieve highly accurate coating, fluctuations in the above-described land length of the front lip in the web-transporting direction and the gap from the web in the slot die width direction serve important roles. It is still preferable to achieve such straightnesses as enabling the regulation the combination of these two factors, i.e., the fluctuation of the gap. In a preferred case, the straightnesses of the front lip and the backup roll are controlled so as to regulate the fluctuation of the gap in the slot die width direction to 5 μm or below.

<Coating Speed>

By establishing the accuracy at the backup roll and the front lip as described above, the coating system preferably employed in the invention can achieve a high film thickness stability at high-speed coating. Moreover, the premeasurement is employed in this coating system, which ensures stable film thickness even at high-speed coating. In the case where a coating solution is employed in a small amount, coating can be performed at a high speed to give a high film thickness stability by using this coating system. Although the coating can be conducted by using other coating systems, the dip coating method suffers from the problem of vibration of the coating solution in a solution tank and thus little stepwise irregularities are frequently formed. In the reverse roll coating method, there arises roll-core deviation or sagging relating to the coating and thus little stepwise irregularities are frequently formed. Since the postmeasurement system is employed in these coating systems, moreover, a stable film thickness can be hardly ensured. From the viewpoint of productivity, it is preferable to employ the above-described die coating method and conduct the coating at a speed of 25 m/min or higher.

In the case of forming a hard coat layer on the light diffusion layer, in particular, it is preferable to employ the coating method as described in JP-A-2002-86050 and JP-A-2003-260400 so as to simultaneously form the light diffusion layer and the hard coat layer by a single coating procedure.

4-(4) Drying

After forming directly on the support or via other layers, it is preferable to transport the film of the invention as the web into a heated zone for drying the solvent.

To dry the solvent, various findings can be employed. Specific examples of these findings include those disclosed by JP-A-2001-286817, JP-A-2002-314798, JP-A-2003-126768, JP-A-2003-315505, JP-A-2004-34002 and so on.

The temperature in the drying zone preferably ranges from 25° C. to 140° C. It is also preferable that the temperature in the former half of the drying zone is relatively low while the temperature in the latter half thereof is relatively high. Anyway, it is preferred that the temperatures are lower than the level at which the components other than the solvent contained in the coating composition for each layer begin to vaporize. For example, some marketed photo radical generators employed together with an ultraviolet light curing resin would vaporize at a ratio of several ten % within several minutes in a hot air stream at 120° C. Similarly, the vaporization of monofunctional and bifunctional acrylate monomers would proceed in a hot air stream at 100° C. In such a case, it is preferred that the temperature in the drying zone is lower than the level at which the components other than the solvent contained in the coating composition for each layer begin to vaporize.

To prevent drying irregularities, it is preferable that the flow rate of the hot air stream on the coating film surface after forming the coating composition for each layer on the support ranges from 0.1 to 2 m/sec while the solid concentration of the coating composition is from 1 to 50%.

After applying the coating composition for each layer on the support, it is also preferable to regulate the difference in temperature between the transporting roll being in contact with the face opposite to the coated face of the support in the drying zone and the support is from 0° C. to 20° C., since drying irregularities caused by uneven heat transfer can be thus prevented.

4-(5) Curing

In the film according to the invention, each coating film can be cured by passing through the film as the web through a zone wherein the coating film is cured by ionizing radiation and/or heat.

The ionizing radiation species to be used in the invention is not particularly restricted but appropriately selected from among ultraviolet rays, electron beams, near ultraviolet light, visual light, near infrared light, infrared light, X-ray and so on depending on the type of the curable composition forming a coating film. Among all, ultraviolet light and electron beams are preferable. In particular, ultraviolet light is preferable because of being convenient in handling and easily giving high energy.

As the light source of the ultraviolet light for photo polymerizing an ultraviolet-reactive compound, any light source capable of generating ultraviolet light is usable. For example, use can be made of a low-pressure mercury lamp, a medium-pressure mercury lamp, a high-pressure mercury lamp, an ultrahigh pressure mercury lamp, a carbon arc lamp, a metal halide lamp, a xenon lamp and so on. Also, use can be made of an ArF excimer laser beam, a KrF excimer laser beam, an excimer lamp or synchrotron radiation. Among these light sources, it is preferable to employ an ultrahigh pressure mercury lamp, a high-pressure mercury lamp, a low-pressure mercury lamp, a carbon arc lamp, a xenon arc lamp or a metal halide lamp.

It is also possible to use an electron beam. Examples of the electron beam include electron beams emitted from various electron beam accelerators of, for example, the Cockroft-Walton type, the Vandergraph type, the resonance transformation type, the insulated core transformer type, the linear type, the dynamitron type or the high-frequency type and having an energy of from 50 to 1000 keV, preferably from 100 to 300 keV.

Although the irradiation conditions vary from lamp to lamp, the irradiation dose is preferably 10 mJ/cm$^2$ or more, more preferably from 50 mJ/cm$^2$ to 10000 mJ/cm$^2$ and particularly preferably from 50 mJ/cm$^2$ to 2000 mJ/cm$^2$. In this step, the irradiation dose distribution in the width direction including both edges of the web preferably ranges from 50 to 100%, more preferably from 80 to 100%, based on the maximum irradiation dose at the center.

In the invention, it is preferable that at least one layer layered on the support is cured by the step of irradiating with an ionizing radiation in which the ionizing radiation is irradiated under heating to give a film face temperature of 60° C. or higher for 0.5 sec or longer from the initiation of the irradiation with the ionizing radiation in an atmosphere with an oxygen concentration of 10% by volume or less.

Also, it is preferable to heat the layer in an atmosphere with an oxygen concentration of 3% by volume or less simultaneously with the irradiation with the ionizing radiation and/or continuously thereafter.

In particular, it is preferable to cure a low refractive index layer, which is provided as the outermost layer and has a small thickness, by this method. Thus, the curing reaction is accelerated by heating to give a film excellent in mechanical strength and chemical resistance.

It is preferable that the irradiation with the ionizing radiation is conducted for 0.7 sec or longer but not longer than 60 sec and more preferably 0.7 sec or longer but not longer than 10 sec. When the irradiation time is not longer than 0.5 sec, the curing reaction cannot be completed and sufficient curing cannot be established. It is undesirable to maintain the low-oxygen conditions for a long time, since a large-scaled equipment and a large amount of an inert gas are needed therefor.

It is preferable to conduct the crosslinking reaction or the polymerization of the curable composition in an atmosphere with an oxygen concentration of 6% by volume or less, more preferably with an oxygen concentration of 4% by volume or less, particularly preferably with an oxygen concentration of 2% by volume or less and most preferably with an oxygen concentration of 1% by volume or less. To unnecessarily lower the oxygen concentration, an inert gas such as nitrogen should be used in a large amount, which is undesirable from the viewpoint of production cost.

To regulate the oxygen concentration to 10% by volume or less, it is preferable to employ a technique of replacing the atmosphere (nitrogen concentration being about 79% by volume and oxygen concentration being about 21% by volume) by another gas, particularly preferably nitrogen gas (i.e., purging with nitrogen).

By supplying an inert gas into the ionizing radiation irradiation room and somewhat blowing the gas into the web inlet side of the irradiation room, the air transported together with the web can be eliminated and the oxygen concentration in the reaction room can be effectively lowered. At the same time, the substantial oxygen concentration on the supersurface, wherein curing is seriously disturbed by oxygen, can be efficiently lowered. The inert gas flow direction in the web inlet side of the irradiation room can be controlled by adjusting the gas supply/discharge balance in the irradiation room, etc.

Also, use can be preferably made of the method of directly blowing an inert gas to the web surface for eliminating the air transported together with the web.

It is also preferable to locate an anterior room in front of the reaction room. Thus, oxygen can be preliminarily eliminated from the web surface and curing can be conducted at an elevated efficiency. To efficiently utilize the inert gas, it is preferred that the gap between at least one of the side faces constituting the web-inlet side of the ionizing radiation reaction room or the anterior room and the web surface is adjusted to 0.2 to 15 mm, more preferably 0.2 to 10 mm and most preferably 0.2 to 5 mm. To continuously produce the web, however, it is necessary to unite the web by bonding. For the bonding, it is a common practice to employ a bonding tape or the like. In the case where the gap between the inlet of the ionizing radiation reaction room or the anterior room and the web is too small, there arises a problem of the hung up of the bonding member such as a bonding tape. To lessen the gap, therefore, it is preferable to make at least a part of the inlet face of the ionizing radiation room or the anterior room movable and enlarge the gap by the thickness of the bonded part, when the bonded part enters the room. To achieve this object, use may be made of a method which comprises making the inlet face of the ionizing radiation room or the anterior room movable back and forth in the traveling direction and enlarging the gap by moving the face back and forth when a bonding part passes through the inlet, or another method which comprises making the inlet face of the ionizing radiation room or the anterior room movable perpendicularly to the web face and enlarging the gap by moving the face up and down when a bonding part passes through the inlet.

In the step of curing, it is preferable that heating is made so as to control the film face temperature to 60° C. of higher but not higher than 170° C. Curing scarcely occurs by heating at a temperature of 60° C. or lower, while some problems such as deformation of the base material arises at a temperature of 170° C. or higher. The temperature more preferably ranges from 60° C. to 100° C. The term "film face temperature" means the film face temperature of the layer to be cured. It is also preferable that the film face temperature is maintained at the temperature as defined above for 0.1 sec or longer but not longer than 300 sec, more preferably not longer than 10 sec. When the time of maintaining the film face temperature at the above temperature is too short, the reaction of the curing composition for the film formation cannot be promoted. When the time is too long, on the contrary, there arise some problems in the production such as worsening in the optical performance of the film and necessity for a larger apparatus.

Although the heating method is not particularly restricted, use may be preferably made therefor of the method of contacting the web with a heated roll, the method of blowing a heated nitrogen stream or irradiation with far infrared light or infrared light. It is also possible to employ a heating method described in Japanese Patent No. 2523574 which comprises flowing a heating medium such as hot water, steam or oil in a rotating metal roll. Moreover, use may be made of a dielectric heat roll for the heating.

Ultraviolet light irradiation may be conducted after forming each of the multiple layers constituting the film. Alternatively, it may be conducted after the completion of the lamination. Moreover, these irradiation procedures may be combined together. From the viewpoint of productivity, it is favorable that the multiple layers are laminated and then irradiated with ultraviolet light.

In the invention, at least one layer layered on the support can be cured by irradiating with ionizing radiation twice or more. In this case, it is preferable to conduct the ionizing radiation irradiation at least twice in continuous reaction rooms wherein the oxygen concentration does not exceed 3% by volume. By conducting the ionizing radiation irradiation twice or more in reaction rooms having the same oxygen concentration at a low level, the reaction time necessary for the curing can be efficiently ensured.

In the case of elevating the production speed to thereby achieve a high productivity, in particular, ionizing radiation irradiation should be conducted twice or more so as to ensure the ionizing radiation energy required for the curing reaction. (0270)

In the case where the curing rate (100—the content of residual functional group) attains a certain level lower than 100%, it is preferable to form another layer thereon in such a manner that the curing rate of the lower layer is elevated after curing by ionizing radiation and/or heating compared with the level before the formation of the upper layer. This is because the adhesiveness between the under layer and the upper layer is improved thereby.

4-(6) Handling

To continuously produce the film according to the invention, the production method involves the step of continuously feeding a rolled transparent support film, the step of applying a coating solution and drying the same, the step of curing the coating film, and the step of winding the support film having the thus cured layer.

Now, the procedures will be described in detail.

From a support film roll, the support film is continuously fed into a clean room. In the clean room, static electricity is eliminated from charged support film by a neutralization apparatus. Next, foreign matters sticking to the support film is eliminated by a dedusting device. Then a coating solution is applied to the support film in the coating part located in the clean room and the thus coated support film is transported into a drying room and dried.

The support film having the dried coating layer is fed from the drying room to a curing room where the monomer contained in the coating layer is polymerized, thereby causing curing. The support film having the cured layer is further transported to a curing part to thereby complete the curing. The support film having the thus completely cured layer is wound into a roll.

The above-described steps may be performed for the formation of each layer. Alternatively, it is also possible to provide a plural number of systems each having a coating part-a drying room-a curing part so that individual layers are continuously formed. In the case of successively forming the hard coat layer on the light diffusion layer, it is preferable to employ the method with the use of a plural number of systems each having a coating part-a drying room-a curing part.

To produce the film according to the invention, it is preferable that, as well as the precision filtration of the coating solution as discussed above, the coating step in the coating part and the drying step in the drying room are performed in an atmosphere of a high air cleanliness and dust and debris have been sufficiently removed from the film before the coating. The air cleanliness in the coating step and the drying step is preferably class 10 (not more than 353 particles ($\geqq 0.5$ $\mu$m)/m$^3$) or more, more preferably class 1 (not more than 35.5 particles ($\geqq 0.5$ $\mu$m)/m$^3$) or more, in accordance with US Federal Standard 209E. It is still preferable that a high air cleanliness is also achieved in the parts other than the coating-drying steps such as the winding part.

4-(7) Saponification

In the case where the film according to the invention is employed as at least one of two surface-protective films of a polarizing film in producing a polarizing plate, it is preferable to make the surface of the film in the side to be bonded to the polarizing film hydrophilic to thereby improve the adhesiveness in the adhesion face.

a. Method of Dipping in Alkali Solution

By this method, the film is dipped in an alkali solution under appropriate conditions so as to saponify all faces of the entire film surface having reactivity with the alkali. This method is preferred from the viewpoint of cost, since no specific equipment is needed therefor. As the alkali solution, an aqueous sodium hydroxide solution is preferred. The concentration of the alkali solution is preferably from 0.5 to 3 mol/L, particularly preferably from 1 to 2 mol/L. The solution temperature is preferably from 30 to 75° C., particularly preferably from 40 to 60° C.

Concerning the saponification conditions, it is preferable to combine relatively mild conditions together, though the conditions may be appropriately designed depending on the materials and constitution of the film and the desired contact angle.

After dipping in the alkali solution, it is preferable to sufficiently wash the film with water or neutralize the alkali component by dipping in a dilute acid, thereby eliminating the alkali component remaining in the film.

Owing to the saponification treatment, the surface having the coating layer and the opposite surface are made hydrophilic. A protective film for a polarizing plate is employed by adhering the hydrophilic surface of the transparent support to the polarizing film.

The hydrophilic surface is effective in improving the adhesiveness to the adhesive layer having polyvinyl alcohol as the main component.

In the saponification treatment, a lower contact angle of the to water of surface of the transparent support in the side opposite to the side having the coating layer is preferred from the viewpoint of the adhesiveness to a polarizing film. On the other hand, the region from the surface having the coating layer to the inside is damaged by the alkali in the dipping method. Therefore, it is important to employ the minimum necessary reaction conditions. In the case where the transparent support is made of triacetyl cellulose, contact angle of the transparent support surface in the opposite surface to water, being employed as an indication of the damage of each layer caused by the alkali, is preferably from 10° to 50°, more preferably from 30° to 50° and more preferably from 40° to 50°. It is undesirable that the contact angle exceeds 50°, since the adhesiveness to the polarizing film is worsened in this case. On the other hand, it is undesirable that the contact angle is less than 10°, since the film is too seriously damaged and its mechanical strength is lowered in this case.

b. Method of Applying Alkali Solution

As a means of avoiding the damage on each layer in the dipping method as described above, use is preferably made of the alkali solution application method which comprises applying an alkali solution exclusively to the surface having the coating layer and the opposite surface under appropriate conditions, heating, washing with water and drying. The term "application" as used herein means bringing the faces to be saponified alone into contact with the alkali solution, etc. Namely, it involves not only applying but also spraying, contacting with a belt containing the solution, and so on. However, additional device(s) and step(s) are needed to conduct these procedures and, therefore, this method is inferior to the dipping method (a) from the viewpoint of cost. On the other hand, the face to be saponified alone is brought into contact with the alkali solution, which makes it possible to use a material less resistant to the alkali solution in the layer of the face in the opposite side. For example, it is undesirable in the dipping method to use a deposition film and a sol-gel film which suffer from various troubles such as corrosion, dissolution, stripping and so on upon contact with the alkali solution. However, these films can be used without any problem in the application method wherein these films are not contacted with the solution.

Since each of the above methods a and b can be conducted after unwinding the rolled support and forming the individual layers. Thus, it can be carried out after the film production as part of the process. Moreover, the step of bonding to the polarizing plate unwound from the rolled support can be continuously conducted too. Thus, the polarizing plate can be produced at a higher efficiency than in the sheet-feed system.

c. Method of Saponifying Under Protection with Laminate Film

In the case where the coating layer has only an insufficient resistance to an alkali solution similar to the method b as described above, use can be made of a method which comprises, after forming the final layer, bonding a laminate film to the face having the final layer thus formed, then dipping in an alkali solution to thereby make hydrophilic exclusively the triacetyl cellulose face in the side opposite to the face having the final layer formed thereon, and then stripping the laminate film. According to this method, the hydrophilic treatment to a degree required as a protective film for a polarizing plate can be conducted exclusively on the face opposite to the face having the final layer of the triacetyl cellulose film without damaging the coating layer. Compared with the method b as described above, the laminate film should be disposed but no specific device for applying the alkali solution is needed in this method.

d. Method of Dipping in Alkali Solution After Forming Intermediate Layer

In the case where lower layer(s) are resistant to an alkali solution but upper layer(s) are insufficiently resistant thereto, it is also possible to employ a method which comprises, after forming the lower layer(s), dipping the film in the alkali solution to thereby make both faces hydrophilic, and then forming the upper layer(s). Although complicated production procedures are needed, this method is advantageous in, for example, an antireflective film comprising a light diffusion layer and a low refractive index layer and having a hydrophilic group, since the interlayer adhesiveness between the light diffusion layer and the low refractive index layer can be elevated thereby.

e. Method of Forming Coating Layer on Preliminarily Saponified Triacetyl Cellulose Film It is also possible that a triacetyl cellulose film is preliminarily saponified by dipping in an alkali solution and then a coating film is formed on one of the faces either directly or via another layer. When the film is saponified by dipping in the alkali solution, the interlayer adhesiveness to the triacetyl cellulose face, which has been made hydrophilic by the saponification, is worsened in some cases. This problem can be overcome by, after the saponification, treating the face for forming the coating layer alone by corona discharge, glow discharge, etc. to thereby eliminate the hydrophilic face therefrom followed by the formation of the coating layer. In the case where the coating layer has a hydrophilic group, a favorable interlayer adhesiveness is sometimes observed.

4-(8) Construction of Polarizing Film

A film of the invention can be used as a polarizing film and a protective film provided in one or both sides thereof to give a polarizing film.

It is possible that a film according to the invention is used as one of the protective films while a commonly employed cellulose acylate film is used as the other protective film. However, it is favorable to use a cellulose acylate film which has been produced by the solution film-forming method as described above and stretched at a ratio of 10 to 100% in the width direction of the rolled film.

Polarizing films include iodine-based polarizing films, dye-based polarizing films using a dichroic dye and polyene-based polarizing films. A iodine-based polarizing film and a dye-based polarizing film are generally produced by using polyvinyl alcohol type films.

The transmission axis of the polarizing film is located substantially in parallel to the slow axis of the transparent support or the cellulose acetate film of the antireflective film.

In producing a polarizing plate, the vapor transmittance of the protective film is an important factor. The polarizing film is bonded to the protective film with a water-based adhesive. This adhesive is dried while diffusing in the protective film. The drying time is shortened and the productivity is elevated with an increase in the vapor transmittance of the protective film. When the vapor transmittance is excessively high, however, moisture enters into the polarizing film in the usage environment (at high humidity) of a liquid crystal display device, thereby worsening the polarizing performance.

The vapor transmittance of the protective film is determined depending on the thickness, free volume, hydrophilic/hydrophobic nature of the transparent support or the polymer film (and the polymerizable liquid crystal compound) and so on.

In the case of using the film of the invention as a protective film in a polarizing plate, the vapor transmittance thereof preferably ranges from 100 to 1000 $g/m^2$ 24 h, more preferably from 300 to 700 $g/m^2$ 24 h.

In the film-forming step, the thickness of the transparent support can be adjusted by controlling the lip flow rate or the line speed, or by stretching or shrinking. Since the vapor transmittance varies depending on the main material employed, the vapor transmittance can be controlled within a preferred range by adjusting the thickness.

In the film-forming step, the free volume of the transparent support can be controlled depending on the drying temperature and time.

In this case, the vapor transmittance varies depending on the main material employed too. Therefore, the vapor transmittance can be controlled within a preferred range by adjusting the free volume.

The hydrophilic/hydrophobic nature of the transparent support can be controlled by additive(s). Namely, the vapor transmittance can be elevated by adding a hydrophilic additive to the free volume, while it can be lowered by adding a hydrophobic additive thereto.

By independently controlling the vapor transmittance as described above, a polarizing plate can be economically produced at a high productivity.

As the polarizing film, use may be made of a publicly known polarizing film or a polarizing film cut out from a continuous polarizing film sheet the absorption axis of which is neither parallel nor perpendicular to the lengthwise direction.

That is, such a continuous polarizing film sheet can be produced by a stretching method which comprises stretching a polymer film by applying a tension while holding both ends of the film by holding members, stretching the thus obtained polarizing film at a stretching ratio of at least 1.1 to 20.0 in the film width direction, and flexing the film-traveling direction while holding its both ends so that the difference in the speed in the lengthwise direction between the holding members at the both ends of the film is not more than 3% and the angle between the film-traveling direction at the outlet of the step holding the both ends of the film and the actual stretching direction of the film inclines at 20 to 70°. From the viewpoint of productivity, a film with an incline angle of 45° is preferably employed.

The polarizing film can be stretched in accordance with the method described in detail in paragraphs (0020) to (0030) in JP-A-2002-86554.

It is also preferable that, in two protective films of the polarizing plate, the one other than the optical film or the antireflective film as described above is an optically compensatory film having an optically compensatory layer containing an optically anisotropic layer. Such an optically compensatory film (a phase difference film) can contribute to the improvement in the viewing angle characteristics of a liquid crystal display screen.

As the optically compensatory film, use can be made of a publicly known one. To enlarge the viewing angle, it is favorable to use an optically compensatory film disclosed in JP-A-2001-100042.

5. Application Mode of the Invention

A film and polarizing plate of the invention are applicable to image display devices such as a liquid crystal display (LCD), a plasma display panel (PDP), an electroluminescence display (ELD) and a cathode ray tube (CRT). The optical film and antireflective film according to the invention are usable on publicly known displays such as a plasma display panel (PDP) or a cathode ray tube (CRT). In such a case, the light diffusion layer of the optical film is located in the viewing side while the low refractive index layer is of the antireflective film is located in the viewing side. The same applies to polarizing plates having the optical film and the antireflective film.

5-(1) Liquid Crystal Display Device

A film and polarizing plate of the invention are advantageously usable in image display devices such as a liquid crystal display device. It is preferable to use the film or the polarizing plate as the outermost layer of the display.

A liquid crystal display device has a liquid crystal cell and two polarizing plates provided in both sides thereof. The liquid crystal cell holds liquid crystals between two electrode substrates. In some cases, an optically anisotropic layer is further provided between the liquid crystal cell and one of the polarizing plates, or two optically anisotropic layers are provided between the liquid crystal cell and both of the polarizing plates.

It is preferable that the liquid crystal cell is of the TN mode, the VA mode, the OCB mode, the IPS mode or the ECB mode.

<TN Mode>

In a liquid crystal cell of the TN mode, rod-shaped liquid crystal molecules are substantially horizontally oriented when no voltage is applied, and further oriented in a direction twisted by 60 to 120°.

Liquid crystal cells of the TN mode, which are most frequently employed in color TFT liquid crystal display devices, have been reported in a number of documents.

<VA Mode>

Liquid crystal cells of the VA mode include: (1) a VA mode liquid crystal cell in a narrow sense in which rod-shaped liquid crystal molecules are substantially vertically oriented when no voltage is applied, and substantially horizontally oriented when voltage is applied (JP-A-2-176625); (2) a liquid crystal cell of the multidomained VA mode (MVA mode) for enlarging viewing angle (SID97, Digest of tech Papers, 28 (1987) 845); (3) a liquid crystal cell in which rod-shaped liquid crystal molecules are substantially vertically oriented when no voltage is applied, and oriented in a twisted multi-domain state when voltage is applied (n-ASM mode) (Digest of tech Papers, Nihon Ekisho Toronkai, 58-59 (1998)); and (4) a liquid crystal cell of the survival mode (reported in LCD International 98).

<OCB Mode>

A liquid crystal cell of the OCB mode is a liquid crystal cell of the bend orientation mode in which rod-shaped liquid crystal molecules are oriented substantially oppositely (symmetrically) in the upper part and lower part of the liquid crystal cell. Liquid crystal display devices using the bend orientation mode liquid crystal cells are disclosed in U.S. Pat. No. 4,583,825 and U.S. Pat. No. 5,410,422. Since rod-shaped liquid crystal molecules are symmetrically oriented in the upper and lower parts of the liquid crystal cell, the liquid crystal cell of the bend orientation mode has a optically self-compensatory function. Thus, a liquid crystal cell of this mode is called the OCB (Optically Compensatory Bend) liquid crystal mode. A liquid crystal display device of the bend orientation mode is advantageous in having a high response speed.

<IPS Mode>

In a liquid crystal cell of the IPS mode, use is made of a system wherein a horizontal electric field is applied to nematic liquid crystals for switching. It is described in greater detail in Proc. IDRC (Asia Display '95), p. 577 to 580 and p. 707 to 710.

<ECB Mode>

In a liquid crystal cell of the ECB mode, rod-shaped liquid crystal molecules are substantially horizontally oriented when no voltage is applied. The ECB mode, which is one of liquid crystal display modes with the simplest structure, is reported in detail in, for example, JP-A-5-203946.

5-(2) Displays Other than Liquid Crystal Display Device

<PDP>

A plasma display panel (PDP) generally comprises a gas, glass substrates, electrodes, electrode leads, a thin film printing material and a fluorescent material. Two glass substrates, i.e., a front glass substrate and a back glass substrates are employed. On each of these two glass substrates, an electrode and an insulating layer are formed. On the back glass substrate, a fluorescent layer is further formed. These two glass substrates are put together and the gas is enclosed between them.

Plasma display panels (PDPs) have been already marketed. Plasma display panels are reported in JP-A-5-105643 and JP-A-9-306366.

In some cases, a front plate is provided in front of a plasma display panel. It is preferable that this front plate has a sufficient strength for protecting the plasma display panel. It is also possible to provide a certain space between the front plate and the plasma display panel. Alternatively, the front plate may be directly bonded to the plasma display.

In an image display device such as a plasma display panel, an optical filter may be directly bonded to the display surface. In the case where a front plate is provided in front of the display, it is also possible to bond an optical filter to the front side (outside) or the back side (display side) of the front plate.

<Touch Panel>

The film of the invention is applicable to touch panels described in, for example, JP-A-5-127822 and JP-A-2002-48913.

<Organic EL Display Unit>

The film of the invention is usable as a base (base film) or a protective film in an organic EL display unit or the like.

To use the film of the invention in an organic EL display unit or the like, reference may be made of, for example, the disclosures in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617 and JP-A-2002-056976. It is preferable to use the disclosures in JP-A-2001-148291, JP-A-2001-221916 and JP-A-2001-231443 too.

6. Various Characteristic Values

Next, various measurement methods and preferable characteristic values relating to the invention will be presented.

6-(1) Reflectivity

By using a spectrophotometer "V-5502" (manufactured by JASCO) provided with an adaptor "ARV-474", the spectral reflectivity at an output angle of −5 at an incident angle of 5° in a wavelength range of from 380 to 780 nm was measured to evaluate the spectral reflectivity and the tint. The antireflective properties can be evaluated by calculating the average reflectivity at 450 to 650 nm.

2-(2) Tint

In the polarizing plate having antireflective properties according to the invention, the tint can be evaluated by determining the tint of specular light to incident light at an incident angle of 5° in a wavelength range of from 380 to 780 nm, i.e., the L*, a* and b* values in the CIE1979 L*a*b* color space.

It is preferable that the L*, a* and b* values respectively satisfies the following requirements: $3 \leq L^* \leq 20$, $-7 \leq a^* \leq 7$ and $-10 \leq b^* \leq -10$. So long as regulating these values within the ranges as specified above, the tint of reddish purple to bluish purple incident light, which has been regarded as a problem in the existing polarizing plates, can be lessened. Moreover, this phenomenon is largely lessened by regulating the values to $3 \leq L^* \leq 10$, $0 \leq a^* \leq 5$ and $-7 \leq b^* \leq 0$. When such a polarizing plate is applied to a liquid display device, the tint becomes neutral and non-offensive even in the case where outside light of a high brightness (for example, a fluorescent lamp in room) is slightly reflected. More specifically speaking, $a^* \leq 7$ is preferable because of not excessively strengthening the red color, $a^* \geq -7$ is preferable because of not excessively strengthening the cyan color, $b^* \geq -7$ is preferable because of not excessively strengthening the blue color, and $b^* \leq 0$ is preferable because of not excessively strengthening the yellow color.

The tint evenness of reflected light can be obtained as the rate of change in tint calculated in accordance with the following numerical formulae (21) with the use of the L*, a* and b* values on the L*a*b* color chart determined by the reflection spectrum of the reflected light in the range of 380 nm to 680 nm.

$$\text{Tint change rate}(a^*) = (a^*_{max} - a^*_{min}/a^*_{av}) \times 100$$

$$\text{Tint change rate}(b^*) = (b^*_{max} - b^*_{min}/b^*_{av}) \times 100 \qquad \text{Numerical formulae (21)}$$

In the above formulae, $a^*_{max}$ and $a^*_{min}$ respectively represent the maximum and minimum values of $a^*$:$b^*_{max}$ and $b^*_{min}$ respectively represent the maximum and minimum values of $b^*$: and $a^*_{av}$ and $b^*_{av}$ respectively represent the averages of $a^*$ and $b^*$. Each of the tint change rates is preferably 30% or less, more preferably 20% or less and most preferably 8% or less.

It is also preferable that the film of the invention has $\Delta E_w$, which is a change in tint before and after a weatherability test, of 15 or less, more preferably 10 or less and most preferably 5 or less. So long as $\Delta E_w$ falls within this range, both of low reflection and lessened change in the tint of reflected light can be established. When such a film is employed as the outermost face of a liquid display device, the tint becomes neutral a high-grade image can be obtained in the case where outside light of a high brightness (for example, a fluorescent lamp in room) is slightly reflected, thereby giving favorable results.

The tint change $\Delta E_w$ as described above can be determined in accordance with the following numerical formula (22).

$$\Delta E_w = ((\Delta L_w)^2 + (\Delta a_w)^2 + (\Delta b_w)^2)^{1/2} \qquad \text{Numerical formula (22)}$$

In the above formula, $\Delta L_w$, $\Delta a_w$, and $\Delta b_w$ respectively stand for change rates in the L*, a* and b* values before and after the weatherability test.

6-(3) Clarity of Transmission Image

The clarity of transmission image can be measured in accordance with JIS-K7105 by using an image clarity meter (Model ICM-2D: manufactured by Suga Test Instruments Co., Ltd.) and an optical comb having a slit width of 0.5 mm.

It is preferable that the transmission image clarity of the film according to the invention is 60% or higher. Transmission image clarity is a value showing the degree of the fuzziness in an image transmitted through the film. A higher transmission image clarity means that an image with the higher clarity and grade can be obtained. The transmission image clarity is preferably 70% or higher, more preferably 80% or higher.

6-(4) Surface Roughness

The arithmetic surface average (Ra) can be measured in accordance with JIS-B0601.

6-(5) Haze

The term "haze" as used herein, which means the haze value defined by JIS-K7105, can be automatically measured (haze=(diffused light/total transmitted light)×100) by using "Haze Meter NDH-1001DP" (manufactured by Nippon Denshoku Industries) based on the measurement method as defined in JIS K7361-1.

The haze of the film of the invention is preferably 50% or lower, more preferably 40% or lower and most preferably 30% or lower.

6-(6) Hardness

<Pencil Hardness>

The hardness of the film of the invention can be evaluated by the pencil hardness test in accordance with JIS-K5400.

It is preferable that the pencil hardness of the film is H or above, more preferably 2 H or above and most preferably 3 H or above.

<Surface Elastic Modulus>

The surface elastic modulus to be used herein is a value determined by using a nanohardness tester (Fisherscope H100VP-HCU; manufactured by Fisher Instruments). More specifically speaking, using a quadrangular-pyramid diamond indenter (the angle between the opposite faces: 136°), the depth of indentation under application of an appropriate test load is measured while controlling the depth of indentation so as to not exceed 1 μm. Then, the elastic modulus is determined based on the change in the load and displacement when the load is removed.

The surface hardness can be also determined as universal hardness by using the nanohardness tester as described above. The universal hardness means a ratio calculated by measuring the impression depth formed by pressing a quadrangular-pyramid diamond indenter under a test load and dividing the test load by the surface area of the impression (calculated from the geometric shape of the indenter) produced at the test load. it has been known that the surface elastic modulus positively correlates to the universal hardness.

Universal hardness is indicated herein as universal hardness (N/mm$^2$) determined by the following procedure with a nanohardness tester (Fisherscope H100U; manufactured by Fisher Instruments) using a crosslinking polymer film of about 20 to 30 μm in thickness formed and cured on a glass plate.

A coating solution (solid content: about 25%) containing the crosslinkable polymer and other necessary additives such as a catalyst, a crosslinking agent and a polymerization initiator is coated on a polished slide glass plate (manufactured by TOSHINRIKO, Co., Ltd.; 26 mm×76 mm×1.2 mm) by using an appropriate bar coater to give a cured film thickness of about 20 to 30 μm. When the crosslinkable polymer is a heat-curable one, the heat curing conditions allowing sufficient curing of the film (for example, 10 minutes at 125° C.) have been preliminarily determined. When the crosslinkable polymer is an ionizing radiation-curable one, the curing conditions allowing sufficient curing of the film (for example, at an oxygen concentration of 12 ppm and UV irradiation dose of 750 mJ/cm$^2$) have been preliminarily determined too. The load on each film is continuously increased from 0 to 4 mN. By referring the 1/10 film thickness exerting no effect on the glass plate hardness employed as the substrate as to the maximum, the impression area A (mm$^2$) formed by pressing a quadrangular-pyramid diamond indenter under each load F is measured. Then, the universal hardness is calculated based on the average of F/A=N measured six times.

It is also possible to determine the surface hardness by the nanoindentation described in JP-A-2004-354828. In this case, the hardness preferably ranges from 2 GPa to 4 GPa, while the nanoindentation elastic modulus preferably rages from 10 GPa to 30 GPa.

6-(7) Antifouling Test

<Felt Pen Wiping Off>

The film was fixed on a glass face with a pressure sensitive adhesive and three circles (diameter 5 mm) are drawn with the pen point (fine) of a black felt pen "Mckee Gokuboso®, manufactured by ZEBRA Co.) at 25° C. and 60 RH %. Five second thereafter, the circles are reciprocally wiped off 20 times with BEMCOT® (manufactured by ASAHI KASEI Co.) folded in ten under such a load as putting a dent on the BEMCOT sheets. The drawing and wiping are repeated under the above-described conditions until the ink trace becomes indelible and the wiping number is determined. Thus, the antifouling properties can be evaluated based on the wiping number.

The wiping number until the ink trace becomes indelible is preferably 5 or more, more preferably 10 or more.

Concerning a black permanent ink, evaluation can be also made by drawing a circle (diameter 1 cm) with a black permanent ink No. 700 (M700-T1, black, ultrafine), marking it out and, after allowing to stand for 24 hours, trying to wipe off the ink with BEMCOT® (manufactured by ASAHI KASEI Co.).

6-(8) Surface Tension

The surface tension to be measured and evaluated herein can be determined by measuring the surface tension of a coating solution forming a functional layer at a temperature of 25° C. with the use of a surface tension meter (KYOWA CBVP SURFACE TENSIOMETER A3; manufactured by KYOWA INTERFACE SCIENCE Co. Ltd.).

6-(9) Contact Angle

Using a contact angle meter (Model CA-X, manufactured by KYOWA INTERFACE SCIENCE Co. Ltd.), a droplet (diameter 1.0 mm) is formed at the needlepoint with the use of pure water in a dry state (20° C./65% RH). Then, this droplet is brought into contact with the film surface to form a droplet on the film. Then, the angle between the tangent line to the liquid surface and the film surface (the angle in the side having the liquid) at the point where the film is in contact with the liquid is referred to as the contact angle.

6-(10) Surface Free Energy

As described in *Nure to Oyo*, Riaraizu-sha, Dec. 10, 1989, surface free energy can be determined by the contact angle method, the wetting heat method or the adsorption method. In the film of the invention, it is preferable to employ the contact angle method.

More specifically speaking, two solutions having known surface energies are dropped onto a cellulose acylate film. Then, the angle between the tangent line to the liquid droplet surface and the film surface (the angle in the side having the liquid) at the point at the intersecting point of the droplet surface and the film surface is referred to as the contact angle. Then, the surface energy of the film can be calculated.

Surface free energy ($\gamma s^V$: unit mN/m) means the surface tension of an antireflective film defined by the sum of $\gamma s^d$ and $\gamma s^h$ ($\gamma s^V = \gamma s^d + \gamma s^h$) that are obtained by using experimentally determined contact angles of pure water $H_2O$ and methylene chloride $CH_2I_2$ $\theta_{H2O}$ and $\theta_{CH2I2}$ on the antireflective film and the following simultaneous equations a and b. A smaller $\gamma s^V$ means the hither surface repellency and better antifouling properties in genera.

$$1+\cos\theta_{H2O}=2(\gamma_s^d)^{1/2}((\gamma_{H2O}^d)^{1/2}/\gamma_{H2O}^v)+2(\gamma_s^h)^{1/2}((\gamma_{H2O}^h)^{1/2}/\gamma_{H2O}^v) \qquad a.$$

$$1+\cos\theta_{CH212}=2(\gamma_s^d)^{1/2}((\gamma_{CH212}^d)^{1/2}/\gamma_{CH212}^v)+2(\gamma_s^h)^{1/2}((\gamma_{CH212}^h)^{1/2}/\gamma_{CH212}^v) \qquad b.$$

$$\gamma_{H2O}^d=21.8, \gamma_{H2O}^h=51.0, \gamma_{H2O}^v=72.8$$

$$\gamma_{ch2i2}^d=49.5\ \gamma_{CH212}^h=1.3, \gamma_{CH212}^v=50.8$$

The contact angle is determined by conditioning the film at 25° C. and 65% RH for 1 hour or longer, then forming droplets (2 µl) on the film and, after 30 seconds, measuring the contact angle by using an automatic contact angle meter (Model CA-V150, manufactured by KYOWA INTERFACE SCIENCE Co. Ltd.).

The surface free energy of the film according to the invention is preferably 25 mN/m or less, particularly preferably 20 mN/m or less.

6-(11) Curl

Curl is measured by using a template for curl measurement as defined in the method A "Determination of the curl of photographic film" in JIS-K7619-1988.

The measurement is conducted at 25° C. and 65% RH and conditioning time is 10 hours.

The curl value of the film of the invention, expressed in the following numerical formula (23), preferably ranges from −15 to +15, more preferably from −12 to +12 and more preferably from −10 to +10. In this method, the curl is measured in the sample along the transporting direction of the base material in the case of the web-coating.

$$\text{Curl}=1/R \qquad \text{Numerical formula (23)}$$

wherein R represents a radius of curvature (unit: m).

The above factor is highly important for producing a film that can be easily handled through market and suffers from neither cracking nor stripping. A curl value falling within the range as defined above being small is preferred.

A positive curl value means that the side having the coating film is located inside the curl, while a minus curl value means the side having the coating film is located outside.

In the film of the invention, it is also preferable that, when the relative humidity alone is changed to 80% and 10% in accordance with the curl measurement method as described above, the absolute value of the difference between the curl values range from 24 to 0, more preferably from 15 to 0 and most preferably from 8 to 0. This is a factor relating to the handling properties, stripping and cracking in bonding the film under various humidities.

6-(12) Evaluation of Adhesiveness

The adhesiveness between layers of the film or between the support and a coating layer can be evaluated by the following method.

On the surface of the film in the side having the coating layer, 11 notches are made at intervals of 1 mm in each of the lengthwise and crosswise directions to give 100 squares. Next, a polyester adhesive tape (No. 31B; manufactured by NITTO DENKO Co.) is bonded to it. After allowing to stand for 24 hours, the tape is stripped. This test is conducted thrice at the same position and the presence/absence of stripping is observed with the naked eye.

It is preferable that not more than 10 squares among 100 show stripping, more preferably not more than 2 squares.

6-(13) Fragility Test (Cracking Resistance)

Cracking resistance is an important factor in avoiding cracking in the course of handling the film including, for example, coating, processing, cutting, applying a pressure-sensitive adhesive and bonding to various articles.

A film sample is cut into a piece (35 mm×140 mm) and allowed to stand at a temperature of 25° C. and a relative humidity of 60% for 2 hours. Next, it is curled up and the radius of curvature at the initiation of cracking is measured. Thus, the surface cracking can be evaluated.

In the case of curling with the coating layer side outside, it is preferable that the film of the invention has a cracking resistance (the radius of curvature at the initiation of cracking) of 50 mm or less, more preferably 40 mm or less and most preferably 30 mm or less. Concerning cracking at edges, it is preferable that no crack occurs or the crack length is less than 1 mm on average.

6-(14) Dedusting Properties

Dedusting properties can be evaluated by bonding the film of the invention to a monitor, spraying dusts (fiber dusts form bed clothes and clothes), and then wiping off the dusts.

It is preferable that the dusts can be completely removed by wiping 6 times, more preferably 3 times.

6-(15) Performance of Liquid Crystal Display Device

Next, methods of evaluating the characteristics of the film mounted on a display device and favorable states will be illustrated.

A polarizing plate bonded in the viewing side of a liquid crystal display device is taken off and the film or the polarizing plate of the invention is bonded, as a substitute, by using a pressure-sensitive adhesive so that the coating face is located in the viewing side and the transmission axis of the polarizing plate agrees with the transmission axis of the polarizing plate once bonded to the product. In a bright room at 500 lux, the liquid crystal display device is turned into black display. Thus, the following characteristics can be evaluated with the naked eye from viewing various angles.

<Evaluation of Color Irregularities and Tint>

By using the liquid crystal display device thus constructed, irregularities, streaks and tint changes in black display (L1) are evaluated with the naked eye by a plural number of panelists.

When evaluated by 10 panelists, it is preferable that not more than 3 persons (more preferably none) can recognize irregularities, streaks, difference in tint between right and left sides, changes in tint due to temperature/humidity and white fuzziness.

Extraneous images caused by the reflection of outside light is evaluated by using a fluorescent lamp the changes in the extraneous image are relatively evaluated with the naked eye.

<Light Leakage in Black Display>

The light leakage rates in black display at an aspect angle of 45° and at a polar angle of 70° from the front side of the liquid crystal display device are measured. It is preferable that the light leakage rates is 0.4% or less, more preferably 0.1% or less.

<Evaluation of Dazzling>

The term "dazzling" as used herein means not the presence or absence of glare caused by extraneous images caused by the reflection of an electrical lamp or the like as discussed with respect to antiglare properties but the phenomenon that R, G and B become dazzling to human eye due to enlargement of pixels due to the lens effect of the film. Evaluation is conducted by bonding an antiglare and antireflective film to a display and the dazzling of the liquid crystal display device is evaluated with the naked eye. When evaluated by 10 panelists, it is preferable that not more than 3 persons (more preferably none) can recognize dazzling.

EXAMPLES

Now, the invention will be illustrated in greater detail by referring to the following Examples, though the invention is not restricted thereto. Unless otherwise noted, all "part" and "%" are by weight.

(Preparation of Sol Solution a)

120 parts of methyl ethyl ketone, 100 parts of acryloxypropyltrimethoxysilane (KBM-5103; manufactured by SHIN-ETSU CHEMICAL Co., Ltd.) and 3 parts of diisopropoxyaluminum ethyl acetoacetate were introduced into a reactor provided with a stirrer and a reflux condenser and stirred. Next, 30 parts of ion-exchanged water was added. After reacting at 60° C. for 4 hours, the reaction mixture was cooled to room temperature to give a sol solution a. It had a weight-weight average molecular weight of 1600 and components of from 1000 to 20000 in molecular weight amounted to 100% of the oligomer components and higher. When analyzed by gas chromatography, it was found out that no starting acryloxypropyltrimethoxysilane remained therein.

(Preparation of Sol Solution b)

The procedure of preparing the sol composition a as described above was followed but 6 parts of acetylacetone was added after cooling to room temperature, thereby giving a sol solution b.

Composition of Coating Solution A for Light Diffusion Layer:

| PET-30 | 46.0 g |
| IRGACURE 184 | 1.7 g |
| MX-600 (30%) | 28.6 g |
| FP-2 | 0.06 g |
| KBM-5103 | 6.0 g |
| MiBK (methyl isobutyl ketone) | 14.0 g |
| MEK (methyl ethyl ketone) | 5.0 g |

Composition of Coating Solution B for Light Diffusion Layer:

| PET-30 | 46.0 g |
| IRGACURE 184 | 1.7 g |
| MX-600 (30%) | 23.0 g |
| FP-2 | 0.06 g |
| KBM-5103 | 6.0 g |
| MiBK | 19.0 g |
| MEK | 5.0 g |

Composition of Coating Solution C for Light Diffusion Layer:

| PET-30 | 50.0 g |
| IRGACURE 184 | 1.7 g |
| MX-500 (30%) | 11.0 g |
| FP-2 | 0.06 g |
| KBM-5103 | 6.0 g |
| MiBK | 26.0 g |
| MEK | 5.0 g |

Composition of Coating Solution D for Light Diffusion Layer:

| PET-30 | 45.0 g |
| IRGACURE 184 | 1.7 g |
| MSX-300 (30%) | 28.6 g |
| FP-2 | 0.06 g |
| KBM-5103 | 6.0 g |
| MiBK | 14.0 g |
| MEK | 5.0 g |

Composition of Coating Solution E for Light Diffusion Layer:

| PET-30 | 49.0 g |
| IRGACURE 184 | 1.7 g |
| MX-800 (30%) | 15.3 g |
| FP-2 | 0.06 g |
| KBM-5103 | 6.0 g |
| MiBK | 23.0 g |
| MEK | 5.0 g |

Composition of Coating Solution F for Light Diffusion Layer:

| PET-30 | 50.0 g |
| IRGACURE 184 | 1.7 g |
| MX-1000 (30%) | 11.0 g |
| FP-2 | 0.06 g |
| KBM-5103 | 6.0 g |
| MiBK | 26.0 g |
| MEK | 5.0 g |

Composition of Coating Solution G for Light Diffusion Layer:

| PET-30 | 40.0 g |
| IRGACURE 184 | 1.7 g |
| MX-600 (30%) | 48.0 g |
| FP-2 | 0.06 g |
| KBM-5103 | 6.0 g |
| MEK | 5.0 g |

Composition of Coating Solution H for Light Diffusion Layer:

| DESOLITE Z740 | 6.0 g |
| DPHA | 43.0 g |
| IRGACURE 184 | 1.7 g |
| MX-800 (30%) | 15.3 g |
| FP-2 | 0.06 g |
| KBM-5103 | 6.0 g |
| MiBK | 23.0 g |
| MEK | 5.0 g |

Composition of Coating Solution I for Light Diffusion Layer:

| | |
|---|---|
| PET-30 | 46.0 g |
| IRGACURE 184 | 1.7 g |
| MBX-5 (30%) | 23.0 g |
| FP-2 | 0.06 g |
| KBM-5103 | 6.0 g |
| MiBK | 19.0 g |
| MEK | 5.0 g |

Composition of Coating Solution J for Light Diffusion Layer:

| | |
|---|---|
| PET-30 | 50.0 g |
| IRGACURE 184 | 2.0 g |
| SX-350 (30%) | 1.7 g |
| crosslinked acryl-styrene particles (30%) | 13.3 g |
| FP-2 | 0.06 g |
| KBM-5103 | 6.0 g |
| toluene | 38.5 g |

Composition of Coating Solution K for Light Diffusion Layer:

| | |
|---|---|
| PET-30 | 40.0 g |
| DPHA | 6.0 g |
| IRGACURE 184 | 2.0 g |
| MX-800 (30%) | 28.6 g |
| FP-2 | 0.06 g |
| KBM-5103 | 6.0 g |
| MiBK | 14.0 g |
| MEK | 5.0 g |

Composition of Coating Solution L for Hard Coat Layer:

| | |
|---|---|
| PET-30 | 47.5 g |
| DPHA | 2.5 g |
| IRGACURE 184 | 2.0 g |
| FP-2 | 0.06 g |
| MiBK (methyl isobutyl ketone) | 58.5 g |
| MEK (methyl ethyl ketone) | 5.0 g |

Composition of Coating Solution M for Light Diffusion Layer

| | |
|---|---|
| PET-30 | 45.0 g |
| IRGACURE 184 | 1.7 g |
| MX-220 (30%) | 28.6 g |
| FP-2 | 0.06 g |
| KBM-5103 | 6.0 g |
| MiBK | 14.0 g |
| MEK | 5.0 g |

Composition of Coating Solution N for Light Diffusion Layer

| | |
|---|---|
| PET-30 | 45.0 g |
| IRGACURE 184 | 1.7 g |
| ART PEARL SE15 (30%) | 28.6 g |
| FP-2 | 0.06 g |
| KBM-5103 | 6.0 g |
| MiBK | 14.0 g |
| MEK | 5.0 g |

Composition of Coating Solution O for Light Diffusion Layer

| | |
|---|---|
| PET-30 | 52.3 g |
| IRGACURE 184 | 1.7 g |
| MX-600 (30%) | 4.16 g |
| FP-2 | 0.06 g |
| KBM-5103 | 6.0 g |
| MiBK | 31.1 g |
| MEK | 5.0 g |

Composition of Coating Solution P for Light Diffusion Layer

| | |
|---|---|
| PET-30 | 36.4 g |
| IRGACURE 184 | 1.7 g |
| MSX-600 (30%) | 57.2 g |
| FP-2 | 0.06 g |
| KBM-5103 | 6.0 g |

Each of the above compositions was filtered through a polypropylene filter having a pore size of 30 μm to thereby give coating solutions for light diffusion layer and hard coat layer.

Composition of Coating Solution E-1 for Low Refractive Index Layer:

| | |
|---|---|
| DPHA | 3.3 g |
| hollow silica (18.2%) | 40.0 g |
| RMS-033 | 0.7 g |
| IRGACURE 907 | 0.2 g |
| sol solution a | 6.2 g |
| MEK | 299.6 g |

Composition of Coating Solution E-2 for Low Refractive Index Layer:

| | |
|---|---|
| OPSTAR JN7228A (6%) | 13.0 g |
| MEK-ST (30%) | 1.3 g |
| MEK-ST-L (30%) | 1.3 g |
| sol solution a | 0.6 g |
| MEK | 5.0 g |
| cyclohexanone | 0.6 g |

Each of the above compositions was filtered through a polypropylene filter having a pore size of 1 μm to thereby give coating solutions for low refractive index layer.

The individual compounds employed are as follows.

KBM-5103: silane coupling agent (manufactured by SHIN-ETSU CHEMICAL Co.).

PET-30: mixture of pentaerythritol triacrylate with pentaerythritol tetraacrylate (manufactured by NIPPON KAYAKU Co., Ltd.).

IRGACURE 184: polymerization initiator (manufactured by Ciba Specialty Chemicals).

SX-350: crosslinked polystyrene particles having an average particle size of 3.5 µm (refractive index 1.60, manufactured by SOKEN KAGAKU K.K.), being in the form of a 30% dispersion in toluene having been dispersed in a Polytron dispersing machine at 10000 rpm for 20 minutes before using.

Crosslinked acryl-styrene particles: having an average particle size of 3.5 µm ((refractive index 1.55, manufactured by SOKEN KAGAKU K.K.), being in the form of a 30% dispersion in toluene having been dispersed in a Polytron dispersing machine at 10000 rpm for 20 minutes before using).

Fluororesin-Containing Copolymer (FP-2):

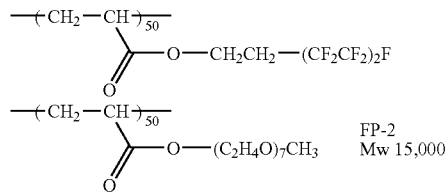

DESOLITE Z7404: hard coat agent containing $ZrO_2$ microparticles (refractive index 1.62, solid content 60% by weight, zirconium oxide microparticle content 70% by weight (based on solid matters), average particle diameter of zirconium oxide microparticles about 20 nm, solvent composition MIBK/MEK=9/1, manufactured by JSR).

DPHA: mixture of dipentaerythritol pentaacrylate with dipentaerythritol hexaacrylate (refractive index 1.52, manufactured by NIPPON KAYAKU Co., Ltd.).

MXS-300: PMMA particles having average particle diameter of 3 µm (refractive index 1.49, manufactured by SOKEN KAGAKU K.K., being in the form of a 30% dispersion in MIBK having been dispersed in a Polytron dispersing machine at 10000 rpm for 20 minutes before using).

MX-500: PMMA particles having average particle diameter of 5 µm (refractive index 1.49, manufactured by SOKEN KAGAKU K.K., being in the form of a 30% dispersion in MIBK having been dispersed in a Polytron dispersing machine at 10000 rpm for 20 minutes before using).

MX-600: PMMA particles having average particle diameter of 6 µm (refractive index 1.49, manufactured by SOKEN KAGAKU K.K., being in the form of a 30% dispersion in MIBK having been dispersed in a Polytron dispersing machine at 10000 rpm for 20 minutes before using).

MX-800: PMMA particles having average particle diameter of 8 µm (refractive index 1.49, manufactured by SOKEN KAGAKU K.K., being in the form of a 30% dispersion in MIBK having been dispersed in a Polytron dispersing machine at 10000 rpm for 20 minutes before using).

MX-1000: PMMA particles having average particle diameter of 10 µm (refractive index 1.49, manufactured by SOKEN KAGAKU K.K., being in the form of a 30% dispersion in MIBK having been dispersed in a Polytron dispersing machine at 10000 rpm for 20 minutes before using).

MBX-5: PMMA particles having average particle diameter of 5 µm (refractive index 1.49, manufactured by SEKISUI PLASTICS Co., Ltd., being in the form of a 30% dispersion in MIBK having been dispersed in a Polytron dispersing machine at 10000 rpm for 20 minutes before using).

MXS-220: PMMA particles having average particle diameter of 2.2 µm (refractive index 1.49, manufactured by SOKEN KAGAKU K.K., being in the form of a 30% dispersion in MIBK having been dispersed in a Polytron dispersing machine at 10000 rpm for 20 minutes before using).

ART PEARL SE15: PMMA particles having average particle diameter of 15 µm (refractive index 1.49, manufactured by NEGAMI KOGYO K.K., being in the form of a 30% dispersion in MIBK having been dispersed in a Polytron dispersing machine at 10000 rpm for 20 minutes before using).

OPSTAR JN7228A: heat-crosslinkable fluoropolymer (refractive index 1.42, solid content 6%, manufactured by JSR).

MEK-ST: colloidal silica dispersion (average particle diameter 10 to 20 nm, solid content 30%, manufactured by NISSAN CHEMICAL INDUSTRIES, Ltd.).

MEK-ST-L: colloidal silica dispersion (differing in particle size from MEK-ST, average particle diameter 45 nm, solid content 30%, manufactured by NISSAN CHEMICAL INDUSTRIES, Ltd.).

Hollow silica: dispersion of hollow silica microparticles prepared as follows.

(Preparation of Hollow Silica Microparticle Dispersion)

To 500 parts of a sol of hollow silica microparticles (isopropyl alcohol sol, CS60-IPA manufactured by CATALYSTS AND CHEMICALS IND. Co., Ltd.; average particle diameter 60 nm, shell thickness 10 nm, silica content 20%, refractive index of silica particles 1.31), 30 parts of acryloxypropyltrimethoxysilane (KBM-5103; manufactured by SHIN-ETSU CHEMICAL Co., Ltd.) and 1.5 parts of diisopropoxyaluminum ethyl acetate were added. Further, 9 parts of ion-exchanged water was added thereto. After reacting at 60° C. for 8 hours, the mixture was cooled to room temperature and 1.8 parts of acetylacetone was added to thereby give a hollow silica dispersion. The solid content of the hollow silica dispersion thus obtained was 18% by weight and the refractive index after drying the solvent was 1.31.

X-22-164C: reactive silicone (manufactured by SHIN-ETSU CHEMICAL Co., Ltd.).

PMS-033: reactive silicone (manufactured by Gelest).

IRGACURE 907: photo polymierzation initiator (manufactured by Ciba Specialty Chemicals).

IRGACURE 651: photo polymierzation initiator (manufactured by Ciba Specialty Chemicals).

Example 1

Production and Evaluation of Optical Film (1) Formation of Functional Layer

Hard Coat Layer or Light Diffusion Layer

A triacetylcellulose film of 80 µm in thickness (TD80U; manufactured by FUJI PHOTOFILM Co., Ltd.) was unwound in a rolled state. Then each coating solution for functional layer (hard coat layer or light diffusion layer) as listed in Table 1 was coated by using a microgravure roll (diameter: 50 mm) having a gravure pattern of a line density of 135 lines/in. and a depth of 60 µm and a doctor blade at a traveling speed of 10 m/min. After drying at 60° C. for 150 seconds, the coating layer was cured by irradiating under nitrogen-purge with ultraviolet light at 250 mJ/cm² by using an air-cool metal halide lamp (160 W/cm, manufactured by EYEGRAPHICS Co., Ltd.) at an illuminance of 400 mW/cm². Thus a functional layer (a light diffusion layer) was formed followed by winding. Thus, optical films 1 to 11 and 13 to 16 having the light diffusion layer were produced.

To produce the optical film 12, a triacetylcellulose film of 80 µm in thickness (TD80U; manufactured by FUJI PHOTOFILM Co., Ltd.) was unwound in a rolled state. First, the coating solution for light diffusion layer was coated by using a microgravure roll (diameter: 50 mm) having a gravure pattern of a line density of 135 lines/in. and a depth of 60 µm and a doctor blade at a traveling speed of 10 m/min. After drying at 60° C. for 150 seconds, the coating layer was half-cured by irradiating under nitrogen-purge with ultraviolet light at 50 mJ/cm$^2$ by using an air-cool metal halide lamp (160 W/cm, manufactured by EYEGRAPHICS Co., Ltd.) at an illuminance of 400 mW/cm$^2$. Thus a functional layer (a light diffusion layer) was formed. Subsequently, the coating solution for hard coat layer was coated thereon by using a microgravure roll (diameter: 50 mm) having a gravure pattern of a line density of 135 lines/in. and a depth of 60 µm and a doctor blade. After drying at 60° C. for 150 seconds, the coating layer was cured by irradiating under nitrogen-purge with ultraviolet light at 250 mJ/cm$^2$ by using an air-cool metal halide lamp (160 W/cm, manufactured by EYEGRAPHICS Co., Ltd.) at an illuminance of 400 mW/cm$^2$. Thus a functional layer (an optical hard coat layer) was formed. Thus, the light diffusion layer and the hard coat layer were continuously formed and cured followed by winding.

The refractive index of the film of the coating solutions A to G, i to K and M to P for light diffusion layer excluding the particles was 1.52, while the refractive index of the film of the coating solution H for light diffusion layer excluding the particles was 1.51.

(Evaluation of Optical Film)

These optical film samples thus obtained were evaluated in the following items. Table 1 summarizes the results.

(1) Antiglare Properties

Each film thus obtained was marked out in the whole back face opposite to the face having the coating layer with a black felt pen. Then, a non-louver fluorescent lamp (8000 cd/m$^2$) was reflected at an angle 5° and the degree of fuzziness of the reflected image observed from an angle −5° was evaluated in accordance with the following criteria.

A: No reflection (the outline of the fluorescent lamp cannot be observed.

B: Little reflection (the outline of the fluorescent lamp can be scarcely observed).

C: Some reflection (the fluorescent lamp can be observed, though the image is fuzzy).

D: The outline of the fluorescent lamp can be clearly observed or glaring.

(2) Haze

Total haze (H), internal haze (Hi) and surface haze (Hs) were measured by the following methods.

1. The total haze value (H) of the obtained film was measured in accordance with JIS-K7136.

2. Several drops of silicone oil were added on the front face and back face in the low refractive index layer side of the obtained film. Then, the film was sandwiched between two glass plates of 1 mm in thickness (Micro Slide Glass S9111; manufactured by MATSUNAMI). In the state where the film was completely optically adhered to these two glass plates, the haze eliminating the surface haze was measured. Then, the internal haze (Hi) was calculated by subtracting the haze having been separately measured by sandwiching the silicone oil alone between the two glass plates.

3. The surface haze (Hs) was calculated by subtracting the internal haze (Hi) determined in the above 2 from the total haze (H) measured in the above 1.

Unless otherwise noted, the term "haze" or "haze value" as merely used herein means the total haze (H) obtained by the above method.

(3) Arithmetic Average Roughness (Ra), Average Interval Among Peaks and Valleys (Sm)

Measurement was made on the film face with the use of Micromap (manufactured by RYOKA SYSTEM Inc.).

(4) Surface Conditions

The film thus obtained was marked out in the whole back face opposite to the face having the coating layer with a black felt pen. Then, a non-louver fluorescent lamp (8000 cd/m$^2$) was reflected at an angle 90° and the degree of irregularities and streaks observed from an angle −45° was evaluated in accordance with the following criteria.

A: No irregularity or streak is observed.

B: Little irregularities and streaks are observed.

C: Although irregularities and streaks are observed, they bring about no problem in practice.

D: irregularities and streaks are clearly observed.

(5) Pencil Hardness Evaluation

As an indication of scratch resistance, the pencil hardness test was conducted in accordance with JIS K 5400. After conditioning the film at 25° C. and 60% RH for 2 hours, evaluation was made in accordance with the following criteria by using a 4 H pencil as specified in JIS S 6006 under 1 kg load.

A: No scratch is observed in evaluation n=5.

B: One or two scratches are observed in evaluation n=5.

C: Three or more scratches are observed in evaluation n=5.

TABLE 1

| Sample no. | Remarks | Coating solution for light diffusion layer | Average film thickness (µm) | Coating solution for hard coat layer | Film thickness (µm) | Average particle diameter of light-transmitting particles (µm) | CV value of particles (%) | Particle content in total solid components (weight %) | Average film thickness/average particle diameter |
|---|---|---|---|---|---|---|---|---|---|
| 1 | Comparison | A | 8 | — | — | 6 | 9 | 15.6 | 1.33 |
| 2 | Invention | B | 10 | — | — | 6 | 9 | 12.5 | 1.67 |
| 3 | Comparison | C | 18 | — | — | 5 | 9 | 8.3 | 3.6 |
| 4 | Invention | D | 7.5 | — | — | 3 | 9 | 20.8 | 2.5 |
| 5 | Invention | E | 15 | — | — | 8 | 9 | 12.5 | 1.88 |
| 6 | Invention | F | 18 | — | — | 10 | 9 | 6.3 | 1.80 |
| 7 | Invention | G | 10 | — | — | 6 | 9 | 23.1 | 1.60 |
| 8 | Invention | H | 15 | — | — | 8 | 9 | 18.5 | 1.88 |
| 9 | Reference | i | 10 | — | — | 5 | 30 | 12.5 | 2.00 |
| 10 | Comparison | J | 5 | — | — | 3.5 | 9 | 6.8 | 1.43 |

TABLE 1-continued

| | | | | | | | | | |
|---|---|---|---|---|---|---|---|---|---|
| 11 | Invention | K | 25 | — | 3 | 8 | 9 | 15.0 | 3.13 |
| 12 | Invention | B | 10 | L | — | 6 | 9 | 12.5 | 1.67 |
| 13 | Comparison | M | 5.5 | — | — | 2.2 | 9 | 20.8 | 2.5 |
| 14 | Invention | N | 21 | — | — | 15 | 14 | 20.8 | 1.4 |
| 15 | Reference | O | 10 | — | — | 6 | 9 | 4.2 | 1.67 |
| 16 | Reference | P | 10 | — | — | 6 | 9 | 41.6 | 1.67 |

| Sample no. | Remarks | Antiglare properties | Surface haze (%) | Internal haze (%) | Ra (μm) | Sm (μm) | Surface conditions | Pencil hardness |
|---|---|---|---|---|---|---|---|---|
| 1 | Comparison | C | 0.5 | 26 | 0.12 | 37 | C | B |
| 2 | Invention | B | 0.5 | 25 | 0.11 | 50 | A | A |
| 3 | Comparison | D | 0.5 | 25 | 0.07 | 68 | C | A |
| 4 | Invention | B | 0.5 | 27 | 0.07 | 53 | B | B |
| 5 | Invention | B | 0.5 | 22 | 0.10 | 57 | A | A |
| 6 | Invention | B | 0.5 | 25 | 0.11 | 56 | A | A |
| 7 | Invention | B | 2.0 | 57 | 0.12 | 59 | B | A |
| 8 | Invention | B | 0.5 | 37 | 0.11 | 56 | A | A |
| 9 | Reference | B | 1.0 | 25 | 0.19 | 78 | B | A |
| 10 | Comparison | A | 9.0 | 36 | 0.24 | 64 | B | C |
| 11 | Invention | B | 1.0 | 55 | 0.10 | 83 | C | A |
| 12 | Invention | B | 0.3 | 25 | 0.09 | 100 | A | A |
| 13 | Comparison | D | 0 | 20 | 0.01 | 91 | B | C |
| 14 | Invention | A | 12 | 65 | 0.14 | 70 | B | A |
| 15 | Reference | D | 0.1 | 5 | 0.06 | 91 | B | A |
| 16 | Reference | B | 2.7 | 55 | 0.14 | 49 | B | A |

The results given in Table 1 clearly indicate the following fact.

The optical film of the invention was excellent in antiglare properties, showed no problem in practice regarding irregularities and streaks and had a high pencil hardness, thereby having been improved in the total performance.

Example 2

Preparation of Resin Particles (J-1)

600 parts by mass of water was introduced into a reactor provided with a stirrer and a reflux condenser. Then, 0.7 part by mass of polyvinyl alcohol and 2.7 parts by mass of sodium dodecylbenzenesulfonate were added thereto and dissolved therein. Next, a liquid mixture of 93.0 parts by mass of methyl methacrylate, 14.0 parts by mass of ethylene glycol dimethacrylate and 2.0 parts by mass of benzoyl peroxide was added followed by stirring. This liquid mixture was dispersed by using a homogenizer at 4000 rpm for 15 minutes until homogeneity was achieved. Then, it was stirred for additional 4 hours at 75° C. while blowing nitrogen gas thereinto. After lightly dehydrating by centrifugation, the obtained product was washed with water and dried. The crosslinked methyl methacrylate-based resin particles (J-1) thus obtained had an average particle diameter of 6 μm, a refractive index of 1.50 and a CV value of 9.5.

The swelling ratio was determined by dispersing the resin particles in MiBK at a concentration of 30% by mass, measuring the particle diameter (r1) within 1 day after the completion of the dispersion, then allowing the dispersion to stand at room temperature, measuring the particle diameter (r2) again when the particle diameter stopped to increase and achieved equilibrium and assigning the values to the following formula.

Swelling ratio (% by volume)=$\{$(diffusion layer has a pencil hardness of from 4 H to 9 H. $r2/r1)^3-1\}\times$100

The compression strength was evaluated by determining the compression strength (S10 strength), which is a value determined by compressing resin particle by using a micro compression tester for precise strength measurements MCTW201 (manufactured by Shimadzu Scientific Instruments, Inc.; test conditions: 25° C., 65% RH, using an indenter FLAT 20, test load 19.6 (mN), loading speed 0.710982 (mN/sec), displacement full scale: 5 μm) and assigning the load at 10% deformation and the particle diameter before the compression to the following formula.

$S10$ strength (kgf/mm$^2$)=2.8×load (kgf)/$\{$(π×particle diameter (mm)×particle diameter (mm))

The compression strength of the resin particles (J-1) was 4.5 kgf/mm$^2$.

The procedure for producing the resin particles (J-1) was followed but using 80.0 parts by mass of methyl methacrylate and 50.0 parts by mass of pentaerythritol tetraacrylate to thereby give crosslinked resin particles (J-2) according to the invention. The crosslinked methyl methacrylate-based resin particles (J-2) thus obtained had an average particle diameter of 8 μm, a refractive index of 1.51, a CV value of 9.1, a swelling ratio of 5% by volume and a compression strength of 7.8 kgf/mm$^2$.

In the case of substituting the particles in the coating solution B for light diffusion layer of sample 2 (MX600: compression strength 2 kgf/mm$^2$) by the resin particles (J-1) or (J-2), no scuff was observed in the pencil hardness test (n=5) even by using a 5 H pencil as a substitute for a 4 H pencil. When the resin particles (J-2) are used, no scuff was observed in the pencil hardness test (n=5) even by using a 6 H pencil as a substitute for a 4 H pencil. Moreover, the obtained product was excellent in antiglare properties and suffered from no problem of irregularities or streaks in practice, i.e., having improved performance as an optical film.

Example 3

Formation of Low Refractive Index Layer

Each of the triacetylcellulose films having the hard coat layer or the light diffusion layer formed thereon as described above was unwound again. Then the coating solution E-1 for low refractive index layer was coated by using a microgravure roll (diameter: 50 mm) having a gravure pattern of a line density of 200 lines/in. and a depth of 60 µm and a doctor blade at a traveling speed of 20 m/min. After drying at 120° C. for 75 seconds and then for additional 10 minutes, the coating layer was cured by irradiating under nitrogen-purge with ultraviolet light at 240 mJ/cm$^2$ by using an air-cool metal halide lamp (240 W/cm, manufactured by EYEGRAPHICS Co., Ltd.) at an illuminance of 400 mW/cm$^2$. Thus a light diffusion layer of 100 nm in thickness was formed followed by winding.

(Saponification of Antireflective Film)

After the formation of the film, the above-described sample was treated in the following manner. A 1.5 mol/L aqueous solution of sodium hydroxide was prepared and maintained at 55° C. A 0.01 mol/L dilute aqueous solution of sulfuric acid was prepared and maintained at 35° C. The antireflective film produced above was dipped in the aqueous sodium hydroxide solution for 2 minutes and then dipped in water so as to thoroughly wash away the aqueous sodium hydroxide solution. Next, it was dipped in the dilute aqueous sulfuric acid solution for 1 minute and then dipped in water so as to thoroughly wash away the dilute aqueous sulfuric acid solution. Finally, the sample was sufficiently dried at 120° C.

Thus, a saponified antireflective film was produced.

This product according to the invention was free from surface error and showed well-balanced optical characteristics, thereby having been improved in the total performance as an antireflective film.

Example 4

By replacing the coating solution E-1 for low refractive index layer by E-2, the felt pen wiping off was further improved. By replacing the organosilane sol solution a in the coating solutions E-1 and E-2 for low refractive index layer by the sol solution b, the coating solutions showed improved storage stability and thus became more suitable for continuous coating.

Example 5

A triacetylcellulose film of 80 µm in thickness (TD80U; manufactured by FUJI PHOTOFILM Co., Ltd.), which had been dipped in a 1.5 mol/L aqueous NaOH solution at 55° C. for 2 minutes followed by neutralization and water washing, and the (saponified) sample of the invention of Example 3 were allowed to adsorb iodine and stretched to give a polarizing film. The film thus obtained was adhered and protected in both faces to give a polarizing plate. The polarizing plate in the viewing side of a highvision liquid crystal TV LC-20AX5 (manufactured by SHARP Co.) was replaced by the polarizing plate constructed above. The display device thus obtained was subjected to the evaluation in the following items. Table 2 shows the results.

(6) Contrast

The antiglare antireflective film thus produced was mounted to a liquid crystal TV and the contrast rate was measured with a contrast meter ("EZ-Contrast 160D"; manufactured by ELDIM).

(7) Definitiveness in Black Color

The definitiveness in black color of a liquid crystal display device, which was provided with a polarizing plate having the optical film on the viewing side surface in the transparent support side, was evaluated by a sensory test. The test was conducted by aligning a plural number of display devices and relatively comparing them at the same time. For each film, the black color when the pour source was switched off and the black color (a black image) when the pour source was switched on were compared from the front side and evaluated in accordance with the following criteria. That is to say, a stronger blackness was regarded as the higher definitiveness.

A: A strongly black color is observed and the screen is highly definite.

B: A strongly black but somewhat grayish color is observed. The screen is somewhat definite.

C: A strong but grayish color is observed. The screen is less definite.

D: A considerably grayish color is observed. The screen is not definite.

(8) Evaluation of Dazzling

The antireflective film produced above was mounted to a liquid crystal TV and the degree of dazzling (scattering in brightness caused by the lens effect of peaks on the surface of the antiglare antireflective film) was evaluated in accordance with the following criteria.

A: No dazzling is observed.

B: Slight dazzling is observed.

C: Unpleasant dazzling is observed.

(9) Evaluation of Blur Characters

The antireflective film produced above was mounted to a liquid crystal TV. Then, two characters "薔薇"were displayed continuously in 10 rows (Mincho font, 10 point, 25 characters per row). The blurs in the outline (fuzzy image) were compared with the same display using a non-antiglare polarizing plate and evaluated in accordance with the following criteria.

A: Little blur is observed in the characters.

B: Slight blurs are observed in the characters but there is no problem in practice.

C: Serious blurs are observed.

(10) Extraneous Image Due to Reflection of Outside Light

The antireflective film produced above was mounted to a liquid crystal TV. Then, a non-louver fluorescent lamp (8000 cd/m$^2$) was reflected at an angle 45° and the degree of fuzziness of the reflected image observed from an angle −45° was evaluated in accordance with the following criteria.

A: No reflection (the outline of the fluorescent lamp cannot be observed.

B: Little reflection (the outline of the fluorescent lamp can be scarcely observed).

C: Some reflection (the fluorescent lamp can be observed, though the image is fuzzy).

D: The outline of the fluorescent lamp can be clearly observed or glaring.

TABLE 2

| Sample no. | Remarks | Contrast | Definitiveness in black color | Dazzling | Blur character | Reflection of outside light |
|---|---|---|---|---|---|---|
| 1 | Comparison | 1176 | A | C | B | C |
| 2 | Invention | 1178 | B | B | A | B |
| 3 | Comparison | 1181 | A | A | A | D |
| 4 | Invention | 1084 | B | B | A | B |
| 5 | Invention | 1159 | A | B | A | B |
| 6 | Invention | 1117 | C | B | A | B |
| 7 | Invention | 1082 | C | A | B | B |
| 8 | Invention | 1091 | B | A | A | B |
| 9 | Reference | 1058 | D | D | C | A |
| 10 | Comparison | 1027 | D | A | C | A |
| 11 | Invention | 1052 | B | A | B | B |

TABLE 2-continued

| Sample no. | Remarks | Contrast | Definitiveness in black color | Dazzling | Blur character | Reflection of outside light |
|---|---|---|---|---|---|---|
| 12 | Invention | 1162 | A | B | A | B |
| 13 | Comparison | 1152 | A | A | B | D |
| 14 | Invention | 992 | C | B | A | B |
| 15 | Reference | 1182 | B | D | B | C |
| 16 | Reference | 1022 | C | A | C | B |

The results given in Table 2 clearly indicate the following fact.

The antireflective film of the samples 2, 4 to 8, 11 and 14 had a high contrast, a high definitiveness in black color, showed no problem in dazzling and blur characters and little suffered from reflection of outside light, thereby having been improved in the total performance.

The sample 12 was constructed by stacking a hard coat layer on the light-diffusion layer of the sample 2. By stacking the hard coat layer, the arithmetic average roughness (Ra) could be reduced and the average interval among the peaks and valleys (Sm) could be enlarged, thereby improving definitiveness in black color.

Example 6

A PVA film was dipped in an aqueous solution containing 2.0 g/l of iodine and 4.0 g/l of potassium iodide at 25° C. for 240 seconds. Further, it was dipped in a 10 g/l aqueous solution of boric acid at 25° C. for 60 seconds. Then, it was introduced into a tenter stretching machine as shown in FIG. 2 in JP-A-2002-86554 and stretched at a stretching ratio of 5.3. Next, the tenter was curled as shown in FIG. 2 to the stretching direction and the width was maintained at a constant level thereafter. After drying in an atmosphere at 80° C., the film was removed from the tenter. The difference in traveling speed between the right and left tenter clips was less than 0.05%, and the angle between the center line of the introduced film and the center line of the film to be transferred toward the next step was 46°. |L1−L2| was 0.7 m and W was 0.7 m. Namely, |L1−L2|=W. At the tenter outlet, the substantial stretching direction Ax-Cx inclined by 45° to the center line 22 of the film to be transferred toward the next step. Neither wrinkle nor film deformation was observed at the tenter outlet.

By using a 3% aqueous solution of PVA (PVA-117H; manufactured by KURARAY) as an adhesive, the above film was bonded to FUJITAK (cellulose triacetate, retardation value 3.0 nm; manufactured by FUJI PHOTOFILM Co., Ltd.) and dried at 80° C. to give a polarizing plate having an effective width of 650 nm. The absorption axis direction of the polarizing plate inclined by 45° to the longitudinal direction. The transmittance of this polarizing plate at 550 nm was 43.7% and the degree of polarization was 99.97%. By cutting this polarizing plate into a piece (310×233 m), a polarizing plate which had an area efficiency of 91.5% and the absorption axis of which inclined by 45° to the side was obtained.

Subsequently, the (saponified) film samples of Example 3 according to the invention were bonded to the polarizing plate as described above to give an antiglare polarizing plate. A liquid crystal display device was constructed by using this polarizing plate and locating the low refractive index layer as the outermost layer. As a result, a high contrast free from extraneous image caused by the reflection of outside light was achieved and the display device showed an excellent visibility with little reflected image.

Example 7

The sample of Example 3 according to the invention was bonded to the viewing side of the polarizing plate in the viewing side of a transmission type TN liquid crystal cell. As the protective film in the liquid crystal cell side of the polarizing plate and as the protective film in the liquid crystal cell side of the polarizing plate in the backlight side, use was made of a viewing angle-enlarging film (WIDE VIEW FILM ACE, manufactured by FUJI PHOTOFILM CO., LTD.) in which the disc face of a discotic structural unit inclined to the transparent substrate face and which had an optically compensatory layer with an angle between the disc face of a discotic structural unit and the transparent substrate face changing in the depth direction of the optically compensatory layer. As a result, a liquid crystal display device showing a high contrast in a bright room and having very broad viewing angle from side to side and up and down, a highly favorable visibility and excellent image qualities could be obtained.

Example 8

The sample of Example 3 according to the invention was bonded to the surface glass plate of an organic EL display device via a pressure-sensitive adhesive. As a result, a display device showing regulated reflection on the glass surface and a high visibility was obtained.

Example 9

By using the sample of Example 3 according to the invention, a polarizing plate provided with the antireflective film on one face was constructed. A λ/4 plate was bonded to the face of the polarizing plate opposite to the side having the antireflective film and then the polarizing plate was bonded to the surface glass plate of an organic EL display device in such a manner that the antireflective layer side was located as the outermost face. As a result, the surface reflection and the reflection from the inside of the surface glass were cut and a display film with an extremely high visibility was obtained.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2006-041471 filed Feb. 17 of 2006, the contents of which are incorporated herein by reference.

What is claimed is:

1. An antireflective film comprising: a transparent support; a light diffusion layer containing light-transmitting particles and a binder; and a low refractive index layer as an uppermost layer of the antireflective film, the low refractive index layer having a lower refractive index than the transparent support, wherein the light diffusion layer has an average thickness of from 10 to 25 µm, and the average thickness of the light diffusion layer is from 1.4 to 3.5 times as large as an average particle diameter of the light-transmitting particles, the light diffusion layer has an arithmetic average roughness Ra of from 0.04 to 0.12 µm and an average peak-valley interval Sm of from 50 to 170 µm, the light diffusion layer has a surface haze of from 0.3 to 1.5%;

the light diffusion layer contains the light-transmitting particles in an amount of from 5 to 40% by weight based on the total solid contents of the light diffusion layer; and
the light-transmitting particles have a CV value of not more than 15%.

2. The antireflective film of claim 1, wherein the average particle diameter of the light-transmitting particles is from 3 to 12 µm.

3. The optical antireflective film of claim 1, wherein a difference between a refractive index of the light-transmitting particles and a refractive index of the light diffusion layer excluding the light-transmitting particles is from 0.001 to 0.03.

4. The antireflective film of claim 1, wherein the binder comprises a trifunctional or higher (meth)acrylate monomer as a main component, and the light-transmitting particles comprising crosslinked poly((meth)acrylate) having an acryl content of from 50 to 100% by weight.

5. The antireflective film of claim 1, wherein the light diffusion layer has a pencil hardness of from 4 H to 9 H.

6. The antireflective film of claim 1, wherein the light diffusion layer has an internal haze of from 0 to 60%.

7. The antireflective film of claim 1, wherein the light-transmitting particles has a compression strength of from 4 to 10 kgf/mm$^2$.

8. The antireflective film of claim 1, further comprising a hard coat layer stacked on the light diffusion layer in a manner that changes an arithmetic average roughness Ra of a surface of the optical film.

9. A polarizing plate comprising: a polarizer; and two protective films, wherein at least one of the two protective films is an antireflective film of claim 1.

10. An image display device comprising an optical film of claim 1, wherein the light diffusion layer is provided on a viewing side of the image display device.

11. The antireflective film of claim 1, wherein the average thickness of the light diffusion layer is from 1.6 to 2.0 times as large as the average particle diameter of the light-transmitting particles.

12. The antireflective film of claim 1, wherein the average particle diameter of the light-transmitting particles is from 6 to 10 µm.

* * * * *